US010775959B2

(12) United States Patent
Mildrew et al.

(10) Patent No.: US 10,775,959 B2
(45) Date of Patent: Sep. 15, 2020

(54) DEFINING, DISPLAYING AND INTERACTING WITH TAGS IN A THREE-DIMENSIONAL MODEL

(71) Applicant: Matterport, Inc., Mountain View, CA (US)

(72) Inventors: James Mildrew, Mountain View, CA (US); Matthew Tschudy Bell, Palo Alto, CA (US); Dustin Michael Cook, San Jose, CA (US); Preston Cowley, San Jose, CA (US); Lester Lee, Oakland, CA (US); Peter McColgan, Fremont, CA (US); Daniel Prochazka, Pacifica, CA (US); Brian Schulman, San Francisco, CA (US); James Sundra, San Jose, CA (US); Alan Tan, San Jose, CA (US)

(73) Assignee: Matterport, Inc., Sunnyvale, CA (US)

( * ) Notice: Subject to any disclaimer, the term of this patent is extended or adjusted under 35 U.S.C. 154(b) by 2 days.

(21) Appl. No.: 16/162,683

(22) Filed: Oct. 17, 2018

(65) Prior Publication Data
US 2019/0050137 A1     Feb. 14, 2019

Related U.S. Application Data

(63) Continuation of application No. 15/272,337, filed on Sep. 21, 2016, now Pat. No. 10,139,985, which is a (Continued)

(51) Int. Cl.
*G06T 19/00*      (2011.01)
*G06F 3/0481*    (2013.01)
(Continued)

(52) U.S. Cl.
CPC ......... *G06F 3/04815* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS

| | | |
|---|---|---|
| 4,578,757 A | 3/1986 | Strark |
| 5,276,785 A | 1/1994 | Mackinlay et al. |

(Continued)

OTHER PUBLICATIONS

Notice of Allowance received for U.S. Appl. No. 15/722,269 dated Jan. 29, 2019, 24 pages.

(Continued)

*Primary Examiner* — Phong X Nguyen
(74) *Attorney, Agent, or Firm* — Ahmann Kloke LLP

(57) ABSTRACT

This application generally relates to defining, displaying and interacting with tags in a 3D model. In an embodiment, a method includes generating, by a system including a processor, a three-dimensional model of an environment based on sets of aligned three-dimensional data captured from the environment, and associating tags with defined locations of the three-dimensional model, wherein the tags are respectively represented by tag icons that are spatially aligned with the defined locations of the three-dimensional model as included in different representations of the three-dimensional model rendered via an interface of a device, wherein the different representations correspond to different perspectives of the three-dimensional model, and wherein selection of the tag icons causes the tags respectively associated therewith to be rendered at the device.

23 Claims, 33 Drawing Sheets

Related U.S. Application Data continuation-in-part of application No. 15/199,853, filed on Jun. 30, 2016, now Pat. No. 10,127,722, and a continuation-in-part of application No. 14/219,906, filed on Mar. 19, 2014, now Pat. No. 10,163,261, and a continuation-in-part of application No. 13/925,772, filed on Jun. 24, 2013, now Pat. No. 9,786,097.

(60) Provisional application No. 62/187,201, filed on Jun. 30, 2015, provisional application No. 61/663,265, filed on Jun. 22, 2012.

(51) Int. Cl.
*G06T 17/05* (2011.01)
*G06T 15/20* (2011.01)
*G06F 3/0482* (2013.01)
*G06F 3/01* (2006.01)

(52) U.S. Cl.
CPC ........ *G06F 3/0482* (2013.01); *G06F 3/04817* (2013.01); *G06T 15/20* (2013.01); *G06T 17/05* (2013.01); *G06T 19/003* (2013.01)

(56) References Cited

U.S. PATENT DOCUMENTS

| | | |
|---|---|---|
| 5,552,806 A | 9/1996 | Lenchik |
| 5,611,025 A | 3/1997 | Lorensen et al. |
| 5,671,381 A | 9/1997 | Strasnick et al. |
| 6,130,670 A | 10/2000 | Porter |
| 6,346,938 B1 | 2/2002 | Chan et al. |
| 6,525,731 B1 | 2/2003 | Suits et al. |
| 7,242,408 B1 | 7/2007 | Dunn |
| 7,933,395 B1 | 4/2011 | Bailly |
| 8,200,594 B1 | 6/2012 | Bleiweiss |
| 8,339,394 B1 | 12/2012 | Lininger |
| 8,902,288 B1 | 12/2014 | Fan et al. |
| 9,179,252 B1 | 11/2015 | Liu et al. |
| 9,244,940 B1 | 1/2016 | Donsbach et al. |
| 9,671,938 B2 | 6/2017 | Seitz et al. |
| 2002/0140698 A1 | 10/2002 | Robertson et al. |
| 2003/0052877 A1 | 3/2003 | Schwegler, Jr. et al. |
| 2004/0041812 A1 | 3/2004 | Roberts et al. |
| 2004/0046760 A1 | 3/2004 | Roberts et al. |
| 2005/0151751 A1 | 7/2005 | Hong et al. |
| 2006/0066612 A1 | 3/2006 | Yang et al. |
| 2006/0114251 A1 | 6/2006 | Miller |
| 2006/0132482 A1 | 6/2006 | Oh |
| 2006/0227134 A1 | 10/2006 | Khan et al. |
| 2007/0024612 A1 | 2/2007 | Balfour |
| 2007/0110338 A1 | 5/2007 | Snavely et al. |
| 2007/0171221 A1 | 7/2007 | Miyamoto et al. |
| 2007/0203545 A1 | 8/2007 | Stone et al. |
| 2008/0028341 A1 | 1/2008 | Szeliski et al. |
| 2008/0088621 A1 | 4/2008 | Grimaud et al. |
| 2008/0106594 A1* | 5/2008 | Thrun .................. G06T 19/003 348/39 |
| 2008/0143727 A1* | 6/2008 | Oh .......................... G06T 13/40 345/474 |
| 2008/0247636 A1 | 10/2008 | Davis et al. |
| 2008/0291217 A1 | 11/2008 | Vincent et al. |
| 2009/0005981 A1* | 1/2009 | Forstall ............... G06F 3/04883 701/431 |
| 2009/0079732 A1 | 3/2009 | Fitzmaurice et al. |
| 2009/0129690 A1 | 5/2009 | Marcellin et al. |
| 2009/0274391 A1 | 11/2009 | Arcas et al. |
| 2009/0281728 A1 | 11/2009 | Mishra et al. |
| 2009/0289937 A1 | 11/2009 | Flake et al. |
| 2010/0045666 A1 | 2/2010 | Kornmann et al. |
| 2010/0045678 A1 | 2/2010 | Reid |
| 2010/0077311 A1* | 3/2010 | Santoro ............... G06F 16/958 715/738 |
| 2010/0087257 A1 | 4/2010 | Deb |
| 2010/0171741 A1 | 7/2010 | Brill et al. |
| 2010/0182400 A1 | 7/2010 | Nelson et al. |
| 2010/0188503 A1 | 7/2010 | Tsai et al. |
| 2010/0201684 A1 | 8/2010 | Yadav et al. |
| 2010/0214284 A1 | 8/2010 | Rieffel et al. |
| 2010/0265248 A1 | 10/2010 | Mccrae et al. |
| 2010/0268457 A1 | 10/2010 | Mccrae et al. |
| 2011/0007962 A1 | 1/2011 | Johnson et al. |
| 2011/0010650 A1 | 1/2011 | Hess et al. |
| 2011/0187723 A1 | 8/2011 | Chen et al. |
| 2011/0199302 A1 | 8/2011 | Tossell et al. |
| 2011/0249757 A1 | 10/2011 | Newton et al. |
| 2011/0283223 A1 | 11/2011 | Vaittinen et al. |
| 2011/0310087 A1 | 12/2011 | Wright, Jr. et al. |
| 2011/0310088 A1* | 12/2011 | Adabala ............... G06T 19/003 345/419 |
| 2011/0316976 A1 | 12/2011 | Nakajima et al. |
| 2011/0320116 A1 | 12/2011 | DeMaio et al. |
| 2012/0019522 A1 | 1/2012 | Lawrence et al. |
| 2012/0030630 A1 | 2/2012 | Grossman et al. |
| 2012/0044247 A1 | 2/2012 | Naimark |
| 2012/0050288 A1 | 3/2012 | Crucs |
| 2012/0116728 A1* | 5/2012 | Shear ................... G06T 19/006 703/1 |
| 2012/0127169 A1 | 5/2012 | Barcay et al. |
| 2012/0127170 A1 | 5/2012 | Varadhan |
| 2012/0133640 A1 | 5/2012 | Chin et al. |
| 2012/0139915 A1 | 6/2012 | Muikaichi et al. |
| 2012/0155744 A1 | 6/2012 | Kennedy et al. |
| 2012/0209574 A1* | 8/2012 | Moreau .................. G06F 30/13 703/1 |
| 2012/0316441 A1 | 12/2012 | Toma et al. |
| 2012/0327184 A1 | 12/2012 | Zhu et al. |
| 2013/0009954 A1 | 1/2013 | Ofek et al. |
| 2013/0016896 A1 | 1/2013 | Seida |
| 2013/0044139 A1 | 2/2013 | Hernandez Esteban |
| 2013/0085823 A1* | 4/2013 | Gibson .................. G06Q 30/02 705/14.5 |
| 2013/0179841 A1* | 7/2013 | Mutton ............... G06F 3/04815 715/850 |
| 2013/0187952 A1 | 7/2013 | Berkovich et al. |
| 2013/0207963 A1* | 8/2013 | Stirbu ..................... G06F 3/011 345/419 |
| 2013/0271457 A1* | 10/2013 | Haswell ............... G06T 19/003 345/420 |
| 2013/0271462 A1 | 10/2013 | Frank |
| 2013/0300656 A1 | 11/2013 | Roegelein et al. |
| 2013/0321392 A1 | 12/2013 | van der Merwe et al. |
| 2013/0321397 A1* | 12/2013 | Chen ................... G01C 21/3673 345/419 |
| 2013/0321401 A1 | 12/2013 | Piemonte et al. |
| 2014/0002439 A1 | 1/2014 | Lynch |
| 2014/0002440 A1 | 1/2014 | Lynch |
| 2014/0062998 A1 | 3/2014 | Ofstad et al. |
| 2014/0095122 A1* | 4/2014 | Appleman .............. G06F 30/13 703/1 |
| 2014/0104280 A1 | 4/2014 | Ofstad et al. |
| 2014/0218360 A1 | 8/2014 | Dalgaard Larsen |
| 2014/0240318 A1 | 8/2014 | Coombe et al. |
| 2014/0314322 A1 | 10/2014 | Snavely et al. |
| 2015/0009327 A1 | 1/2015 | Love |
| 2015/0085068 A1* | 3/2015 | Becker ..................... G06T 7/579 348/39 |
| 2015/0130894 A1* | 5/2015 | Holzer ................. G06F 16/738 348/36 |
| 2015/0269785 A1 | 9/2015 | Bell et al. |
| 2015/0293354 A1* | 10/2015 | Oishi ................. G01C 21/3679 345/7 |
| 2016/0127690 A1 | 5/2016 | Kaehler et al. |
| 2016/0210788 A1 | 7/2016 | Kasahara |
| 2016/0267067 A1 | 9/2016 | Mays et al. |

(56) References Cited

U.S. PATENT DOCUMENTS

2016/0328373 A1    11/2016    Rhoades et al.
2017/0352196 A1    12/2017    Chen et al.

OTHER PUBLICATIONS

International Search Report & Written Opinion for International Patent Application Serial No. PCT/US2015/020453, dated Jun. 25, 2015, 11 pages.

Non-Final Office Action from U.S. Appl. No. 14/219,906, dated Nov. 18, 2015, 29 pages.

Final Office Action from U.S. Appl. No. 14/219,906, dated Jun. 21, 2016, 35 pages.

Non-Final Office Action for U.S. Appl. No. 13/925,772 dated Nov. 28, 2014, 10 pages.

Final Office Action for U.S. Appl. No. 13/925,772 dated May 5, 2015, 31 pages.

Non-Final Office Action for U.S. Appl. No. 13/925,772 dated Feb. 3, 2016, 37 pages.

European Office Action from EP Application Serial No. 15764342.0, dated Oct. 28, 2016, 2 pages.

Final Office Action for U.S. Appl. No. 13/925,772 dated Aug. 16, 2016, 41 pages.

Bourke, "Interpolation methods", 1999, available at http://paulbourke.net/miscelianeous/interpolation/, pp. 1-12.

Tu Wien, "Computer-Assisted Animation", 2002, available at https://www.cg.tuwien.ac.at/courses/Animation/B_Computer_Assisted_Animation.pdf, pp. 1-20.

Hsieh et al., "Photo Navigator", 2008, MM '08 Proceedings of the 16th ACM international conference on Multimedia, pp. 419-428.

Non-Final Office Action for U.S. Appl. No. 14/219,906, dated Mar. 2, 2017, 40 pages.

Notice of Allowance for U.S. Appl. No. 13/925,772, dated Jun. 1, 2017, 32 pages.

Final Office Action for U.S. Appl. No. 14/219,906 dated Oct. 19, 2017, 43 pages.

Non-Final Office Action from U.S. Appl. No. 15/199,853, dated Oct. 31, 2017, 31 pages.

Extended European Search Report Issued in EP Patent application No. 15764342.0 dated Aug. 11, 2017, 9 Pages.

WilloxH: "Microsoft Photosynth", Jul. 27, 2006, Retrieved from the Internet: URL:https://www.youtube.com;watch?v=p16frKJLVi0 [retrieved on Dec. 12, 2015], 1 page.

Non-Final Office Action for U.S. Appl. No. 14/219,906 dated Apr. 4, 2018, 22 pages.

Non-Final Office Action for U.S. Appl. No. 15/272,337 dated Feb. 2, 2018, 66 pages.

Final Office Action from U.S. Appl. No. 15/199,853, dated Apr. 25, 2018, 31 pages.

Notice of Allowance received for U.S. Appl. No. 14/219,906 dated Jul. 10, 2018, 55 pages.

Snavely et al., "Photo Tourism: Exploring Photo Collections in 3D", 2006, SIGGRAPH '06 ACM SIGGRAPH, pp. 835-846.

Notice of Allowance received for U.S. Appl. No. 15/272,337 dated Jul. 17, 2018, 46 pages.

Non-Final Office Action received for U.S. Appl. No. 15/722,269 dated Oct. 17, 2018, 55 pages.

Non-Final Office Action for U.S. Appl. No. 16/155,151 dated Oct. 31, 2019, 18 pages.

Fitzmaurice, George et al., "Safe 3D Navigation," Feb. 2008, I3D '08, Proceedings of the 2008 Symposium on Interactive 3D Graphics and Games, pp. 7-15.

Yan, Wei et al., "Integrating BIM and Gaming for Real-Time Interactive Architectural Visualization," Jul. 2011, Automation in Construction, vol. 20, No. 4, pp. 446-458.

Final Office Action for U.S. Appl. No. 16/155,151 dated May 4, 2020, 19 pages.

Non-Final Office Action for U.S. Appl. No. 16/836,910 dated Apr. 21, 2020, 11 pages.

\* cited by examiner

DEFINING, DISPLAYING AND INTERACTING WITH TAGS IN A THREE-DIMENSIONAL MODEL

RELATED APPLICATIONS

This application is a continuation of U.S. patent application Ser. No. 15/272,337, filed on Sep. 21, 2016 entitled "DEFINING, DISPLAYING AND INTERACTING WITH TAGS IN A THREE-DIMENSIONAL MODEL," which is a continuation in part of U.S. patent application Ser. No. 15/199,853, filed on Jun. 30, 2016 entitled "MOBILE CAPTURE VISUALIZATION INCORPORATING THREE-DIMENSIONAL AND TWO-DIMENSIONAL IMAGERY" which claims priority to U.S. Provisional Patent Application No. 62/187,201, filed on Jun. 30, 2015, and entitled "MOBILE CAPTURE VISUALIZATION INCORPORATING THREE-DIMENSIONAL AND TWO-DIMENSIONAL IMAGERY." This application is also a continuation in part of U.S. patent application Ser. No. 14/219,906, filed on Mar. 19, 2014 entitled "SELECTING TWO-DIMENSIONAL IMAGERY DATA FOR DISPLAY WITHIN A THREE-DIMENSIONAL MODEL." This application is further a continuation in part of U.S. patent application Ser. No. 13/925,772, filed on Jun. 24, 2013 entitled "MULTI-MODAL METHOD FOR INTERACTING WITH 3D MODELS" which claims priority to U.S. Provisional Patent Application Ser. No. 61/663,265 filed Jun. 22, 2012, entitled "WEB PLAYER FOR VIEWING MODELS." The entireties of the aforementioned applications are incorporated by reference herein.

TECHNICAL FIELD

This application generally relates to defining, displaying and interacting with tags in a three-dimensional (3D) model.

BACKGROUND

Interactive, first-person 3D immersive environments are becoming increasingly popular. In these environments, a user is able to navigate through a virtual space. Examples of these environments include first person video games and tools for visualizing 3D models of terrain. Aerial navigation tools allow users to virtually explore urban areas in three dimensions from an aerial point of view. Panoramic navigation tools (e.g., street views) allow users to view multiple 360-degree panoramas of an environment and to navigate between these multiple panoramas with a visually blended interpolation. New techniques for viewing and interacting with 3D immersive environments afforded by advanced user devices such as smartphones, virtual reality (VR) headsets, or augmented reality (AR) devices are further spurring a desire for more enriched experiences associated with 3D environment applications beyond those attributed to the structured visual aspects of the 3D environments. Therefore, techniques to further enhance digital 3D models with characteristics extending beyond the structured visual aspects are highly desired.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
FIG. 1 presents an example representation of a 3D model of an environment including tags in accordance with various aspects and embodiments described herein.

By way of introduction, the subject disclosure is directed to systems, methods, apparatuses and computer readable media that facilitate defining, viewing and interacting with tags in a digital 3D model. Captured data consisting of photorealistic images combined with optional 3D depth information can provide a basis for generating reconstructed digital 3D space models, such as a reconstructed digital 3D model of an architectural building, including detailed interior and exterior features of the building. Digital 3D models reconstructed in this way can be edited and conditioned by various authoring tools. These authoring tools for example can allow users to interact with the 3D model to obtain distance measurements, define preferred viewing locations, modify the appearance of the model, augment or remove features of the 3D model, and the like. The resulting published 3D space model can be experienced by an audience, using a viewing device such as a computer display, a mobile device, a virtual reality (VR) headset or an augmented reality (AR) device, when operated in conjunction with dedicated software that facilitates viewing and navigating the 3D model.

To further enhance digital 3D models with characteristics extending beyond the structured visual aspects, the subject systems, methods, apparatuses and computer readable media provide mechanisms for defining, applying, viewing and interacting with tags in a digital 3D model. In accordance with various embodiments, the tags can be or include rich data/metadata that can be associated with features of or locations in the 3D model and provide additional information about the features or locations they are associated with. For example, tags can be or include, but are not limited to: text, an image, a 3D object or model, a video, an animation, audio, a hyperlink, or an executable action or application. Tags can be associated with features of a 3D model, such as 3D visual and structural components of the 3D model. They may be used in order to enhance the utility of the 3D model for domains such as semantic, historical, e-commerce, training, facility management, and incidental interpretations. For example, a tag that can be associated with a piece of furniture included in the interior space of a reconstructed 3D model of a home can include a textual description of the furniture, an audio description of the furniture, a video clip highlighting specific details of the piece of furniture, a hyperlink to a merchant website where the piece of furniture can be purchased, and the like. In another example, a tag associated with a remodeled kitchen of a home can include information identifying the work that was completed on the kitchen and include hyperlinks to other 3D models of the kitchen generated before the remodeling and/or at various points during the remodeling process. In another example, a tag associated with an appliance in a 3D model of a home can include or be associated with an application that provides for remotely controlling operation of the appliance in the actual physical home.

A tag can be represented or identified in a 3D model via two-dimensional (2D) or 3D iconography (e.g., an icon, a symbol, an image, an object, etc.) that is located at or near a point, area, or object in the 3D model that it describes. The icon or symbol can be selected or interacted with to cause the rich media of the tag to be presented to a user. For instance, depending on the contents of a tag, a user can select a tag icon and be presented with a 2D image or panoramic image, a video, a sound bite, a 3D interactive object, a hyperlink to a website, or a search tool facilitating a request for additional information. For example, selection of a tag associated with a piece of furniture that includes a textual description of the piece of furniture can result in the presentation of a pop-up window or inline frame (iframe) including the textual description. The icon or symbol can further be spatially aligned in 3D within the 3D model relative to the point, object, or area that it is associated with and a 3D coordinate space to which the 3D model is aligned. Accordingly, as the 3D model is viewed from different perspectives, the icon or symbol remains spatially aligned relative to the point, area, or object that it is associated with and the other visual features of the 3D model.

Tags provide avenues for richer engagement when experiencing the 3D model. Layering the inherent visual qualities of a reconstructed space with additional traits not necessarily limited to the geometric or structural appearance of the space, such as semantic, emotional, historical or incidental characteristics, provides an opportunity for authoring deeper narratives for an audience and yielding a further comprehensive context about the space. The subject techniques for defining, applying, viewing and interacting with tags in a reconstructed 3D space can provide a plethora of novel applications in the fields of real estate, construction, home improvement, remote automation, monitoring and control, advertising, ecommerce, news and entertainment publishing, education, sightseeing, navigation, and historical recording of locations.

In one or more embodiments, a method is provided that includes rendering, by a device comprising a processor, a 3D model of an environment via an interface of the device, wherein the 3D model was generated based on sets of aligned 3D data captured from the environment, and wherein the 3D model is associated with tags at defined points of the 3D model. The method further includes facilitating, by the device, navigating the 3D model as presented via the interface. In various implementations, the facilitating can include rendering different representations of the 3D model from different perspectives of a virtual camera relative to the 3D model based on received navigational input, wherein the different representations represent volumes of the 3D model viewed from the different perspectives. The method further includes displaying one or more tag icons in the different representations for one or more tags of the tags at spatially aligned positions in the different representations based on one or more defined points of the defined points that the one or more tags are respectively associated with, wherein the one or more tag icons are selectable and wherein selection of the one or more tag icons causes the one or more tags respectively associated therewith to be rendered by the device.

In another embodiment, a device is provided that comprises a memory that stores computer executable components and a processor that executes computer executable components stored in the memory. In one or more implementations, these computer executable components can comprise a navigation component configured to receive navigation input indicating desired perspectives for viewing a 3D model presented via an interface of the device, wherein the 3D model is associated with tags at defined points of the 3D model, and a rendering component configured to render, via the interface, different representations of the 3D model from different perspectives of a virtual camera relative to the 3D model determined based on the navigation input. According to this embodiment, one or more representations of the different representations can respectively comprise one or more tag icons that represent one or more tags of the tags, wherein the one or more tag icons are located at spatially aligned positions in the one or more different representations based on one or more defined points of the defined points that the one or more tags are respectively associated with, wherein the one or more tag icons are selectable, and wherein selection of the one or more tag icons causes the one or more tags respectively associated therewith to be rendered by the device.

Another embodiment is directed to a system is provided that includes a processor, and a memory that stores executable instructions that, when executed by the processor, facilitate performance of various operations. These operations can include generating, by a system comprising a processor, a 3D model of an environment based on sets of aligned 3D data captured from the environment, and associating, by the system, tags with defined points of the 3D model, wherein the tags are respectively represented by tag icons that are spatially aligned with the defined locations of the three-dimensional model as included in different representations of the three-dimensional model when rendered via an interface of a device, wherein the different representations correspond to different perspectives of the three-dimensional model, and wherein selection of the tag icons causes the tags respectively associated therewith to be rendered at the device.

In another embodiment, a system is provided that includes a processor, and a memory that stores executable instructions that, when executed by the processor, facilitate performance of various operations. These operations can include facilitating, navigating and viewing a 3D model of an environment as displayed via an interface, wherein the 3D model is generated based on sets of aligned 3D data captured from the environment. These operations can further include, generating a first representation of the 3D model from a first perspective of a virtual camera relative to the 3D model based on reception of a first navigational cue in response to the navigating, and identifying a first point of the 3D model included in the first representation that is associated with a first tag. These operations can further include, embedding a first tag icon in the first representation at a first spatial position relative to the first point based on first position information identifying a first defined spatial position of the first point relative to the 3D model, and causing the first representation to be displayed via the interface.

In one or more implementations, the operations can further include receiving input indicating interaction with the first tag icon as displayed via the interface, and causing the first tag to be displayed in the interface. In an aspect, the first tag can be displayed in a 2D frame that is overlaid onto the first representation at or near the first spatial position associated with the first tag icon. In some implementations, a size, appearance, and position of the 2D frame is tailored based on a characteristic of a device display at which the interface is displayed and relative positions of other visual features included in the first representation. In another aspect, the receiving the input includes receiving selection input indicating selection of the first tag icon. According to this aspect, the operations can further include generating a second representation of the 3D model from a second perspective of the virtual camera relative to the first point of the 3D model based on the receiving the selection input, wherein the second representation provides a closer view of the first point relative to the first representation, and causing the second representation to be displayed via the interface.

In yet another embodiment, a machine-readable storage medium, including executable instructions that, when executed by a processor, facilitate performance of various operations. These operations can include identifying a point in a 3D model of an environment as displayed via an interface for association with a tag, wherein the 3D model is generated based on 2D image data and 3D spatial data captured from the environment. These operations can further include determining a defined spatial position of the point relative to the 3D model, associating the tag with the point and the defined spatial position, and integrating a tag icon in a representation of the 3D model including the point at a spatial position relative to the defined spatial position of the point, wherein the tag icon is selectable and selection of the tag icon causes the tag to be rendered.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

Terms such as "user equipment," "user equipment device," "mobile device," "user device," "client device," "handset," or terms representing similar terminology can refer to a device utilized by a subscriber or user to receive data, convey data, control, voice, video, sound, models, gaming, and the like. The foregoing terms are utilized interchangeably herein and with reference to the related drawings. Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g., a capacity to make inference based on complex mathematical formalisms), which can provide simulated vision, sound recognition and so forth.

In various implementations, the components described herein can perform actions online or offline. Online/offline can refer to states identifying connectivity between one or more components. In general, "online" indicates a state of connectivity, while "offline" indicates a disconnected state. For example, in an online mode, models and tags can be streamed from a first device (e.g., a server device) to a second device (e.g., a client device), such as streaming raw model data or rendered models. In another example, in an offline mode, models and tags can be generated and rendered on one device (e.g., a client device), such that the device does not receive data or instructions from a second device (e.g., a server device). While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

The digital 3D models described herein can include data representing positions, geometric shapes, curved surfaces, and the like. For example, a 3D model can include a collection of points represented by 3D coordinates, such as points in a 3D Euclidean space. The collection of points can be associated with each other (e.g., connected) by geometric entities. For example, a mesh comprising a series of triangles, lines, curved surfaces (e.g., non-uniform rational basis splines ("NURBS")), quads, n-grams, or other geometric shapes can connect the collection of points. In an aspect, portions of the mesh can include image data describing texture, color, intensity, and the like. In various embodiments, captured 2D images (or portions thereof) can be associated with portions of the mesh. The subject digital 3D models can thus be generated based on 2D image data, 2D sensory data, sensory data in combination with raw 2D data, 3D spatial data (e.g., spatial depth and distance information), computer generated positional data, and the like. In an aspect, data used to generate 3D models can be collected from scans (e.g., utilizing sensors) of real-world scenes, spaces (e.g., houses, office spaces, outdoor spaces, etc.), objects (e.g., furniture, decorations, goods, etc.), and the like. Data can also be generated based on computer implemented 3D modeling systems.

It is noted that the terms "3D model," "3D object," "3D display," "3D reconstruction," "3D representation," "3D rendering," "3D construct," and the like are employed interchangeably throughout, unless context warrants particular distinctions among the terms. It should be appreciated that such terms can refer to data representing an object, space, scene, and the like in three dimensions, which may or may not be displayed on an interface. In an aspect, a computing device, such as a graphic processing unit (GPU) can generate, based on the data, performable/viewable content in three dimensions. The terms "3D data," "3D imagery data," and like are employed interchangeably throughout, unless context warrants particular distinctions among the terms and can refer to data utilized to generate a 3D model, data describing a 3D model, data describing perspectives or points of view of a 3D model, capture data (e.g., sensory data, images, etc.), meta-data associated with a 3D model, and the like.

It is noted that the terms "2D model," "2D image(s)," and the like are employed interchangeably throughout, unless context warrants particular distinctions among the terms. It should be appreciated that such terms can refer to data representing an object, space, scene, and the like in two dimensions, which may or may not be displayed on an interface. The terms "2D data," "2D imagery data," and like are employed interchangeably throughout, unless context warrants particular distinctions among the terms and can refer to data describing a 2D image (e.g., meta-data), capture data associated with a 2D image, a 2D image, a representation of a 2D image, and the like. In an aspect, a computing device, such as a graphical processing unit (GPU), can generate, based on the data, performable/viewable content in two dimensions. In another aspect, 2D models can be generated based on captured image data, 3D imagery data, and the like. In embodiments, a 2D model can refer to a 2D representation of a 3D model, real-world scene, 3D object, or other 3D construct. As an example, a 2D model can comprise a 2D image, a set of 2D images, a panoramic 2D image, a set of panoramic 2D images, 2D data wrapped onto geometries, or other various 2D representations of 3D models.

In addition, terms such as "navigational position," "current position," "user position," and the like are employed interchangeably throughout, unless context warrants particular distinctions among the terms. It should be appreciated that such terms can refer to data representing a position relative to a digital 3D model during user navigation and the like. For example, in accordance with various embodiments, a 3D model can be viewed and rendered from various perspectives and/or fields of view of a virtual camera relative to the 3D model in association with navigation of the 3D model, applying tags to the 3D model, generating the 3D model, and the like. In some embodiments, different view or perspectives of the model can be generated based on interaction with the 3D model in one or more modes such, a walking mode, a dollhouse/orbit mode, a floor plan mode, a feature mode and the like. In an aspect, a user can provide input to a 3D modeling system and the 3D modeling system can facilitate navigation of a 3D model. As used herein, navigation of a 3D model can include altering a perspective and/or field of vision, as described in more detail below. For example, a perspective can rotate about a viewpoint (e.g., an axis or pivot point) or alternate between viewpoints, and a field of vision can enhance a region of a model, alter a size of a region of a model (e.g., "zoom in," or "zoom out," etc.), and the like.

Versions of a 3D model presented from different views or perspectives of the 3D model are referred to herein as representations or renderings of the 3D model. In various implementations, a representation of a 3D model can represent a volume of the 3D model, an area of the 3D model, or an object of the 3D model. A representation of a 3D model can include 2D image data, 3D image data or a combination of 2D and 3D image data. For example, in some implementations, a representation or rendering of a 3D model can be a 2D image or panorama associated with the 3D model from a specific perspective of a virtual camera located at a specific navigation position and orientation relative to the 3D model. In other implementations, a representation or rendering of a 3D model can be the 3D model or a part of the 3D model generated from a specific navigation position and orientation of a virtual camera relative to the 3D model and generated using aligned sets or subsets of captured 3D data employed to generate the 3D model. Still in other implementations, a representation or rendering of a 3D model can include a combination of 2D images and aligned 3D data sets associated with the 3D model.

Referring now to the drawings, FIG. 1 presents an example representation 100 of a 3D model of an environment, wherein the 3D model includes tags, in accordance with various aspects and embodiments described herein. In the embodiment shown, the environment is a kitchen included in an actual, physical home and the representation 100 is presented from a perspective of a virtual camera located within the home at a distant end of a 3D model of the kitchen. In various embodiments, representation 100 is rendered in a graphical user interface presented in a device display.

In one or more embodiments, a 3D model of the kitchen was generated using sets of 3D data captured via one or more 3D capture devices (e.g., cameras). The sets of 3D data can respectively include points associated with visual and/or spatial information (e.g., depth/distance information) that have been aligned relative to a 3D coordinate space. The 3D model provides a framework for user navigation through the space (e.g., the kitchen) as displayed to a user via an interface (e.g., a graphical user interface (GUI)). In various embodiments, the sets of 3D data are respectively associated with 2D images or panoramas of the environment captured by the one or more 3D capture devices at different positions and orientations relative to the 3D coordinate space.

For example, in one embodiment, the sets of 3D data employed to generate the 3D model of the kitchen were captured via a camera provided on a mobile device, such as a handheld smartphone or tablet that is capable of capturing 2D images along with depth or distance information for respective features included in the 2D images. According to this example, the sets of 3D data used to generate the 3D model can have been captured by a mobile capture device at different positions and orientations relative to the actual physical space (e.g., the kitchen) while a user holds the mobile capture device and walks around the actual physical space. For example, the user can have walked around the perimeter of the kitchen and captured different perspectives of the room from different points along the perimeter. The user could have also walked around the room and take close up views and different perspectives of objects included in the room (e.g., furniture).

Representation 100 can be or include 2D image data, 3D image data or a combination of 2D and 3D image data. For example, in some implementations, representation 100 can be or include a 2D image or panorama associated with the 3D model from a specific perspective of a virtual camera located at a specific navigation position and orientation relative to the 3D model of the kitchen. In other implementations, representation 100 can be or include the 3D model of the kitchen or a part of the 3D model generated from a specific navigation position and orientation of a virtual camera relative to the 3D model and generated using aligned sets or subsets of captured 3D data employed to generate the 3D model. Still in other implementations, representation 100 can be or include a combination of 2D images and aligned 3D data sets associated with the 3D model.

Representation 100 further includes tags respectively associated with different objects of the 3D model depicted in representation 100. For example, representation 100 includes three tag icons 102, 104 and 106, respectively associated with different kitchen appliances. Each of the tag icons 102, 104 and 106 represent tags including rich data or metadata. The rich data or metadata of each tag can include for example, text, images, 3D object, video, audio, hyperlinks, executable actions, and the like. Interaction with the respective tag icons 102, 104 and 106 can cause the tag data or metadata associated therewith to be presented or rendered to a user.

Figure 2:
FIG. 2 presents another example representation of the 3D model of the environment, wherein the representation includes a pop-up display window including tag data, in accordance with various aspects and embodiments described herein.

For example, FIG. 2 presents another example representation 200 of the 3D model of the environment (i.e., the kitchen), wherein the representation 200 includes a pop-up display window 202 including tag data. As shown in representations 100 and 200, tag icon 104 is associated with the kitchen refrigerator/freezer. The pop-up window 202 includes textual tag data therein associated with tag icon 104. According to this example, the textual tag data associated with tag icon 104 includes a detailed description of the refrigerator/freezer. In various implementations, representation 200 including the pop-up display window 202 is generated in response to movement of a cursor, stylus, finger (e.g., when representation 100 is displayed on a touch screen display), or the like, over or near icon 104 while viewing and interacting with representation 100 (e.g., in response to "hovering" over the tag icon 104). In one or more implementations, the pop-up display window 202 is overlaid onto representation 100.

Figure 3:
FIG. 3 presents another example representation of the 3D model of the environment, wherein the representation includes a pop-up display window including tag data, in accordance with various aspects and embodiments described herein.

FIG. 3 presents another example representation 300 of the 3D model of the environment (i.e., the kitchen), wherein the representation 300 includes the pop-up display window 202. Representation 300 is based on a new field of view and/or perspective of the 3D model of the kitchen that provides a close up view of the refrigerator/freezer (e.g., referred to herein as a "feature view"). Representation 300 can be or include a 2D image, aligned 3D data, or a combination of 2D and 3D imagery data. In various implementations, representation 300 is generated in response to selection of tag icon 104 (e.g., as opposed to merely hovering over the tag icon 104) when viewing representations 100 or 200. For example, in various implementations, selection of a tag icon (e.g., tag icons 102, 104, 106 and the like) can result in a rendering of the tag data or metadata associated therewith (e.g., via a pop-up display window or via another suitable visual or audible mechanism), and the generation of a close-up or feature view of the point, area or object the tag icon is associated with. Representation 300 also includes additional tag icons 302 and 304 for additional objects (e.g., a television, and a fireplace) included in the representation of the 3D model. For example, the close up or feature view of the refrigerator/freezer also includes a view of the television located on the wall next to the refrigerator/freezer and a closer view of the fireplace in a living room that adjoins to the kitchen. According to this example, when certain points, areas or objects included in a 3D model that are associated with tags are visibly included in a representation of the 3D model, tag icons for the tags can be displayed in the representation in a spatially aligned manner relative to the points, area or objects they are associated with.

With reference to FIGS. 1, 2 and 3, in various embodiments, the tags and associated tag icons presented in representations 100, 200 and 300 are pre-associated with the 3D model of the kitchen (e.g., associated with the 3D model prior to rendering representations 100, 200 and 300). For example, as described above, the 3D model of the kitchen can include aligned sets of 3D data captured from the actual physical kitchen via one or more 3D capture devices. In association with generation of the 3D model of the kitchen and/or after generation of the 3D model of the kitchen, various tags can be applied to the 3D model. The process of applying a tag to a 3D model involves identifying or selecting a point, area or object of the 3D model for association with a tag. In some implementations, the area or object can include a defined 3D volume or 3D object. The point, area or object is associated with position information that identifies a position of the point, area or object relative to the 3D coordinate space in which the 3D model is aligned. In various embodiments, when a tag (e.g., which can be or include data or metadata) is applied to the 3D model for association with the defined point, area or object, the tag is also associated with the position information for the point, area or object. A selectable tag icon or symbol (e.g., tag icons 102, 104 and 106) representative of the tag can further be generated and incorporated into the 3D model at or near the position of the defined point, area or object. Accordingly, the tag and tag icon become spatially aligned with the point, area or object relative to the 3D coordinate space and the 3D model. When a 3D representation of the 3D model is generated and/or presented that includes a view of the defined point, area or object (e.g., determined based on a selected perspective of the 3D model, a current navigation/viewing mode, and the position of the defined point, area or object relative to the 3D coordinate space or 3D model), the 3D representation can also include the spatially aligned tag icon associated with the point, area or object. Accordingly, a tag and its tag icon can be included in a particular representation or rendering of a 3D model (e.g., representations 100, 200, 300 and the like), based on association of the tag and its tag icon with a defined point, area or object of the 3D model.

By associating tags and their respective icons with defined coordinate positions or 3D volumes of a 3D model, the appropriate tags and tag icons can be presented in different renderings or representations of the 3D model generated based on different views or perspectives of the 3D model. Furthermore, the tags and their respective tag icons can remain spatially aligned relative to the 3D model in each of the different 3D representations and during transitions between the different 3D representations. Additional details regarding defining, viewing and interacting with tags in a 3D model is discussed infra with respect to the following figures.

Figure 4A:
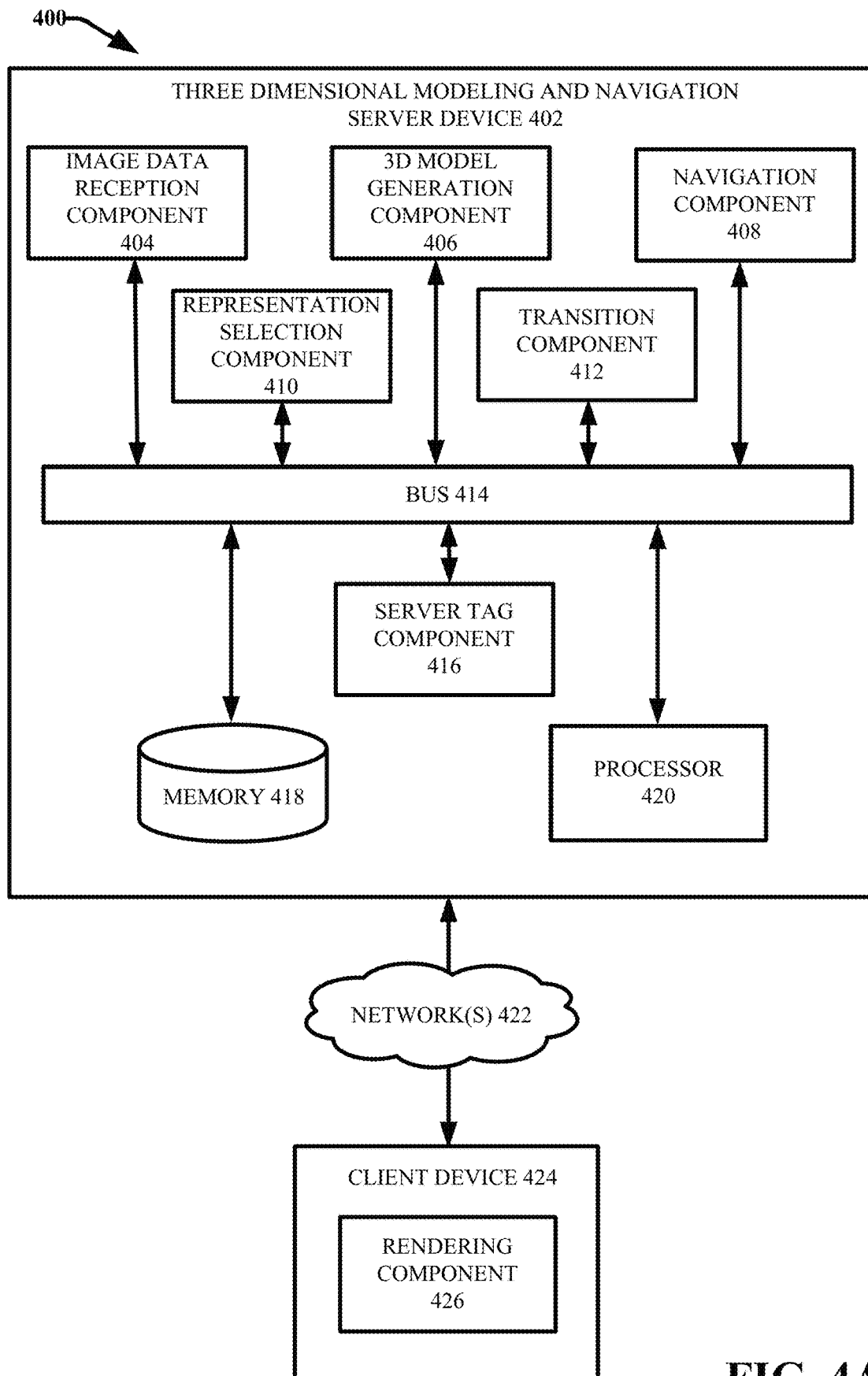
FIGS. 4A and 4B illustrate example systems that facilitate navigating and interacting with a 3D model including tags in accordance with various aspects and embodiments described herein.

FIG. 4A illustrates an example system 400 that facilitates navigating a 3D model including tags in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device (s), virtual machine(s), etc. can cause the machine(s) to perform the operations described.

In various embodiments, system 400 facilitates navigating and interacting with a 3D model including tags. For example, system 400 can provide an interactive graphical user interface including a 3D space model and allow the user to essentially walk through and/or orbit around the space to view the space from different perspectives and/or to view specific objects in the space from different perspectives. These different perspectives can include a 2D mono or stereo image of the space captured during the capture process as well as completely new 2D or 3D models of the space generated based on aligned 2D image data and 3D data captured during the capture process. In embodiments in which the 3D model includes tags, system 400 can facilitate spatially aligning tag icons for the tags in respective representations of the 3D model corresponding to different views of the 3D model and through transitions between the different views of the 3D model. System 400 can also facilitate user interaction with the tags via their tag icons and rendering of the tags. System 400 can also provide mechanisms for navigating the 3D model based on selection of tag icons.

In the embodiment shown, system 400 includes a 3D modeling and navigation server device 402 and a client device. The 3D modeling and navigation server device 402 can include various components that facilitate navigating and interacting with a 3D model including tags using a client device (e.g., client device 424). In one or more embodiments, these components can include but are not limited to, image data reception component 404, 3D model generation component 406, navigation component 408, representation selection component 410, transition component 412 and server tag component 416. The 3D modeling and navigation server device 402 can also include (or access at another device) memory 418 that stores computer executable components and processor 420 that executes the computer executable components stored in the memory. The 3D modeling and navigation server device 402 can also include a bus 414 that couples the various components of the 3D modeling and navigation server device 402, including, but not limited to, the image data reception component 404, the 3D model generation component 406, the navigation component 408, the representation selection component 410, the transition component 412, the server tag component 416, the memory 418 and the processor 420.

In accordance with one or more embodiments, the 3D modeling and navigation server device 402 and the client device 424 can be configured to operate in client/server relationship, wherein the 3D modeling and navigation server device 402 provides the client device 424 access to 3D modeling and navigation services via a network accessible platform (e.g., a website, a thin client application, etc.) using a browser or the like. For example, in various embodiments, the server device 402 can be configured to perform a majority of the processing associated with integrating tags with a 3D model and facilitating navigating and interacting with a 3D model including tags, and the client device 424 can be configured to render 3D model data and tag data provided by the server device 402 while performing minimal processing associated with integrating tags with the 3D model. However, system 400 is not limited to this architectural configuration. In particular, one or more components of the 3D modeling and navigation server device 402 can be provided on the client device 424 and vice versa. For example, in one implementation, the server device 402 can include the image data reception component 404 and the 3D model generation component 406 and the client device 424 can include the navigation component 408, the representation selection component 410, the transition component 412 and the rendering component 426. Still in another implementation, all components depicted in system 400 can be included on single device (e.g., the client device 424 or the server device 402). Further, the 3D modeling and navigation server device 402 can include any suitable device and is not limited to a device that operates as a "server" in a server/client relationship.

Figure 4B:
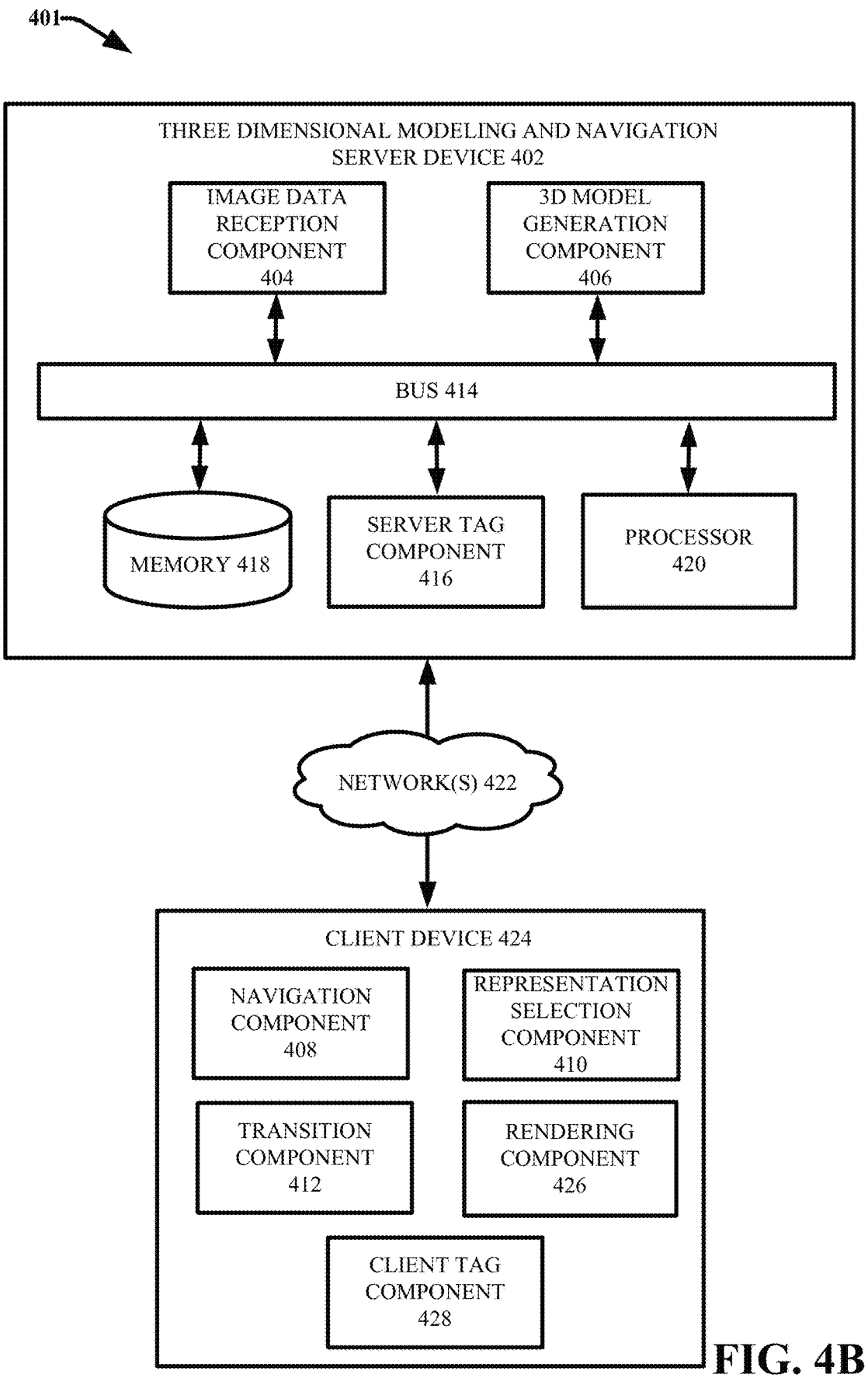

FIG. 4B illustrates another example system 401 that facilitates navigating and interacting with a 3D model including tags in accordance with various aspects and embodiments described herein. System 401 can include same or similar features as system 400, however in system 401, the navigation component 408, the representation selection component 410, and the transition component 412 are located on the client device 424. In addition, the client device 424 can include a client tag component 428. In some embodiments, the client tag component 428 can be configured to perform same or similar features and functionalities as the server tag component 416. In other embodiments, processing associated with tags (e.g., defining tags, applying tags and interacting with tags) can be distributed between the server tag component 416 and the client tag component 428. Although not shown, it should be appreciated that the client device 424 can include a memory to store computer executable components (e.g., navigation component 408, representation selection component 410, transition component 412, rendering component 426, client tag component 428 and the like) and a processor to execute the computer executable instructions.

With reference to FIGS. 4A and 4B, in accordance with one or more embodiments of systems 400 and 401, the 3D modeling and navigation server device 402 can provide (e.g., via streaming or via downloading) the client device 424 access to data stored by the 3D modeling and navigation server device 402 (e.g., in memory 418) to facilitate navigating, interacting with, and rendering a 3D model and tags associated with the 3D model. For example, the data can include but is not limited to: 3D models, representations of 3D models, 2D images associated with the 3D models, 3D data associated with the 3D models, capture position and orientation information, waypoints, tag icons, tags, tag position information, tag display information, and the like. In some embodiments, the 3D modeling and navigation server device 402 can employ a web based platform (e.g., a website, a thin client application, a thick client application, etc.) to provide 3D modeling data, tag data, and associated services to the client device 424. According to these embodiments, the client device 424 can include suitable hardware (e.g., a network interface card) and software (e.g., a browser, a thin client application, a thick client application, etc.) for accessing and interfacing with the 3D modeling and navigation server device 402.

The client device 424 can include any suitable computing device associated with a user and configured to facilitate rendering a 3D model or representation of the 3D model, navigating and interacting with the 3D model, and rendering and interacting with tags. For example, client device 424 can include a desktop computer, a laptop computer, a television, an Internet enabled television, a mobile phone, a smartphone, a tablet personal computer (PC), a personal digital assistant PDA, a heads-up display (HUD), virtual reality (VR) headset, augmented reality (AR) headset, or another type of wearable computing device. In some embodiments, the client device 424 can also include a 3D capture device configured to capture the 3D/2D data employed by the 3D modeling and navigation server device 402 to generate and render 3D and 2D representations of a real world object or environment in accordance with aspects and embodiments described herein. The client device 424 can include rendering component 426 to facilitate rendering 3D model data (e.g., a 3D model and representations of the 3D model) and tag data (e.g., tags and tag icons) via an interface at the client device. The rendering component 426 can include hardware (e.g., a display), software, or a combination of hardware and software, that facilitates rending a 3D model and associated representations as well as rendering tags and associated tag icons. In some implementations, the rendering component 426 can be or include a GUI. In other implementations, the rendering component 426 can be configured to generate 3D models and associated representations of the 3D models as stereo images for virtual reality.

The various devices and components of systems 400, 401 (and other systems described herein) can be connected either directly or via one or more networks 422. Such network(s) can include wired and wireless networks, including but not limited to, a cellular network, a wide area network (WAD, e.g., the Internet), a local area network (LAN), or a personal area network (PAN). For example, client device 424 can communicate with 3D modeling and navigation server device 402 (and vice versa) using virtually any desired wired or wireless technology, including, for example, cellular, WAN, wireless fidelity (Wi-Fi), Wi-Max, WLAN, and etc. In an aspect, one or more components of system 400 are configured to interact via disparate networks. In some embodiments, the 3D modeling and navigation server device 402 is included in a cloud-computing network. "Cloud computing" is a kind of network-based computing that provides shared processing resources and data to computers and other devices on-demand via a network (e.g., the one or more networks 422). It is a model for enabling ubiquitous, on-demand access to a shared pool of configurable computing resources (e.g., networks, servers, storage, applications and services), which can be rapidly provisioned and released with minimal management effort. Cloud computing and storage solutions provide users and enterprises with various capabilities to store and process their data in third-party data centers. As used in this disclosure, the terms "content consumer," "user," "author," and the like refer to a person, entity, system, or combination thereof that interfaces with system 400 (or additional systems described in this disclosure).

In accordance with various embodiments, the image data reception component 404 can be configured to receive input to facilitate generation of 3D models and different representations/renderings of the 3D models, including 3D imagery data and 2D imagery data. For example, the image data reception component 404 can receive raw 2D imagery data, sensory data, 3D imagery data, and the like. In some embodiments, the image data reception component 404 can receive a fully or partially generated 3D model or 2D model. It is noted that system image data reception component 404 can receive input, for example, from a capturing device, sensors, a memory store (e.g., database, storage medium, cloud storage, memory 418, etc.), user input, and the like. In various embodiments, the image data reception component 404 is configured to receive sets of 3D data captured from a real world object or environment by one or more 3D capture devices. The one or more 3D capture devices can include but are not limited to: a mobile 3D capture device (e.g., a camera included in a smartphone, tablet PC, wearable PC, etc.), a LIDAR, hand-held laser line scanner, structured light projectors paired with cameras such as the Microsoft® Kinect, other structured light systems, stereo cameras with software for depth derivation, stereo cameras paired with pattern projection systems as well as software for depth derivation, time-of-flight cameras, video cameras capable of structure-from-motion calculations, and lightfield cameras. Multiple capture devices may be combined or a capture device may be paired with a color camera to provide color detail for the captured 3D information.

In some embodiments, each set of the captured 3D data has one or more 2D images associated with it that have a determined position and orientation relative to a 3D coordinate space. For example, a set of 3D data can include information about the position and appearance of objects in a physical space, including the various objects or features of the internal space of a room or the structure of an object in the room. The position of the 3D data in each set can be mapped to the 3D coordinate space. The 3D data can also include information regarding the position and/or orientation of the capture device relative to the 3D coordinate space when the 3D data for each set was captured. The 3D data can include one or both of geometry and appearance information from points and/or regions of the real world object or environment. In an aspect, the sets of 3D data can respectively include points corresponding to image pixels, wherein the respective points are associated with position information indicating their position relative to the 3D coordinate space.

The 3D model generation component 406 can be configured to employ received 2D and 3D imagery data, such as a set of points, a geometric mesh, color data, capturing data (e.g., camera speed, rotation, camera type, etc), position data, and the like to generate a 3D model of the real world object or environment. For example, the 3D model generation component 406 can employ an alignment process to generate a 3D model. In an aspect, the 3D model generation component can generate 2D models based on 2D images, 3D imagery data, location data, and the like. In some embodiments, the 3D model generation component 406 can also employ the sets of 3D data to generate various representations (e.g., representations 100, 200, 300 and the like) of a 3D model from different perspectives or views of a virtual camera position outside or within the 3D model. In an aspect, these representations can include one or more of the captured 2D images and/or image data from one or more of the 2D images.

In one or more embodiments, the alignment process can involve determining position and visual feature data for respective points in received 3D data sets associated with known camera capture positions and orientations relative to a global 3D coordinate space or volume. The 3D data sets, feature data, associated 2D images, and other sensor data (if available) can then be used as inputs to an algorithm that determines potential alignments between the different 3D data sets via coordinate transformations. These potential alignments are evaluated for their quality and, once an alignment of sufficiently high relative or absolute quality is achieved, the 3D data sets may be aligned together. Through repeated alignments of new 3D data sets (as well as potential improvements to alignments of existing 3D data sets), a global alignment of all or most of the input 3D data sets into a single coordinate frame may be achieved. The alignment process can also employ 2D data to facilitate aligning two or more 3D data sets. Additional details regarding the alignment process are further provided in U.S. Pat. No. 8,879,828 filed on Jun. 29, 2012, and entitled "CAPTURING AND ALIGNING MULTIPLE 3-DIMENSIONAL SCENES," and U.S. Pat. No. 9,324,190 filed on Feb. 25, 2013 and entitled "CAPTURING AND ALIGNING THREE-DIMENSIONAL SCENES," the entireties of which are incorporated herein by reference.

In various implementations, the 3D model generation component 406 can also determine positions of objects, barriers, flat planes, and the like. For example, based on 3D imagery data, the 3D model generation component 406 can identify barriers, walls, objects (e.g., counter tops, furniture, etc.), or other features of the 3D imagery data. In an aspect, objects can be defined as solid objects such that they cannot be passed through when rendered (e.g., during navigation, transitioning between modes and the like). Defining objects as solid can facilitate aspects of navigation of a model by a user interacting with system 400. For example, a user can navigate through a 3D model of an interior living space. The living space can include walls, furniture, and other objects. As a user navigates through the model, they can be prevented from passing through a wall or other object and movement may also be constrained according to one or more configurable constraints (e.g., viewpoint kept at a specified height above a surface of the model or a defined floor). In an aspect, the constraints can be based at least in part on a mode (e.g., walking mode) or type of a model. It is noted that, in other embodiments, objects can be defined as not solid objects such that objects can be passed through (e.g., during navigation, transitioning between modes and the like).

In some embodiments, the 3D model generation component 406 can determine a set of viewpoints, rotational axes, and the like. For example, the 3D model generation component 406 can determine viewpoints based on camera poses, location data (e.g., relative location of one or more capturing devices or captured content), and the like. In an aspect, a viewpoint can include a viewpoint of a 2D image, a viewpoint of a 3D image or model, and the like. Viewpoints can contain position, orientation, and/or field of view information. The 3D model generation component 406 can also correlate 2D imagery data and 3D imagery data. For example, the 3D model generation component 406 can determine that 2D imagery data corresponds to a position associated with a 3D model, such as a coordinate of 3D planar space represented as an (X, Y, Z) coordinate, wherein X, Y and Z represent the position of a point relative to three perpendicular axes in a three-dimensional coordinate space. The position may also include information about orientation (e.g., a normal vector in an (X, Y, Z) coordinate system). Additional data may localize the position of different parts of the 2D imagery data within the 3D model. It is noted that various other naming conventions or positioning techniques can be utilized, such as defining a position relative to an origin point). In some embodiments, the 3D model generation component 406 can determine positions of corners of a 2D image in a 3D model, or the position, orientation, and field of view of a camera that captured a 2D image or 2D panoramic image. Such determinations may be used to create 2D imagery data for the 2D image.

In various embodiments, the 3D model generation component 406 can employ photogrammetry in association with generating a 3D model of an environment and/or representations of the 3D model based on captured 2D images and 3D data captured from the environment. For example, the 3D model generation component 406 can use a feature matching and bundle adjustment process from captured 2D images to recover the exact positions of surface points. Moreover, the 3D model generation component 406 can employ photogrammetry or Simultaneous Localization and Mapping (SLAM) to recover the motion pathways of designated reference points located on any moving object, on its components, and in the immediately adjacent environment to detect, measure and record 2D and 3D motion fields. SLAM algorithms feed measurements from remote sensing devices (e.g., image or depth sensors) and the results of imagery analysis into computational models in an attempt to successively estimate, with increasing accuracy, the actual, 3D relative motions of the camera.

The 3D model(s) generated by 3D model generation component 406 generally include one or more meshes of triangles, quads, and/or n-gons. The 3D model(s) can also include curved surfaces such as NURBS, which are a function of two parameters mapped to a common surface area in 3D space. In some aspects, the 3D model(s) can have associated color or material properties. For example, each vertex of a mesh can contain associated texture data in one or more separate images via UV mapping. Examples of common 3D model formats include ".obj", ".fbx", and ".dae." 3D models generated by 3D model generation component 406 can be rendered (e.g., generated and presented) at the client device 424 via rendering component 426.

The navigation component 408 can facilitate navigating a 3D space model after the 3D space model has been generated and/or in association with generation of the 3D space model. For example, the rendering component 426 can render a representation of the 3D model at the client device 424, (e.g., via an interface of the client device rendered on a display of the client device 424), and the navigation component 408 can provide navigation tools that allow a user to provide input that facilitates viewing different parts or perspectives of the 3D space model and interacting with the different parts of the 3D model, including tags and/or tag icons. These navigation tools can include but are not limited to: selecting a location on the representation of the 3D model for viewing (e.g., which can include a point, an area, an object, a room, a surface, etc.), selecting a location on the representation of the 3D model for positioning a virtual camera (e.g., including a waypoint), selecting an orientation for the virtual camera, selecting a field of view for the virtual camera, selecting a tag icon, moving a position of the virtual camera forward, backward, left, right, up or down), moving an orientation of the virtual camera (e.g., pan up, pan down, pan left, pan right), and selecting different viewing modes/contexts (described below). The various types of navigational tools described above allow a user to provide input indicating how to move a virtual camera relative to the 3D model to view the 3D model from a desired perspective. The navigation component 408 can further interpret received navigational input indicating a desired perspective for viewing the 3D model to facilitate determining representations of the 3D model for rendering based on the navigation input.

In one or more implementations, the navigation component 408 can provide different viewing modes or viewing contexts, including but not limited to, a walking mode, a dollhouse/orbit mode, a floor plan mode, and a feature view. Walking mode can refer to a mode for navigating and viewing a 3D model from viewpoints within the 3D model. The viewpoints can be based on a camera position, a point within a 3D model, a camera orientation, and the like. For example, in some embodiments, representations 100 and 200 were generated during walking mode. In an aspect, the walking mode can provide views of a 3D model that simulate a user walking through or otherwise traveling through the 3D model (e.g., a real-world scene). The user can rotate and move freely to view the scene from different angles, vantage points, heights, or perspectives. For example, the walking mode can provide perspectives of a 3D model from a virtual camera that corresponds to the eyes of a virtual user as the virtual user walks around the space of the 3D model (e.g., at a defined distance relative to a floor surface of the 3D model). In an aspect, during walking mode, the user may be constrained to have a camera viewpoint at a particular height above the model surface except when crouching or in the air (e.g., jumping, falling off an edge etc). In an aspect, collision checking or a navigation mesh can be applied such that users are restricted from passing through objects (e.g., furniture, walls, etc.). Walking mode can also consist of moving between waypoints, where the waypoints are associated with known positions of captured 2D imagery associated with the 3D model. For example, in association with navigating a 3D model in walking mode, a user can click or select a point or area in a 3D model for viewing and the navigation component 408 can determine a waypoint that is associated with a capture position of a 2D image associated with the point or area that provides an optimal view of the point or area. The representation selection component 408 can further select the 2D image for rendering at the client device 424 (e.g., via rendering component 426).

The dollhouse/orbit mode represents a mode wherein a user perceives the model such that the user is outside or above the model and can freely rotate a model about a central point as well as move the central point around the model. For example, the dollhouse/orbit mode can provide perspectives of a 3D model wherein a virtual camera is configured to view an internal environment from a position removed from the internal environment in a manner that resembles looking into a dollhouse (e.g., with one or more walls removed) at various pitches relative to a floor of the model. Multiple types of motion may be possible in dollhouse/orbit mode. For example, a viewpoint may be pitched up or down, rotated left or right around a vertical axis, zoomed in or out, or moved horizontally. The pitch, rotation-around-a-vertical-axis, and zoom motions may be relative to a central point, such as defined by an (X, Y, Z) coordinate. A vertical axis of rotation may pass through the central point. In the case of pitch and rotation-around-a-vertical-axis, those motions may maintain a constant distance to the central point. Thus, the pitch and rotation around-a-vertical-axis motions of the viewpoint may be thought of as vertical and horizontal travel, respectively, on the surface of a sphere centered on the central point. Zoom may be thought of as travel along the ray defined as passing through the viewpoint to the central point. The point on the 3D model with or without back-face culling or other ceiling removal techniques that is rendered in the center of the display may be used as the central point. Alternately, this central point may be defined by the point of a horizontal plane that is at the center of the display. This horizontal plane may be invisible, and its height may be defined by a global height of the floor of the 3D model. Alternately, a local floor height may be determined, and the intersection of the ray cast from the camera to the center of the display with the surface of the local floor height may be used to determine the central point.

The floor plan mode presents views of a 3D model that is orthogonal or substantially orthogonal to a floor of the 3D model (e.g., looking down at the model from directly above). The floor plan mode can represent a mode wherein the user perceives the model such that the user is outside or above the model. For example, a user can view all or a portion of a 3D model from an aerial vantage point. The 3D model can be moved or rotated about an axis. As an example, floor plan mode can correspond to a top down view, wherein the model is rendered such that a user looks directly down onto a model or at a fixed angle down onto the model (e.g., approximately ninety degrees above a floor or bottom plane of a model). In some implementations, a representation of a 3D model generated in floor plan mode can appear 2D or substantially 2D. The set of motion or navigation controls and mappings in floor plan mode may be a subset of those for dollhouse/orbit mode or total available controls of other models. For example, the controls for floor plan mode may be identical to those described in the context of orbital mode with the exception that the pitch is at a fix number of degrees downward. Rotation about a central point along a vertical axis is still possible as is zooming in and out toward and away from that point and moving the central point. The model may, however, only be viewed directly from above as a result of the fixing a pitch.

The feature view can provide perspectives of the 3D model from a narrower field of view than the dollhouse/orbit view context (e.g., a close-up view of a particular item or object of the 3D model). In particular, the feature view allows a user to navigate within and around the details of a scene. For example, with the feature view, a user can view different perspective of a single object included in the internal environment represented by a 3D model. In various embodiments, selection of a tag icon included in a 3D model or representation of the 3D model can result in generation of a feature view of the point, area or object associated with the tag icon (as described in greater detail infra).

The navigation component 408 can provide a mechanism for navigating within and between these different modes or perspectives of a 3D model based on discrete user gestures in either a virtual 3D space or screen-relative 2D coordinates. In some implementations, the navigation component 408 can provide navigational tools that allow a user to move a virtual camera relative to a 3D model using the various viewing modes described herein. For example, the navigation component 408 can provide and implement navigation controls that allow a user to change the position and orientation of the virtual camera relative to the 3D model as well as change the field of view of the virtual camera. In some implementations, the navigation component 408 can determine a desired position, orientation and/or field of view for the virtual camera relative to the 3D model based on received user navigational input relative to the 3D model or a visualization of the 3D model (including 2D images and mixed 2D/3D representations of the 3D model).

The representation selection component 410 can facilitate selecting and/or generating a representation of a 3D model for rendering at the client device 424 (e.g., via rendering component 426) based on navigational cues received by the navigation component 408. For example, in association with viewing a representation of a 3D model from a first perspective, a user can provide input selecting a specific location or region of the 3D representation the user would like to view, select a tag, select a different viewing modality, provide input indicating the user would like to pan the virtual camera left, right, up, down, etc., and the like. The navigation component 408 can interpret the user input and determine where and how to move the virtual camera away from the first perspective to a new perspective of the 3D model. For example, based on received navigational input indicating a desired perspective for viewing a 3D model, the navigation component 408 can determine a new position, orientation, and/or field of view for the virtual camera relative to the 3D model. The representation selection component 410 can then select or direct the 3D model generation component 406 to generate, a representation of the 3D model from the new position, orientation and field of view and the rendering component 426 can render the representation. In another example, the navigation component 408 can receive input indicating a location, an area, or an object in the 3D model for viewing and the representation selection component 410 can select and/or direct the 3D model generation component 406 to generate a representation of the 3D model that provides the best view of the location, area or object. In various implementations, such input can include selection of a tag icon or tag associated with the location, area or object (as described infra).

In various embodiments, the representation selection component 410 can select a 2D image or previously generated 3D representation of the 3D model that corresponds (or most closely corresponds) to the desired position, orientation and/or field of view of the 3D model. In other embodiments, the representation selection component 410 can direct the 3D model generation component 406 to generate a representation of the 3D model that combines two or more 2D images or 3D data and 2D image data and provides a perspective of the 3D model corresponding to the desired position, orientation and/or field of view of the virtual camera. Various techniques for selecting a 2D image for rendering based on received navigational input are described in U.S. patent application Ser. No. 14/219,906 filed on Mar. 19, 2014, and entitled "SELECTING TWO-DIMENSIONAL IMAGERY DATA FOR DISPLAY WITHIN A THREE-DIMENSIONAL MODEL" the entirety of which is incorporated herein by reference.

In association with facilitating selecting and/or generating representations of a 3D model in association with navigation of the 3D model, the 3D modeling and navigation server device 402 can retain the original captured camera information, positions, orientations, and imagery to provide high-quality imagery of specific areas of the model as the user navigates about it. In an exemplary embodiment, the high-quality imagery can include views of original 2D images from capture perspectives of the original captures. In addition, the high-quality imagery can include reconstructed 3D meshes of the model from different perspectives, and/or mixed 3D and 2D image data. These different perspectives can be based on the various modalities discussed above.

In some embodiments the 3D modeling and navigation server device 402 can provide (e.g., stream or via download) representations selected and/or generated based on navigational input to the client device 424 for rendering via rendering component 426. For example, after a representation is selected and/or generated based on received navigation input, the 3D modeling and navigation server device 402 can stream or otherwise provide the representation to the client device 424 for rendering. In other embodiments, the 3D modeling and navigation server device 402 can provide the client device 424 preloaded 3D model data prior to navigating the 3D model and/or prior to navigating to a particular area of the 3D model. For example, such preloaded data can include previously generated representations of the 3D model associated with predetermined perspectives of the 3D model and/or 2D image data and 3D data associated with the 3D model that enables the client device 424 to select and/or generate representations of the 3D model based on received navigational input. According to these implementations, the client device 424 can include the navigation component 408 and the representation selection component 410 (and possibly the 3D model generation component 406) to select and/or generate representations of the 3D model based on received navigational input using such preloaded data.

The transition component 412 can facilitate smooth transitions between different representations of a 3D model in association with navigation of the 3D model. Such smooth transitions can include transitions between different 3D representations of the 3D model and between 2D and 3D representations of the 3D model. In an aspect, the transition component 412 can employ various techniques to smoothly blend a first perspective of a 3D model to a second perspective of the 3D model. For example, in some implementations, the transition component 412 can generate and/or identify a sequence of imagery (e.g., including one or more representations of the 3D model) for displaying to a user between movement of a virtual camera from a first perspective of the 3D model to a second perspective of the 3D model. The imagery can include one or more different renderings or representations of the 3D model from a sequence of one or more viewpoints (e.g., including position, orientation and field of view) of the 3D model that naturally progress during movement of the virtual camera from the first perspective to the second perspective. The transition component 412 can further direct the rendering component 426 to render the sequence of imagery in different frames over a transition period of time (e.g., less than a few seconds) during movement of the virtual camera from the first perspective to the second perspective to generate a smooth visual transition from the first perspective to the second perspective. This allows smooth transitions between original imagery locations, and the ability to provide novel perspectives of the 3D model, including wider scene views than those made by the original scan images.

For such novel transition views, the transition component 412 can identify available 2D imagery from some number of original 2D image captures and the 3D model generation component 406 can project image data from the original camera location(s) onto 3D surface textures of a base 3D model/mesh, overlaying and replacing the base mesh texture with a strength based on correlation of the respective viewpoints to that of the original scan frames. For example, in an aspect, the transition component 412 can assign potential 2D image a weighted score similar but not identical to the "similarity" score used for navigation, and determined in real-time for each 2D image. For example, in or more embodiments, in association with selecting a 2D image for rendering based on navigational input, the transition component 412 is configured to compare a desired position and orientation for the virtual camera (e.g., determined based on received user input) relative to capture positions and orientations of available 2D images. The transition component 412 can further determine and assign a similarity score to the respective 2D images that accounts for a degree of similarity between the desired position and orientation of the virtual camera and the capture positions and orientations of the 2D images, wherein the closer the respective positions and orientations, the higher degree of similarity and the higher the similarity score. The transition component 412 and/or the representation selection component 410 can further select the 2D image associated with the highest similarity score as the "best match" and render that 2D image.

However, in association with projecting 2D image data onto an underlying 3D mesh of the 3D model to generate a novel representation of the 3D model, (e.g., not corresponding to an actual capture position and orientation of a 2D image), the transition component 412 and/or the representation selection component 410 does not have to employ such a high degree of scrutiny when selecting one or more 2D images for projection onto the 3D mesh. For example, given a chosen position and orientation for the virtual camera associated with a perspective of the 3D model that is not associated with an original 2D image capture position and orientation, the transition component 412 and/or the representation selection component 410 can look for 2D images of the 3D model that are associated with capture positions and orientations near the chosen capture position and orientation. However, it is more important that the capture orientation being close to the chosen orientation than the capture position being close to the chosen position. For example, as long as the capture orientation of a 2D image is substantially close to the chosen orientation, if the capture position is slightly off, the 2D image can still provide good 2D image data for projecting onto the 3D mesh. Accordingly, in some implementation, the transition component 412 can determine a weighted similarity score for 2D images having capture positions and orientations near a chosen virtual camera position and orientation, wherein the orientation factor is more heavily weighted than the position factor. Thus a first 2D image having a closer capture orientation to the chosen orientation relative to a second 2D image yet having a same capture position as the second 2D image will be given a higher weighed similarity score. In some implementations, transition component 412 and/or the representation selection component 410 can select a subset (of one or more) of the 2D images having the highest weighted similarity scores for projecting onto the 3D mesh. The 3D model generation component 406 can further blend the projections onto the underlying mesh (and one another) in order from highest to lowest weighted similarity scores so that optimal imagery get precedence. Edge boundaries between projected frames are also smoothly blended to avoid apparent mismatches with one another or the geometry, thus providing optimal fidelity for all novel views (in the reductive, minimum case where the camera exactly matches an original view location, the exactness of that view will reach the maximum, and no other lower-ranked projections will be visible—the original view will be exactly recreated).

In various embodiments, the server tag component 416 can facilitate associating tags with a 3D model generated by 3D model generation component 406. In some embodiments, the server tag component 416 can also integrate tags and/or tag icons in a 3D model and/or representations of the 3D model that are selected, generated and/or rendered in association with navigation of the 3D model. For example, in some aspects the server tag component 416 can embed a tag and/or tag icon in a representation of the 3D model that is provided to the client device 424 for rendering by the rendering component 426. In other embodiments, the client device 424 can include client tag component 428 to facilitate integrating tags and/or tag icons with representations of a 3D model that are rendered at the client device in association with navigation of the 3D model. The client tag component 428 can also facilitate rendering/displaying tags that have been associated or integrated with a representation of a 3D model that is rendered at the client device 424.

As described herein, a tag refers to data or metadata that is associated with a specific point, area or object of a digital 3D model that provides information related to the specific point, area or object. Generally, a tag can be used to describe or provide additional information (e.g., semantic information, emotional information, historical information, incidental information, etc.) regarding the point, area or object with which it is associated. In one or more embodiments, a tag can include but is not limited to, text, images, 3D objects, video, audio, hyperlinks, applications, executable objects, and the like.

For example, in one or more implementations, a tag entry for a point of interest in a 3D model may provide any amount of textual information associated with the point of interest, such as title, byline, description, details, summary or report. In another example, a tag associated with a point of interest can identify any number of images associated with the point of interest, including photorealistic and panorama images. In another example, a tag associated with a point of interest can include audio associated with the point of interest, a video associated the point of interest, 360° panorama associated with the point of interest, or a combination of image, video and audio associated with the point of interest. In another example, a tag associated with a point of interest can include a hyperlink to external websites, as indicated by a uniform resource locator (URL) or uniform resource identifier (URI). In another example, a tag associated with a point of interest can include an advertisement or ecommerce solicitation, such as a call to action or click through link to buy a product associated with the point of interest. In another example, a tag associated with a point of interest can include a block of HTML code and/or Javascript for the point of interest. In another example, a tag associated with a point of interest can include a crosslink between two or more points of interest in the 3D model, or a crosslink from one point of interest to a set or sequence of other points of interest in the 3D model. In yet another example, a tag associated with a point of interest in a 3D model can include a link to another 3D model, or specific components of another 3D space model, including points of interest in the other 3D model. In another example, a tag for a point of interest in a 3D model can include information that describes a person, or group or set of people, associated with the point of interest. In yet another example, a tag associated with a point of interest can include an actual physical address associated with a point of interest, a time stamp, duration, period or era associated with the point of interest. In another example, a tag associated with a point of interest can include information identifying a number of queries into a local or remote database system associated with the point of interest. In another example, a tag associated with a point of interest in a 3D model can include information identifying potential modifications to the 3D model, such as lighting or texture.

In some embodiments, a tag can be or include an application or executable object that facilitates performing an action or task associated with the point, area or object that the tag is associated with. For instance, in one implementation, the tag can provide parameters and methods for remotely controlling an electronically operated physical object (e.g., an appliance, a sensor, etc.) associated with a point of interest, such as in home automation. For example, a tag that is associated with an appliance in a 3D model of a home can include an application or executable object that that provides for remotely controlling the appliance in the actual physical home. According to this example, selection of a tag icon associated with the appliance can result in launching or opening the application and facilitate remotely controlling the appliance.

In other embodiment, a tag associated can include social a tag that reflects social interaction with a tagged point, area or object. According to this embodiment, a tag associated with a point, area or object can be or include an application or executable object that facilitates social interaction regarding the tagged point, area or object. For example, the application or executable object can allow a user to comment on the tagged object, provide a review on the tagged object, vote on the tagged object, mark the tagged object as "liked" or "disliked." According to this example, various types of social interaction with a tagged point, area or object can be aggregated over time and associated with the tagged point, area or object. Thus the "social" a tag associated with a tagged object can change over time as more users interact with the tagged object. For example, the social a tag associated with a particular object can provide social information aggregated for the tagged object, including but not limited to: compiled reviews and comments on the tagged object, compiled voting opinions or ratings for the tagged object, number of users that liked or disliked the tagged object, identities of users that liked/disliked the tagged object, etc. Similarly, information regarding user interaction with tagged points, area or objects included in a 3D model, such as number of users that viewed the object, number of users that liked a tagged object, number of users that commented on a tagged object etc. can be aggregated overtime and associated with the 3D model.

The type of tag (e.g., data or metadata) that is associated with a particular point, area or object included in a 3D model can vary based on the type of 3D model, the purpose of the tag and the personal preferences of the author or system that defines and applies the tag. For example, text associated with a particular object in a 3D model can provide information such as a description of the object, an origin of the object, a date associated with the object, a creator of the object, a cost of the object, and the like. In some implementations, the text can be rendered in an audible or spoken form. In another example, tag data that includes audio associated with a particular object can include a sound associated with the object (e.g., a barking sound associated with a dog, or music associated with a particular room or location in a scene). In another example, tag data can include a short video clip or images associated with a particular object in a 3D model that provides a demonstration regarding the object, such as a demonstration of how the object is made or how the object functions. In another example, tag data can include hyperlinks that link to additional information about a point, area or object included in a 3D model at an external source (e.g., a website, an application, etc.). In some embodiments, tag data can include hyperlinks that link to different views or representations of the 3D model or different views or representations of other 3D models.

In general, a tag can be applied to or associated with a point, area or object in a 3D model. For example, in some implementations, a tag can be associated with a discrete 3D point associated with a 3D model. A tag can also be associated with a group of 2D or 3D points on or within a 3D model. In another example, a tag can be associated with a face/surface or set of faces/surfaces included in the 3D model. In another example, a tag can be associated with an edge of group of edges situated on a structural surface of the 3D model. In another example, a tag can be associated with a volume, or a group of volumes, enclosed or containing one or more structural surfaces in a 3D model. A tag can also be associated with an area or volume of free space in the model. A tag can also be applied to or associated with a visual image or subset of images which are components of a 3D model. In another aspect, a tag can be associated with a specific viewpoint relative to the 3D model. For instance, when applied to an architectural building, a tag can be associated with a particular viewpoint of the building, a room in the building, a wall in the building, fixture in the building, a piece of furniture in the building, a decoration in the building, and the like.

In various embodiments, the process of applying a tag to a 3D model involves selecting or identifying the point, area or object directly on the 3D model or a representation of the 3D model. The server tag component 416 can further invoke the visual and structural qualities of the point, area or object to precisely locate the 3D coordinate position (e.g., relative to the 3D model and/or the 3D coordinate space in which the 3D model is aligned) and geometric elements that comprise it. For example, the server tag component 416 can identify a single coordinate point of the 3D model to associate with the tag or a group of coordinate points of the 3D model that form an area or volume associated with the tag, such as an area or volume associated with an object in the 3D model, a surface in the 3D model, a room in the 3D model, and the like. In some embodiments, (discussed infra with reference to FIG. 22), the server tag component 416 can automatically apply tags to points, areas or objects included in a 3D model.

In various embodiments, once a tag has been associated with a point, area or object in a 3D model, the server tag component 416 can store information (e.g., in memory 418 or another memory accessible to the 3D modeling and navigation server device 402) that identifies the tag and the 3D coordinate position (or 3D coordinate area or volume) of the point, area, or object relative to the 3D model and the 3D coordinate space in which the 3D model is aligned. The server tag component 416 can further store the tag and/or information identifying where to access the tag as stored at another location. In some embodiments, the server tag component 416 can embed information directly into respective locations in the 3D model identifying tags associated therewith.

The server tag component 416 and/or the client tag component 428 can further employ information associating tags with defined points, areas or objects in a 3D model to facilitate rendering/displaying the tags in association with viewing and navigating the 3D model. In particular, in various embodiments, tags can be represented in visual renderings or representations of a 3D model using visual 2D or 3D icons, symbols or markers, referred to herein as tag icons, that are visually integrated into or onto the visual renderings or representation of the 3D model (e.g., as an overly, embedded into the representation, or otherwise visually included in the representation). These tag icons can be selectable, wherein selection of a tag icon causes the tag associated therewith to be rendered (e.g., at the client device 424 at which the respective representations included in the tag icons are rendered). According to these embodiments, the tag icons that respectively represent tags associated with defined points, areas, or objects of a 3D model can be spatially aligned with the defined points, areas or objects as included in different representations of the 3D model that are rendered in association with navigation of the 3D model. For example, in some implementations a representation of a 3D model can represent a volume of a 3D model from a particular perspective of a virtual camera relative to the 3D model. In some aspects, if the representation volume includes a defined point, area or object associated with a tag, a tag icon can be integrated into or onto the representation at or near a position corresponding to the defined position of the point, area or object in the representation. Accordingly, the tag icon will appear in the representation at a spatially aligned position relative to the defined coordinate position of the point, area or object the tag represented by the tag icon, is located in the representation. For example, as shown in example representations 100, 200 and 300, tags included in the respective representations are depicted by 2D circular tag icons (e.g., tag icons 102, 104, 106, 302 and 304). Each of the tag icons are spatially aligned with the objects that they are associated with. For example, the tag icon 104 associated with the refrigerator is located near the center of the surface of the refrigerator.

In other embodiments, tags may be spatially integrated in a representation of a 3D model yet not represented by tag icons. For example, in one embodiment, tags can be associated with points, areas or objects included in representations of a 3D model and activated/rendered based in part in response to user interaction with the points, areas or objects in the model. For example, a tag can be associated with a point area or object included in a rendered representation of a 3D model and spatially aligned with the point area or object in the representation. The tag can further be rendered (e.g., via rendering component 426) based on navigation to or near the point, area or object. For example, a tag associated with an appliance included in a representation of a 3D model can be rendered in response to movement of a cursor, finger, stylus, gaze, etc., over the appliance or near the appliance within a defined distance away from the appliance. In some implementations, the rendering component 426 can also be configured to highlight or otherwise draw attention to the point, area or object based on navigation to the point, area or object. A highlighted point, area or object can further be selected to render the tag associated therewith. For instance, in furtherance to the example above, based on movement of a cursor, finger, stylus, etc., over or near an appliance associated with a tag, the rendering component 426 can be configured to highlight the appliance to indicate the appliance is associated with a tag. Once the appliance is highlighted, the user can select the highlighted appliance to view the tag associated therewith.

In another embodiment, tags can be directly embedded into representations of a 3D model. For example, a tag can be or be included within a 2D or 3D object that is integrated into or onto a representation and spatially aligned with the point, area or object it describes. For instance, a tag can include an image that is depicted in a 2D window included in the representation. In another example, a tag can include a hyperlink that is directly embedded within the 3D model. Still in yet another example, a tag can include a video or image with a transparent background that is overlaid onto a representation of the 3D model and spatially aligned to match the representation of the 3D model. For instance, a tag can include a video of a location depicted in a representation of a 3D model. The video can further be aligned with the location as included in the representation such that the boundaries between the video and the representation are seamless. The video can further begin playing based in part on movement of a cursor, stylus, finger, etc., near the location.

In some embodiments, the point, area of object associated with a tag in a representation of a 3D model can be highlighted or defined using 2D and/or 3D elements. In particular, the manner in which a 3D point or group of 3D points is represented in a 3D space model may be similar to, or independent from, the manner in which a tag icon representative of a tag pertaining to the 3D point or group of 3D points is represented. For example, a 3D space model itself may be represented using any combination of 3D modeling techniques including solid modeling, surface modeling, polygonal or mesh modeling, octrees, particle systems, procedural modeling, wireframe, and so on, and using standard public or proprietary computational structures and formats including but not limited: to WebGL, OpenGL, NURBS (non-uniform rational B-splines), COLLADA, IGES, or other methods. On the other hand, a tag icon associated with a point or area of interest in the 3D space model may utilize any of the aforementioned 3D structures and formats, or standard public or proprietary 2D structures and formats, such as HTML/CSS page layouts, PDF, JPG, GIF or public or proprietary time-based audio and video formats such as MPEG, MP3, PCM audio, or HTML5 video, or any novel conglomerate or extension of these methods.

For example, with reference again to FIG. 2, in various embodiments, representation 200 can depict a particular perspective of a 3D model (e.g., of an entire house including the kitchen, the living room, and various additional rooms and features). In some implementations, representation 200 can include a 2D image captured of the kitchen from the particular perspective shown. In other implementations, representation 200 can include be generated using combination of procedural, textural and mesh modeling techniques, formatted and rendered by WebGL API components. The associated tag icons 102 and 104 are depicted as circles or disks. In one example embodiment, these tag icons are 3D textured sprites rendered using the WebGL API, while the associated display window 202 emanating from tag icon 104 appears as an overlay formatted and rendered using web standard HTML and CSS methods. In another embodiment, the tag icons 102 can be represented with a 2D GIF image, while the tag that is associated therewith (e.g., which is included in display window 202) can be included in 3D wireframe font against a 3D surface model using a proprietary solid modeling system to represent and render the final result.

With reference back to FIGS. 4A and 4B, in various embodiments, the server tag component 416, the client tag component 428 and/or the rendering component 426 can facilitate integrating tags and/or tag icons that represent the tags in respective representations of a 3D model rendered in association with navigation of the 3D model. The tags and/or their tag icons can be displayed in the representations such that they are spatially aligned with the defined points, areas or objects of the 3D model that they are respectively associated with. In particular, a tag and/or its tag icon can be displayed in a representation of a 3D model based on inclusion of the point, area or object that the tag is associated with in the representation. The tag and/or its tag icon can further be spatially aligned in the representation such that the tag and/or its tag icon appears at or near the relative position of the point, area or object that the tag is associated with as included in the 3D representation. The exact position of a tag icon relative to the position of the tag that it is associated with as displayed in a representation of a 3D model can vary. In some implementations, described infra, a user can define how and where a tag icon should appear relative to the point, area or object it is associated with as rendered in a representation of the 3D model. Accordingly, when navigating a 3D model including tags, the tags and/or the tag icons will be spatially situated in the right place in the different views of the 3D model, including transitional views.

In some embodiments, the server tag component 416, the client tag component 428 and/or the rendering component 426 can integrate tags and/or tag icons with respective representations of a 3D model during navigation of the 3D model. For example, after a representation of a 3D model is selected and/or generated based on navigation input, the server tag component 416, the client tag component 428 and/or the rendering component 426 can determine whether the representation includes a defined points associated with a tag and integrate the tag and/or its tag icon into or onto the rendered representation. For example, as described above, when tags are associated with a 3D model, the tags are associated with defined 3D coordinate points, areas or volumes of the 3D model. Accordingly, in some embodiments, in association with selecting or generating a particular representation of a 3D model for rendering based on navigational input, the server tag component 416 and/or the client tag component 428 can determine one or more points, areas or objects of the 3D model included in the representation having tags associated therewith based on defined positions of the points, areas or objects relative to the 3D model and 3D coordinate space in which the 3D model is aligned. In implementations in which the tags are represented by tag icons, the server tag component 416 and/or the client tag component 428 can integrate the tag icons at or near the defined positions as included in the representation. The rendering component 426 can further render the representation with the spatially aligned tag icons. Alternatively, the server tag component 416 and/or the client tag component 428 can provide the rendering component 426 with information identifying where and how to integrate the tag icons in the representation and the rendering component 426 can integrate the tags icons accordingly. The server tag component 416 can further provide the client tag component 428 with the respective tags associated with the respective representations and any information regarding how and when to display the tags (e.g., based on user interaction their tag icons, as described infra), and the rendering component 426 can further render the tags accordingly.

In other implementations in which the tags are not represented by tag icons and are rendered based on navigation to or near the point, area or object a tag is associated with, the server tag component 416 can provide the client tag component 428 with information identifying relative positions of the tags in the representation and any additional information defining how and when to render the tags (e.g., based on movement of a cursor over the object and/or selection of the object once highlighted, and the like). The server tag component 416 can further provide the client tag component 428 with the respective tags associated with the respective representations and the rendering component 428 can render the tags accordingly. Still in other embodiments, the server tag component 416 and/or the client tag component 428 can receive the tags and embed the tags directly into the representation based on the relative positions of point, areas, or objects that the tags are associated with as included in the representation. According to these embodiments, the tags will simply appear in a rendered representation of the 3D model in their spatially aligned positions without user interaction with the representation.

In other embodiments, the server tag component 416 can associate tags and/or their tag icons at spatially aligned positions in predetermined representations of the 3D model. For example, prior to receiving user navigation input indicating a desired view of a 3D model, the representation selection component 410 and/or the 3D model generation component 406 can select and/or generate a plurality of potential representations of the 3D model corresponding to different views or perspectives of the 3D model. For each potential representation of the 3D model, the server tag component 416 can determine a 2D area and/or 3D volume of the 3D model included in the representation. The server tag component 416 can further identify, (e.g., via data stored in memory 418), one or defined more points, areas or objects included in the 2D area or 3D volume that are associated with tags. In one implementation, the server tag component 416 can further integrate the tags and/or tag icons for the tags into the representation at spatially aligned positions in the representation by aligning the tags and/or their icons with the positions of their defined points, areas or objects as included in the representation. According to this implementation, a representation provided to the rendering component 426 for rendering will already have the tags and/or their tag icons integrated therein. In another implementation, the server tag component 416 can generate tag information for the representation identifying the tags associated therewith and their spatially aligned positions in the representation. According to this implementation, the rendering component 426 can integrate tags and/or their tag icons with a rendered representation based on the tag information associated therewith.

Thus the server tag component 416, the client tag component 428 and the rendering component 426 can provide for generating and rendering representations of the 3D model with tag icons that are spatially aligned with defined points, areas or objects in the respective representations. Accordingly, any view of the 3D model that includes a point, area or object associated with a tag can include a tag icon spatially aligned with the point, area or object (e.g., in 2D or 3D). The transition component 412 can also generate smooth transitions between different perspectives of the 3D model that correspond to representations of the 3D model that include tag icons. For example, the transition component 412 can ensure tag icons are spatially aligned with points, areas or objects having tags associated therewith included in a sequence of one or more respective 2D and/or 3D imagery (e.g., representations) of the 3D model corresponding to one or more viewpoints of the 3D model between a transition of the 3D model from a first perspective to a second perspective.

In some embodiments, the location of a tag icon relative to the point, area or object of the 3D model that it is associated with is fixed. For example, a tag icon associated with living room couch may be fixed at a coordinate position a distance X above the center point of the couch. According to these embodiments, in some implementations, a point, area or object associated with a tag may be included in volume that of a 3D model represented by a representation, however based on the perspective of the representation, the point, area or object may be blocked or partially blocked by another component, object, or part of the representation.

Accordingly, the server tag component 416, the client tag component 428, and/or the rendering component 426 can be configured to occlude or partially occlude tag icons associated with points, areas or objects that are blocked or partially blocked by another component, object or part of the representation. In other words, when visually integrating tags and/or tag icons into a representation of a 3D model, the server tag component 416, the client tag component 428, and/or the rendering component 426 can be configured to occlude or partially occlude a tag or its tag icon based on relative position of the tag/tag icon, the positions of other objects included in the representation, and the line of sight from the virtual camera to the position of the tag given the perspective of the 3D model viewed by the representation. For example, with reference to FIG. 3 and representation 300, based on the perspective of the 3D model shown, the tag icon 304 for the fireplace is partially occluded by the decorative piece on the coffee table. Accordingly, the tag icon 304 is partially occluded. Further, with reference to FIG. 2 and representation 200, the tag icon 304 for the fireplace is completely occluded because the defined position associated with the tag icon (e.g., the base of the fireplace) is completely blocked by the distal kitchen island.

In other embodiments, the location of a tag icon relative to a point, object or area that it describes can be dynamically adapted based on the particular perspective of the 3D model captured by a particular representation of the 3D model. For example, in some embodiments, the server tag component 416, the client tag component 428 and/or the rendering component 426 can position a tag icon associated with a point, area or object included in a representation of a 3D model such that a view of the tag icon is not obstructed by another tag icon or another object or area in the representation. For example, with reference again to FIG. 3 and representation 300, tag icon 304 is spatially aligned (e.g., in 3D) with the fireplace based on the perspective of the representation 300 relative to the 3D model. However, the visible appearance of tag icon 304 is partially obstructed by the decorative piece located on the coffee table in front of the fireplace. In some embodiments, the server tag component 416, the client tag component 428 and/or the rendering component 426 can automatically and dynamically move the position of the tag icon 304 in representation 300 such that it is still spatially aligned with the fireplace, yet not obstructed by another object or icon in the representation. Thus in some embodiments, the server tag component 416, the client tag component 428 and/or the rendering component 426 can also be configured to determine where to spatially position a particular tag icon in a representation of a 3D model based on a defined spatial location of the point, area or object in the representation associated with the icon and relative spatial locations of other points, area or objects and/or associated tag icons.

The appearance of a tag icon can also vary dynamically based on the spatial position of the point, area or object it is associated with in a representation of a 3D model. For example, in some embodiments, the size or scale of the tag icon can be adapted to have an appropriate size based on the perspective of the 3D model and the resulting spatial location of the point, area or object associated with the tag icon. According to this example, tag icons for elements situated closer to the viewer in 3D space can be relatively larger than elements further from the viewer. For example, with reference to FIG. 1 and representation 100, tag icon 102 associated with the warming tray in the kitchen is depicted larger in size relative to the tag icons for the refrigerator/freezer and the wine fridge (e.g., tag icons 104 and 106) because the refrigerator/freezer and the wine fridge are located farther from the viewer relative to the warming tray in the perspective of the 3D model represented by representation 100. Thus in some embodiments, the server tag component 416 and/or the rendering component 408 can also be configured to determine a size of a tag icon for displaying in a representation of the 3D model based on a distance or depth of the object from the viewer. In various embodiments, while the tag icon size may vary according to closeness to the virtual camera to the tag, the server tag component 416 can restrict the minimum and maximum size for a tag icon so that it does not appear too small or too large relative to other displayed objects in any given panorama or image. For example, the server tag component 416 and/or the rendering component 426 can determine an appropriate size for a tag icon based on a defined range of possible tag sizes and relative distances of the virtual camera to the tag icon.

In some embodiments, the server tag component 416, the client tag component 428 and/or the rendering component 426 can further be configured to visually integrate tag icons in representations of a 3D model such that the tag icons are user facing regardless of the orientation of the point, area or object that they are associated with. According to these embodiments, whether the tag icon is a 2D icon or a 3D icon, a front surface of the tag icon can be presented to the viewer regardless of the orientation of the point, area or object relative to the viewer. In particular, a tag icon can be associated with a 3D volume or 3D object that can be viewed from various perspectives relative to the 3D volume or 3D object. For example, a tag icon can be associated with a 3D chair that can be viewed from different perspectives 360 degrees around a virtual vertical axis positioned through the center of the chair. Thus different sides and faces of the chair can be displayed at different angles and orientations relative to the viewer in different representations. However, regardless of the view of the chair, the tag icon associated with the chair can be rendered such that a front surface of the tag always has a same orientation relative to the viewer.

In some embodiments, tag icons can also include reference lines that connect a tag icon to the point, area or object that it is associated with. These reference lines are referred to herein as "stems." For example, with reference again to FIG. 3 and representation 300, tag icons 104 and 106 respectively include stems that connect the circular tag icons 104 and 106 to the objects (e.g., the refrigerator/freezer and wind fridge, respectively), that they describe. The inclusion of a stem with a tag icon can vary based on preferences of the author or entity that applies a tag, and/or the spatial position of the point, area or object associated with the tag in a representation of the 3D model. For example, in association with applying a tag to a 3D model, the user or system applying the tag can select an appearance of the tag icon for the tag, a location of the tag icon, apply a stem to the tag icon, adjust a length of the stem, and defined display conditions for the tag icon. In some implementations, stems are helpful to specifically identify an object associated with a tag icon (e.g., as opposed to a point or an area associated with a tag icon). For example, a tag icon that describes a floor in a room can include a stem that connects to the floor of the room to indicate the tag icon is specifically associated with the floor. However a tag icon that is associated with the entire room in general may not include a stem so that the tag icon appears to be floating in the center of the room, unattached to any particular object.

The size, shape and appearance of a tag icon can vary. In some embodiments, the size, shape and appearance of a tag icon for a tag can be tailored based on the preferences of the author or system that applies the tag. For example, the author can select a particular symbol to represent a tag, a size of the symbol, a dimension of the symbol, a color of the symbol, an opacity or skew of the symbol and the like. In other implementations, different types of tag icons and/or appearances of tag icons can be employed to differentiate between characteristic of the tag represented by the tag icon. For example, different types or colors of tag icons can be employed to identify different authors or entities that applied the tag. In another example, different types or colors of tag icons can be employed to designate the type of the tag data or metadata of the tag, such as whether the tag provides text data, image data, audio data, video data, hyperlink data, etc. For instance, a music symbol can be employed to represent tag data that includes music or a picture of film tape or a video camera can be employed to represent tag data that includes a video. In another example, different types or colors of tag icons can be employed to designate a class or category associated with a tag. In another example, different types or colors of tag icons can be employed to indicate a timestamp associated with a tag.

In some implementations, the appearance of a tag icon can vary depending on the manner or context in which the 3D model is consumed. For example, alternate appearances and/or type of tags can be displayed depending on the client device (e.g., client device 424) at which representations of the 3D model are presented (e.g., based on a dimension or characteristic of the client device display). For example, a tag icon for a same object associated with a 3D model can be displayed with a first appearance and dimension when viewed on a tablet display and a second appearance and dimension when viewed with a virtual reality headset. In another example, the appearance of a tag icon can vary based on the user viewing and navigating about the 3D model. For example, the type and appearance of a tag icon can vary based on a preference of the user or a demographic characteristic of the user. Still in another example, the appearance of a tag icon can vary based on a context of the client device at which the 3D model is being presented. For example, the context can include but is not limited to, a location of the client device, a mobility state of the client device (e.g., stationary, walking, driving, etc.), a time of day, a day of the year, and other possible contextual factors. Accordingly, the server tag component 416, the client tag component 428, and/or the rendering component 426 can be configured to determine an appearance of a tag icon for displaying in a representation of a 3D model based on various factors, including but not limited to: a defined appearance of the tag icon, a client device at which the tag icon is displayed, a preference of a viewer to which the tag icon is displayed, a demographic characteristic of the viewer, a viewing context, and the like.

In some implementations, the server tag component 416, the client tag component 428 and/or the rendering component 426 can be configured to visually integrate tag icons for tags respectively associated with points, areas or objects in a 3D model based on information defining how and when to display the tag icons. For example, in one implementation, (discussed in greater detail infra with reference to FIG. 11), the server tag component 416 can provide a mechanism that allows a user to interact with a 3D model and apply and define tags for the 3D model. The server tag component 416 can also allow a user to provide input that defines how and when the tag and associated tag icon should appear during navigation of the 3D model. In other implementations, (discussed in greater detail infra with reference to FIG. 22), the server tag component 416 can facilitate automatic application of tags and associated tag icons to a 3D model and provide for automatically defining how and when the tags and associated tag icons are presented to end users during navigation of the 3D model.

The particular tags and associated tag icons that are included in a representation of a 3D model that is presented to a user can also vary based on various factors, including factors related to preferences of the author or entity that applied the tag as well as factors related to the user viewing/consuming the 3D model and the viewing context. For example, various points, areas or objects in a model can be associated with different tags. In addition, a single point, area or object in a 3D model can be associated with multiple tags. The particular set or subset of tags and associated tag icons associated with a 3D model that are presented to an end user can vary based on characteristics of the end user (e.g., preferences, demographics, etc.), the client device at which the 3D model is presented, and a viewing context (e.g., location, time of day, day of year, mobility state, etc.). In some embodiments, an entity that applied the tags or otherwise has authority regarding how the tags and associated tag icons are rendered to end users can specify when one or more of the tags and associated tag icons are presented to end users. The server tag component 416, the client tag component 428, and/or the rendering component 426 can further integrate and/or display the tags and associated tag icons in representation of the 3D model accordingly. For example, the entity can customize the particular tags and/or tag icons that are presented to end users based on a characteristic of the end user (e.g., a preference, a profile, a demographic characteristic, etc.), a characteristic of the client device (e.g., type and size of display), a viewing context (e.g., including location, time of day, time of year, mobility state, etc.), and the like.

According to this embodiment, the server tag component 416, the client tag component 428 and/or the rendering component 426 can be configured to integrate and/or display a particular set of tags and/or tag icons associated with a 3D model based on preferences and demographic traits of the viewer, the client device of the viewer, and the context of the viewer. For example, tags and associated tag icons associated with a 3D model of building regarding the structural characteristics and conditions of the building may be relevant to a contractor but not an interior decorator. Likewise, features regarding dimensions of the space, colors of the walls, and the like may be relevant to an interior decorator but not a contractor. According to this example, the tags associated with the structural characteristics and conditions of the building can be configured for presentation to a contractor viewing a 3D model of the building while tags associated with dimensions and colors of the space can be removed (or not presented to the contractor). Likewise, the tags associated with dimensions and colors of the space can be provided to the interior decorator while tags associated with the structural characteristics and conditions of the building can be removed (or not presented to the interior decorator). It should be appreciated that the type or class of tag presented to an end user (e.g., a tag including text, a tag including images, a tag including video, a tag including audio, a tag including hyperlinks) can also vary based on characteristics of the end user, characteristics of the client device, and/or a viewing context.

In addition to integrating and/or displaying different tags or subsets of the tags and associated tag icons associated with a 3D model based on the particular user, client device, and/or viewing context of the 3D model, in some embodiments, the server tag component 416, the client tag component 428, and/or the rendering component 426 can display tags and associated tag icons in representations of a 3D model based on input provided by the viewer regarding whether and how to display certain tags and associated tag icons during consumption of the 3D model. For example, a viewer of the 3D model can provide input requesting all tags associated with a 3D model to be disabled. According to this example, when the user views the 3D model, although tags are still associated with the 3D model, tag icons for the tags can be removed from display during consumption of the 3D model by the user. In another example, rather than disabling all tags, systems 400, 401 and the like can allow the viewer to provide filter criteria that identifies specific types and/or characteristics associated with tags or tag icons for displaying to the viewer. For example, the filter criteria can identify a type of tag (e.g., a text based tag, an image based tag, a hyperlink based tag, etc), an author associated with the tag, timestamp associated with the tag, etc.

In some embodiments, the particular tag icons that are presented to an end user in association with navigation of a 3D model, and the timing of presentation of the tag icons during navigation of the 3D model can also be based on predefined navigational cues. For example, a particular tag and associated tag icon associated with an object in a 3D model can be configured for displaying only in response to viewing a particular room including the object or viewing the particular room or object from a particular perspective and/or viewing mode (e.g., walking mode, dollhouse/orbit mode, floor plan mode, etc.). In another example, a particular tag and associated tag icon can be configured for displaying only in response to navigation to a highlighted area of the 3D model. Thus in some embodiments, the server tag component 416, the client tag component 428 and/or the rendering component 426 can be configured to determine when and how to render a particular tag and associated tag icons in a representation of a 3D model based on predefined navigational cues.

Still in other embodiments, a tag icon associated with a particular object or area in a 3D model can be configured for presentation based on an amount of the object or area that is included in a representation of the 3D model. For example, a tag icon associated with an object or area of a 3D model can be configured for displaying in a representation of the 3D model if more than X percent of the object or area is visible in the representation, where X is a number less than or equal to 100 (e.g., 1%, 10%, 25%, 50%, 75%, etc.). In another embodiment, a tag icon associated with a particular point, area or object in a 3D model can be configured for presentation based on spatial distance or depth of the point, area or object in a representation of the 3D model relative to the position of the virtual camera from which the representation is based. For example, a tag icon can be configured for displaying only if the spatial depth or distance is less than Y, where Y is a number. According to this example, tag icons for points, area or objects included in a representation of a 3D model yet located relatively far from the viewer (e.g., in the far distance of the representation) can be hidden. However, as these points, areas or objects become closer to the viewer as the viewer navigates the 3D model, the tag icons associated therewith can be displayed. Thus in some embodiments, the server tag component 416 and/or the rendering component 426 can also be configured to determine when and how to render a particular tag and associated tag icon based on an amount of the object associated with the tag icon appearing in a representation of the 3D model and/or a distance or depth of the object from the viewer.

The description above associated with the server tag component 416, the client tag component 428 and/or the rendering component 426 described various techniques regarding how, where, and when a tag and/or its tag icon is integrated and/or displayed with a representation of a 3D model in association with navigation of the 3D model. However, in many embodiments, the rendering component 426 can render a tag associated with a tag icon included in a representation of a 3D model based on interaction with the tag icon. For example, in some embodiments, the rendering component 426 can be configured to render a tag associated with a tag icon in response to movement of a cursor, stylus, finger, etc. over or near the tag icon. In another example, the rendering component 426 can be configured to render a tag associated with a tag icon in response to a gesture that indicate pointing or looking at a tag icon. In another example, the rendering component 426 can be configured to render a tag associated with a tag icon in response to input that indicates selection of the tag icon. Likewise, in implementations in which a tag is not represented by a tag icon, although the tag may be integrated with a representation, the tag can be rendered based on interaction with the point, area or object the tag is associated with.

Accordingly, in various embodiments, in association with receiving, selecting and/or generating a representation of a 3D model including spatially aligned tags and/or tag icons, the client tag component 428 can receive the respective tags from the server tag component 416. The rendering component 426 can further render the tags based on interaction with the tag icons or objects respectively associated therewith as included in the rendered representation. In other embodiments, the client tag component 428 can access tags at the 3D modeling and navigation server device 402 and receive the tags for rendering in response to selection of a tag icon (or selection of an object associated with tag). In another embodiment, the 3D modeling and navigation server device 402 can provide (e.g., via download) the client device 424 with all tags associated with the 3D model prior to navigation. Still in other embodiments, the 3D modeling and navigation server device 402 can stream or otherwise provide the client device 424 with tags that are likely to be selected by the user (e.g., based on machine learning, based on a current navigation path, based on preferences of the user, etc.). These embodiments are described in greater detail infra with respect to FIG. 10 and streaming component 1002.

The manner in which a tag represented by a tag icon is presented or rendered to a user (e.g., via rendering component 426) can vary depending on the contents of the tag, predefined presentation parameters and features and functionalities of the client device 424 at which a tag is rendered. For example, in response to selection of a tag icon, depending on the contents of the tag associated with the tag icon, the rendering component 426 may provide/present a 2D or panoramic image, provide and/or play a video, provide and/or play a sound bite, provide a 3D object and facilitate interacting with the 3D object, or provide a hyperlink. In some implementations in which a tag is associated with a hyperlink, an executable action or application, selection of a tag icon can facilitate opening or running the hyperlink or application or taking additional scripted actions. For example, selection of a tag icon for a tag that is or includes a querying application can open the querying application and facilitates searching internal and/or external databases for information related to the object associated with the tag. In another example, selection of a tag icon that is or includes another application can initiate running of the other application. In another example, selection of a tag icon that is or includes a link to a vendor can initiate a purchase of the object associated with the tag icon. In another example, selection of a tag icon that is or includes a remote control application can initiate the remote control application and facilitate remotely controlling a device associated with or represented by the object in the 3D model that the tag icon is associated with.

In some embodiments, the rendering component 426 can provide or present a tag in a 2D frame, such as a pop-up display window, iframe, billboard, banner, etc., that is overlaid onto the representation of the 3D model (e.g., display window 202 as shown in representations 200 and 300). The pop-up display window, iframe, billboard, banner, etc., can further be located near or attached to the tag icon that it is associated with. In some embodiments, the pop-up icon or iframe can be spatially aligned relative to the tag icon that it is associated with. In various implementations, the server tag component 416 and/or the rendering component 426 can determine the position, size, orientation and appearance of the 2D frame according to the constraints of the enclosing viewport to ensure that the associated a tag can be viewed wholly and without overlap, regardless of the location of its corresponding tag icon. For example, the server tag component 416 and/or the rendering component 426 can determine a position and dimension of the pop-up display window based on the spatial location of other tag icons and/or objects included in the representation such that a view of the pop-up display window or iframe does not overlap or underlap another tag icon or underlap another object. The color and opacity of the 2D frame and/or the data/metadata (e.g., text, images, video, hyperlinks, etc.) included therein can also vary to facilitate optimal viewing of the representation of the 3D model and the tag.

In other embodiments, the tag can be rendered in a separate window, side panel, iframe, billboard, banner, tab or area of the user interface or display that does not overlay the representation of the 3D model. For example, in one embodiment, the tag can be included in a side panel, a slide-down panel, a flip-up panel, etc., that is aligned to the borders of the viewport. Still in other embodiments, the tag can be rendered at another device separated from the client device (e.g., client device 424) at which the representation is presented. In some implementations, the manner in which the data/metadata associated with a tag icon is rendered to a user can vary based on the type of the tag. For example, tag data that includes an audio description or sound can be rendered as audio without the usage of a pop-up display window. In another embodiment, tag data that includes a video or animation can be configured for displaying in a larger display window relative to a window for tag data that only includes text or a hyperlink.

In various embodiments, a user may interact with tag icons embedded in a 3D space model while manually navigating through the model, such as using computer mouse clicks, keyboard strokes, tapping on a touch sensitive mobile device, gestures or gaze interfaces in a VR headset, and the like. Alternatively, a user may interact with tag icons of a 3D model during the progress of an automated "tour" through the 3D space model (e.g., a video, animation or slideshow that provides a sequence of representations of the 3D model). In an aspect, interaction with tag icons during an automated tour can cause the tour to pause to allow for detailed interaction with the tags respectively associated with the tag icons. The tour can further resume where it left off in response to closing of the pop-up display window including the tag or passage of a defined period of time after presentation of the pop-up display window, then resuming the tour where it left off.

In some implementations, the navigation component 408 can provide various modes for viewing, activating and engaging with tag icons in association with navigation of a 3D model. For example, the navigation component 408 can allow a user to navigate through and about a 3D model that includes tags in various navigation modes, such as walking mode, dollhouse/orbit mode, floor plan mode, and feature view mode. Throughout these navigational modes, the user may be presented with different representations of the 3D model with spatially aligned tag icons integrated therein or thereon for tags that have been previously applied to points, areas, and/or objects of the 3D model. Accordingly, the viewer can become aware of the space and the points, areas or objects in the space that are associated with tags. In various embodiments, when a user navigates about a 3D model and merely views tag icons included therein, as opposed to selecting the tag icons, hovering over the tag icons or otherwise interacting with the tag icons, this is referred to herein as a "passive mode." In some implementations, a viewer can further interact with a tag icon by moving a mouse, cursor, stylus, finger, etc., over (e.g., hovering over) or near the tag icon, yet not selecting the tag icon. This manner of interacting with tag icons is referred to herein as "browse mode." In an aspect, interaction with a tag icon in browse mode (e.g., hovering over a tag icon without selecting it) can cause a pop-up window or iframe including the tag associated therewith to be displayed. For example, the tag data/metadata included in the pop-up window or iframe displayed during browse mode can include a shortened or summarized version of the tag associated with the tag icon. During browse mode, the pop-up window or iframe can also be removed from display as the viewer navigates away from the tag icon (e.g., as the viewer moves the mouse, cursor, stylus, finger, etc., away from the tag icon).

A viewer can further interact with a tag icon by clicking on or otherwise selecting the tag icon (e.g., as opposed to merely hovering over the tag icon). This type of interaction with a tag icon is referred to herein as "examine mode." In an aspect, in response to selection of a tag icon, the rendering component 426 can be configured to render the tag associated therewith in a more highlighted way relative to the browse mode. For example, the rendering component 426 can be configured to render the tag in a display window that is larger and/or includes more detail about the tag or data associated with the tag relative to the browse mode. In another example, the rendering component 426 can be configured to display the tag in a window that remains in the viewer until the user dismisses the window or minimizes the window. In addition, in some implementations, a tag that is rendered in response to selection of its tag icon can be provided in a display window and allow the user to further interact with the tag data included in the display window (e.g., reading detailed textual information, looking at related 2D images, listening to audio, watching video clips, viewing 360° panoramic imagery of the point, area or object, accessing related hyperlinked web pages, etc.).

In some embodiments, in association with rendering a tag in response to selection of the tag icon associated therewith, the rendering component 426 can be configured to render a "feature view" of the point, area or object associated with the tag. A "feature view" refers to a representation of the 3D model that provides a predefined view of a particular point, area or object of a 3D model associated with a tag that is rendered in response to selection of the tag icon associated with the object. In an aspect, the feature view of a point, area or object provides a view of the point, area or object that is considered the "best view" of the particular point, area or object. For example, a representation of a 3D model that corresponds to a feature view of a tagged point, area or object can include the tagged point, area or object in the center and forefront of the display interface and offer detailed engagement with the tag. In another example, the feature view of an object can provide a close-up view of the object presented along with a close-up and/or enlarged view of the pop-up display window including the tag. Accordingly, in response to selection of a tag icon associated with a point, area or object included in a representation, the representation selection component 410 can select, and/or direct the 3D model generation component 406 to generate, a representation of the 3D model that provides a feature view of the point, area or object and the rendering component can render the feature view representation. The rendering component 426 can further provide a seamless smooth transition from the previous representation and the feature view representation.

In various embodiments, the location, orientation, and field of view of a virtual camera that provides a feature view representation of a tagged point, area or object can be predefined or based on one or more predefined parameters. For example, the predefined parameters can include but are not limited to: a location of the object in the 3D model relative to other objects in the 3D model, a size of the object, a type of the object, a surface of the object, and the like. For example, in one or more embodiments, when a feature view is triggered, the representation selection component 410 select, or direct the 3D model generation component 406 to generate, a representation from a perspective of the virtual camera relative to the 3D model that minimizes the distance between the virtual camera and the point, area or object while ensuring the entire point, area or object is visible. In another example, the representation selection component 410 select, or direct the 3D model generation component 406 to generate, a representation from a perspective of the virtual camera relative to the 3D model that is within a particular angle (e.g., a perpendicular angle) relative to a primary surface (e.g., the front surface) of a tagged object.

In some embodiments, interaction with a particular tag icon can trigger a response associated one or more related tags. For example, in some implementations, tags can be grouped based on various factors. For instance, tags may be grouped based on association with a same room, a same type of object, a same date, a same manufacturer, a same price factor, a same author, a same decorator, etc. According to these embodiments, selection of or interaction with one of the tag icons for a tag included in a defined group can cause any number of other the tags in the group to take on a particular state, such as becoming activated, highlighted, hidden, changed in size, shape, or position, etc. For example, in one implementation, selection of one tag icon for a tag included in a group of tags can result in the tag icons for only the tags in the group to be displayed. Other tag icons in the model not associated with the group can be removed from display or displayed in a lighter or more transparent color. In another example, selection of one tag icon for a tag included in a group of tags can result in the tag icons for only the tags in the group to be highlighted. In another example, selection of one tag icon for a tag included in a group of tags can result in the tag for all tags in the group to be displayed in a side panel.

The manner in which a tag is removed from display (e.g., via rendering component 426) can also vary. For example, in some embodiments, a pop-up display window or iframe including a tag can be configured to remain displayed until user input is received that closes the pop-up display window or iframe. In another example, a pop-up display window or iframe can be configured to remain displayed until user for a defined period of time. In another example, a pop-up display window or iframe can be configured to be removed from display in response to navigational cues, such as navigation away from the tag icon associated with the pop-up display window. In another example, a pop-up display window or iframe can be configured to be removed from display in response to selection of a new tag icon or selection of a new viewing/navigation mode. In another example, a pop-up display window or iframe can be configured to be removed from display in response to user input results in generation and/or rendering of a new representation of the 3D model (e.g., a new view/perspective of the 3D model). In some implementations, only a single pop-up display window or iframe including a tag can be configured to be displayed in association with a representation of a 3D model at a time.

FIGS. 5A-5F illustrate a sequence of example representations 501-506 of a 3D model generated and/or rendered by rendering component 426 in association with a transition between different views of the 3D model in response to selection of a tag icon in accordance with various aspects and embodiments described herein. The various representations 501-506 can be or include 2D images associated with the 3D model, a 3D reconstruction of the 3D model, or a combination of 3D reconstructions and 2D imagery. Repetitive description of like elements employed in respective embodiments described herein is omitted for sake of brevity.

Figure 5A:
FIGS. 5A-5F illustrate a sequence of example representations of a 3D model generated in association with a transition between different views of the 3D model in response to selection of a tag icon in accordance with various aspects and embodiments described herein.
Figure 5B:
Figure 5C:
Figure 5D:
Figure 5E:
Figure 5F:

With reference initially to FIG. 5A, representation 501 includes a feature view of the refrigerator/freezer of the kitchen. Representation 501 includes pop-up window 500 including a tag associated with tag icon 304 for the fireplace of the living room located behind the kitchen. In an aspect, the pop-up display window 500 was generated/rendered in response to movement of a cursor, stylus, finger, etc., over or near tag icon 304 when viewing and interacting with representation 300. Thus in an aspect, representation 501 is a version of representation 300 with pop-up display window 500 integrated thereon as an overlay.

FIGS. 5B, 5C, 5D, 5E and 5F provide a sequence of different example representations 502, 503, 504, 505 and 506, respectively, of a 3D model of an interior space of a house (e.g., including at least the kitchen and living room depicted) generated/rendered in response to selection of tag icon 304 from representation 501 or 300. As shown in FIGS. 5B-5F, the respective representations 502, 503, 504, 505 and 506 correspond to different perspectives of a virtual camera relative to the 3D model as the virtual camera moves a first perspective of the 3D model corresponding to representation 501 (e.g., a close-up view of the refrigerator/freezer in the kitchen) to a second perspective of the 3D model corresponding to representation 506 (e.g., a close-up view of the fireplace in the living room) over a defined period of time (e.g., less than 3 seconds). According to this example demonstration, the rendering component 426 can be configured to render a close-up or feature view of the point, area or object associated with a tag icon in response to selection of the tag icon. The sequence of representations 501-506 provides a smooth visual transition between representations 501 and 506. It should be appreciated that although the number and appearance of transition representations depicted in FIGS. 5A-5F is merely exemplary and that the number and appearance of transition representations can vary. For example, representations 501-506 can be only a snapshot of a few intermediate frames displayed in a sequences of N number of continuous frames over a defined transition period (e.g., less than 3 seconds), wherein each frame is smoothly blended to the next.

As shown in FIGS. 5A-5F, in addition to the tag icons being spatially aligned in representations 501 and 506, the tag icons (e.g., tag icons 104, 106, 302, and/or 304) are also spatially aligned throughout each of the transition representations 502-505. It should be appreciated that the transition representations 502-505 are merely example transition imagery that can be rendered in association with the transition between representation 501 and 506 and that the number of transition representations generated between different views of a 3D model can vary.

Figure 6:
FIG. 6 present an example mechanism for transitioning from viewing a representation of a 3D model including tags in feature view mode to viewing another representation of the 3D model in different mode, in accordance with various aspects and embodiments described herein.

FIG. 6 presents an example mechanism for transitioning from viewing a representation (e.g., representation 506) of a 3D model including tags in feature view mode to viewing another representation of the 3D model in another mode (e.g., floor plan mode), in accordance with various aspects and embodiments described herein. FIG. 6 presents an enlarged view of representation 506. In an aspect, the navigation component 408 can transition between different modes for viewing and navigating a 3D model (e.g., walking mode, dollhouse/orbit mode, floor plan mode, and feature view) based on reception of user input selecting a particular viewing mode. For example, as shown in FIG. 6, an interactive "change view" icon 601 is provided at the bottom of the user interface. Selection of the change view icon 601 can result in change from viewing the model in the current viewing mode, the feature view, to a different viewing mode (e.g., floor plan mode, dollhouse mode, walking mode, etc.).

Figure 7:
FIG. 7 presents an example representation of a 3D model including tags in floor plan mode in accordance with various aspects and embodiments described herein.

FIG. 7 presents an example representation 700 of a 3D model including tags and rendered in floor plan mode in accordance with various aspects and embodiments described herein. Representation 700 can be or include a 2D image associated with the 3D model, a 3D reconstruction of the 3D model, or a combination of 3D reconstructions and 2D imagery. Repetitive description of like elements employed in respective embodiments described herein is omitted for sake of brevity.

In an embodiment, representation 700 can be rendered via rendering component 426 in response to selection of the change view icon 601 when viewing representation 506. As shown in representation 700, the floor plan view of the 3D model includes a top-down or orthogonal view of an entire 3D model of a house including the kitchen, living room and fireplace presented in representations 100, 200, 300, 501-506, respectively, and the like. In an aspect, when transitioning between different viewing modes in association with selection of a tag icon, the representation selection component 410 can be configured to determine a representation of the 3D model for displaying based in part on the spatial location of the tag icon and/or the point, area or object associated therewith. For example, representation 700 includes a top-down view of the fireplace associated with tag icon 304 which was previously provided in the forefront of the display in representation 506. Thus in an aspect, the following representation of the 3D model, representation 700, includes at least a centered or partially centered view of the point, area or object featured in the previous representation as a result of selection of a tag icon associated therewith (which in this case is the fireplace). In the embodiment shown, the rendering component 426 can also locate the cursor icon 702 (which is depicted as an enlarged circular ring) at a position corresponding to the previous position of the virtual camera associated with the previous representation of the 3D model.

Representation 700 also includes tag icons associated with the 3D model in the correct spatial location relative to the 3D model and the objects they are respectively associated with. For example, tag icons 102, 104, 106, 302 and 304, are respectively spatially located at or near the objects they describe (e.g., the warming tray, the refrigerator/freezer, the wine fridge, the television, and the fireplace, respectively). In addition, representation 700 includes tag icons 704 and 706 associated with other objects of the 3D model that are now included in representation 700 of the 3D model. Each of the tag icons displayed in representation 700 are a similar size because they are respectively viewed from substantially the same depth or distance relative to the position of the virtual camera. It is also noted that the perspective of the tag icons is user facing even though the perspective of 3D model is from above in floor plan mode.

In an aspect, the navigation component 408 can facilitate interacting with the tag icons in representation 700 in any navigation mode, such as in passive mode, browse mode, and examine mode. The interface associated with representation 700 also includes control icons that facilitate navigating the representation 700 and/or the 3D model. For example, a user can change view of the 3D model from the current floor plan mode to the dollhouse mode via selection of change view icon 708. In an aspect, selection of the walking icon 710 can result in generation of a new representation of the 3D model in walking mode. In addition, selection of any of the tag icons 102, 104, 106, 302, 304, 704 and 706 can result in the generation of a feature view representation of the 3D model and the object respectively associated with the selected tag icon.

Figure 8:
FIG. 8 presents an example representation of a 3D model including tags in dollhouse mode in accordance with various aspects and embodiments described herein.

FIG. 8 presents an example representation 800 of a 3D model including tags and rendered in dollhouse mode in accordance with various aspects and embodiments described herein. Representation 800 can be or include a 2D image associated with the 3D model, a 3D reconstruction of the 3D model, or a combination of 3D reconstructions and 2D imagery. Repetitive description of like elements employed in respective embodiments described herein is omitted for sake of brevity.

In an embodiment, representation 800 can be rendered via rendering component 426 in response to selection of the dollhouse change view icon 708 when viewing representation 700. As shown in representation 800, the dollhouse view of the 3D model includes a view of the 3D model from a position of a virtual camera located outside of the 3D model at an angled view relative to a side-wall of the 3D model with the side-wall removed (e.g., via backface culling). Similar to representation 700, when transitioning between different viewing modes (e.g., floor plan mode to dollhouse mode) in association with a selection of a tag icon (e.g., tag icon 304), the representation selection component 410 can be configured to select (or direct 3D model generation component 406 to generate) a particular representation of the 3D model for rendering based in part on the spatial location of the tag icon and/or the point, area or object associated therewith. For example, representation 800 includes a side view of the fireplace based in part due to selection of the tag icon for the fireplace (e.g., tag icon 304, not shown) in association with the previous representation 700. Thus in an aspect, the following representation of the 3D model, representation 800, includes at least a centered or partially centered view of the point, area or object featured in the previous representation as a result of selection of a tag icon associated therewith (which in this case is the fireplace)

. In the embodiment shown, the rendering component 426 can also locate the cursor icon 702 (which is depicted as an enlarged circle within another circle) at a position corresponding to a previous position of the virtual camera associated with a previous representation of the 3D model (e.g., representation 506).

Representation 800 also includes tag icons associated with the 3D model in the correct spatial location relative to the 3D model and the objects they are respectively associated with. For example, tag icons 102, 104, 106, 302, 704 and 706 are respectively spatially located at or near the objects they describe. In addition, representation 800 includes tag icons 802, 804 and 806 associated with other objects in the 3D model that are now included in representation 800 of the 3D model. It is also noted that the perspective of the tag icons is user facing, even though the perspective of 3D model is from above in a different viewing mode. In an aspect, the navigation component 408 can also facilitate interacting with the tag icons in representation 800 in various navigation modes, such as passive mode, browse mode, and examine mode.

FIGS. 9A-9G illustrate another sequence of example representations 901-907 of a 3D model generated in association with a transition between different views of the 3D model associated with different viewing modes (e.g., dollhouse mode and feature view) in response to selection of a tag icon in accordance with various aspects and embodiments described herein. The various representations 901-907 can be or include a 2D image associated with the 3D model, a 3D reconstruction of the 3D model, or a combination of 3D reconstructions and 2D imagery. Repetitive description of like elements employed in respective embodiments described herein is omitted for sake of brevity.

Figure 9A:
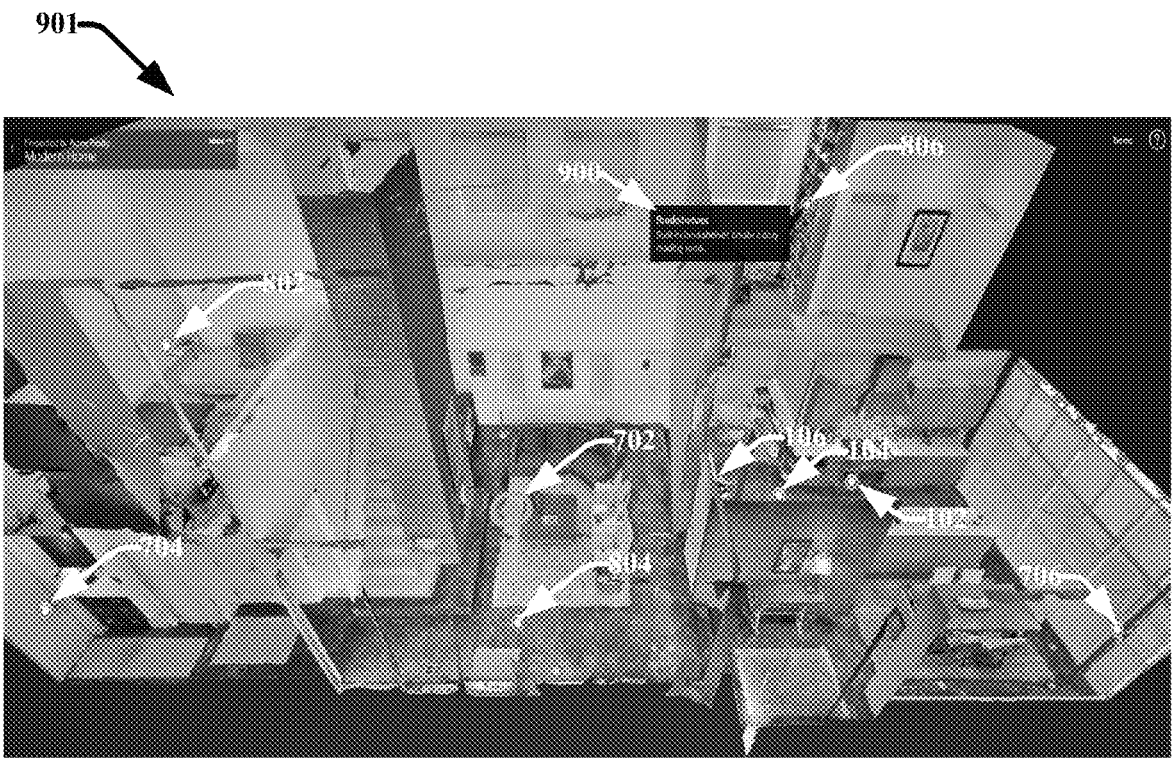
FIGS. 9A-9G illustrate another sequence of example representations of a 3D model generated in association with a transition between different views of the 3D model in response to selection of a tag icon in accordance with various aspects and embodiments described herein.
Figure 9B:
Figure 9C:
Figure 9D:
Figure 9E:
Figure 9F:
Figure 9G:
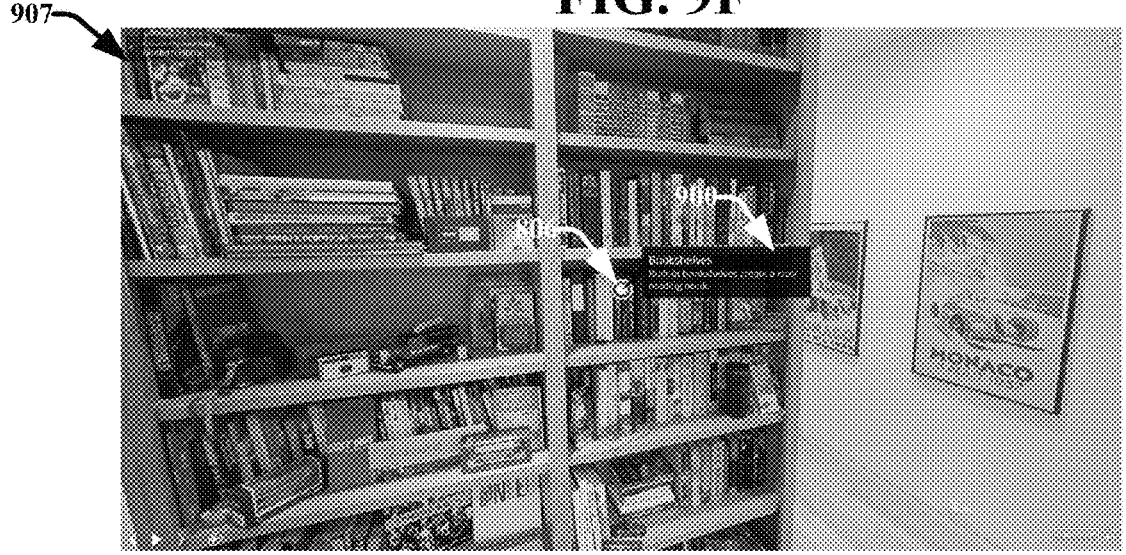

With reference initially to FIG. 9A, representation 901 includes pop-up display window 900 including a tag associated with tag icon 806 associated with a bookshelf in the 3D representation 901. In an aspect, the pop-up display window 900 was generated/rendered in response to movement of a cursor, stylus, finger, etc., over or near tag icon 806 when viewing and interacting with representation 800. Thus in an aspect, representation 901 is a version of representation 800 with pop-up display window 900 integrated thereon as an overlay based on user interaction with tag icon 806.

FIGS. 9B, 9C, 9D, 9E, 9F, and 9G provide a sequence of different example representations 902, 903, 904, 905, 906 and 907, respectively, of the 3D model generated/rendered in response to selection of tag icon 806 from representation 901 or 800. As shown in FIGS. 9B-9G, the respective representations 902, 903, 904, 905, 906 and 907 correspond to different perspectives of a virtual camera relative to the 3D model as the virtual camera moves a first perspective of the 3D model in dollhouse mode, corresponding to representation 901 or 800, to a second perspective of the 3D model in feature view mode corresponding to representation 907, over a defined period of time (e.g., less than 3 seconds). According to the subject embodiment, the rendering component 426 can be configured to render a close-up or feature view of the point, area or object associated with a tag icon in response to selection of the tag icon. In particular, in the example depicted via FIGS. 9A-9G, the rendering component 426 renders a close-up or feature view of the bookcase in response to selection of icon 806 in representation 901 of the 3D model which is rendered in the dollhouse mode. The sequence of representations 901-907 provides a smooth visual transition between representations 901 and 907. In addition to the tag icons being spatially aligned in representations 901 and 907, the tag icons (e.g., tag icons 802, 804, 806, 704, 706, 102, 104, and 106) are also spatially aligned throughout each of the transition representations 902-906. It should be appreciated that representations 902-906 are merely example transition imagery that can be rendered in association with the transition between representation 901 and 907 and that the number of transition representations generated between different views of a 3D model can vary.

As exemplified via FIGS. 5A-9G, the navigation component 408 can facilitate navigating a 3D model of an object or environment and viewing different perspectives of the 3D model, including different perspectives associated with walking mode, feature view mode, floor plan mode and dollhouse/orbit mode. The rendering component 426 can further provide for rendering representations of the 3D model corresponding to these different perspectives and integrating spatially aligned tag icons for tags respectively associated with the respective representations. The rendering component 426 and/or the transition component 412 can also ensure that the tag icons remain spatially aligned throughout smooth transitions between different representations of the 3D model. In addition, the rendering component 426 can render a tag associated with a tag icon in response to interaction with the tag icon (e.g., hovering over the tag icon or selecting the tag icon) in association with navigating the 3D model.

Also as exemplified via FIGS. 5A-9G, the navigation component 408 can facilitate navigating a 3D model based in part on selection of a tag icon included in any representation of a 3D model. In particular, in accordance with various embodiments, regardless of the viewing/navigation mode (e.g., walking mode, feature view mode, dollhouse/orbit mode, floor plan mode, etc.) associated with a generated/rendered representation of a 3D model, selection of a tag icon included in the representation can result in the generation of a feature view representation of the point, area or object associated therewith. For example, as shown in FIGS. 5A-5F, selection of a tag icon integrated in a first representation of a 3D model depicted in a feature view (e.g., representation 501) can result in the generation and/or rendering of a second representation of the 3D model depicted in a feature view (e.g., representation 506). In another example, selection of a tag icon integrated in a first representation of a 3D model in dollhouse mode (e.g., representation 901) can result in the generation and/or rendering of a second representation of the 3D model depicted in a feature view (e.g., representation 907). Accordingly, a user can navigate to different points, areas or objects in a 3D model by selecting respective tag icons associated with the points, areas or objects.

With reference back to FIGS. 4A and 4B, in addition to facilitating movement or navigation between different points, areas or objects in a 3D model based on selection of tag icons associated with the respective points, area or objects in the 3D model, in some embodiments, the navigation component 408 can facilitate navigating to different areas of a 3D model and different 3D models using tag icons that can be or include hyperlinks. For example, in some implementations, a tag can include metadata that describes a crosslink between two or more points, areas or objects of interest in a 3D model. For instance, a tag associated with a ceiling fan in a main living room can include information that identifies other rooms or areas of the 3D model that also include the same or a similar ceiling fan. In another example, a tag that identifies an artist of a painting in a 3D model of an art museum can include information identifying other paintings also created by the same artist and/or areas in the 3D model of the art museum including the other paintings created by the same artist. In some implementations, tags can further include one or more hyperlinks from one point of interest to a related point of interest in the 3D model and/or to a set or sequence of other related points of interest in the 3D model. For instance, in furtherance to the above ceiling fan example, the tag can include one or more hyperlinks to the other rooms or areas of the 3D model that include the same or similar ceiling fans. In another example, the tag can include a hyperlink to a sequence of images of the other rooms and/or the other ceiling fans. In furtherance to the art museum example, the tag may include a link that initiates a tour of the areas of the art museum including the other paintings created by the same artist. Accordingly, the navigation component 408 can facilitate navigating to different related points, areas or objects in a 3D model using tags information that informs the viewer regarding the related points, areas or object of interested and/or provides hyperlinks to the related points, areas or objects of interest.

In other implementations, a tag can include information that facilitates navigating between different 3D models and/or different versions of a same 3D model or feature of the 3D model. For example, a 3D model of an architectural space can be associated with several other 3D models of the space that depict different stages of the space over time during construction of the space and/or during remodeling of the space. According to this example, a tag associated with a particular room or area in the 3D model can include information that identifies and/or provides hyperlinks to alternative versions of the room or area over the progression of time during construction and/or remodeling process. For example, a tag associated with a remodeled room in the building can include a link to another 3D model and/or associated representation of the room before the remodeling was begun. In another example, a particular 3D model may have a tag associated with particular set of kitchen cabinetry that includes a link to another 3D model also having the same or similar kitchen cabinetry. In another example, a tag associated with a point, area or object in a 3D model can include a link to alternative versions of the 3D model, such as version of the 3D model with alternative structural components or alternative furniture and/or decorative elements. In another example, a tag associated with a particular feature in a 3D model can include links to alternative versions of the 3D model with different versions of the feature and/or that removes the feature. For instance, when the feature includes a type of flooring, the tag associated with the flooring can include links to other version of the 3D model with alternative flooring. Thus in some embodiments, tags can provide hyperlinks to other 3D models or representations of the other 3D models having a predefined association with one another (e.g., being an older or newer model of the same space, including a same or similar feature such as the kitchen cabinetry, including alternative structural features, being an alternatively decorated version, etc.).

Accordingly, in various embodiments, the navigation component 408 can provide a means for moving between different 3D space models or different sections of the same 3D space model through the use of spatially aligned tags to designate links between specified locations of two or more 3D space models. The respective tags can thus be associated with predefined views (e.g., representations) of other areas of the same 3D space model or another 3D space model (e.g., in memory 418 or another accessible memory). Thus in response to selection of a tag or tag icon that is a hyperlink to another representation, either of the same 3D model or another 3D model, the rendering component 426 can be configured to render the corresponding representation. The navigation component 408 can further allow the user to proceed to navigate about the corresponding 3D model from the current navigation position associated with the rendered representation (e.g., the position of the virtual camera from which the representation is based) using the various mechanisms described herein.

As an example, a 3D space model may be comprised of a primary home residence and an unattached in-law or guest house, with a garden area separating the two buildings. In this case, a tag placed at a point located near the back door of the first building can link to a view inside the entryway of the second building. When a user clicks on this tag, the rendering component 426 can be configured to transition from rendering of a view of the back door to a view of the entryway. When changing from the first representation to the second representation, the transition component 412 can employ various types of image transitioning techniques to provide smooth visual transitions, including but not limited to, a crossfade, a fade-to-black, a view zooming effect, a camera motion blur effect, a time warp effect, etc.

In some extensions of the previous example, a corresponding tag can be positioned at the entryway of the second building, in such a manner that when a user clicks on the second tag, the user display screen would be returned to a view of the back door of the first building (e.g., by rendering component 426). As with the first tag, any type of image transformation can be used to transform the display; the inbound and outbound transformations may be similar or completely different. An authoring system may provide functionality for tags to be created, placed, and edited in a 3D space model independently one at a time, or it may provide a one-step method for creating both the inbound and outbound tags at the same time, so they always remain synchronized to allow traveling to or from any pair of locations in the 3D space model.

In another application of this technique, several 3D space models can be linked together by tags. For example, one 3D space model may represent the lobby of an apartment complex, another 3D model may represent the pool and recreational areas of the apartment complex, another 3D model may represent the parking area, and another 3D space model may represent the interior of a specific available apartment. By defining tags which provide functionality for moving between these models, the navigation component 408 can simulate the experience of an actual tour of the apartment complex for helping an individual to decide whether to rent the apartment. In this sense, any number of 3D models could be linked together as components of a larger virtual composite model, even to the extent that entire city blocks or shopping plazas could be navigated in virtual 3D space. Optionally the visual transitions between different 3D model components could be customized and themed appropriately to the simulated environment. For example, a transition may simulate the action of entering an elevator to access different levels of the 3D model of an apartment building, where each level is represented as a component 3D model. The individual 3D models can have been constructed at different times, using different computational techniques, or using different visual styles, and yet appear virtually composited together by being able to transport between the models by interacting with navigation tags.

In some implementations, tags or tag icons that are or provide links to another representation of a 3D model or another 3D model (referred to herein as navigation tags) can be visually distinguished from other types of tags or tag icons (e.g., by color, shape, size, etc.). For example, a navigation tag may appear as an arrow shape, which is intended to indicate that clicking on it will cause an action that moves the user away from the current location in the 3D space model. As another example, the tag may appear as a thumbnail preview image of the destination, in such a way that the user would understand the precise location to which they will be transported by clicking the tag. As another example, the tag may appear as a semantic icon, such as a milk carton icon that transports the user to the dairy section of a 3D space model of a supermarket interior. In this context, multiple tags may be combined together as a supermarket directory, such that clicking on a particular icon would transport the user to a specific aisle of the supermarket space model. The directory could be constructed graphically to appear as a virtual control panel embedded directly in the 3D space model itself, as opposed to a 2D UI overlay floated over the viewport.

Figure 10:
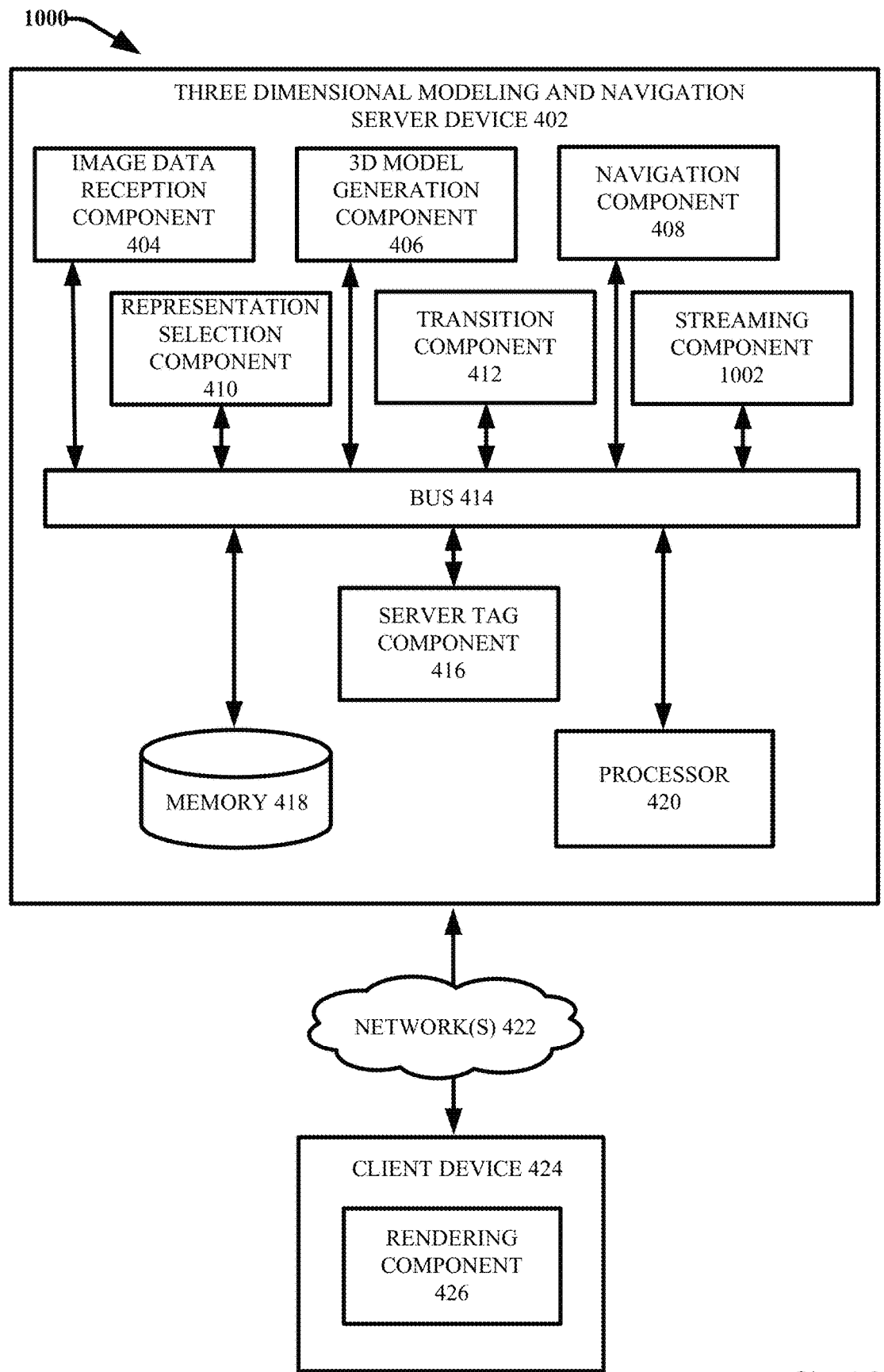
FIG. 10 illustrates an example system that facilitates navigating and interacting with a 3D model including tags in accordance with various aspects and embodiments described herein.

FIG. 10 illustrates another example system 1000 that facilitates navigating and interacting with a 3D model including tags in accordance with various aspects and embodiments described herein. System 1000 includes same or similar features as systems 400 and 401 with the addition of streaming component 1002. It should be appreciated that although in the embodiment shown the streaming component 1002 is located at the 3D modeling and navigation server device 402, in some embodiments, the client device 424 can additionally or alternatively include the streaming component 1002 and/or another device accessible to the client device 424 and/or the server device 402 can include the streaming component 1002. Repetitive description of like elements employed in respective embodiments is omitted for sake of brevity.

In some embodiments, the 3D modeling and navigation server device 402 can be configured to provide client devices (e.g., client device 424) access to various 3D modeling and navigation services provided thereby via one or more networks 422 (e.g., the Internet). For example, the 3D modeling and navigation server device 402 can provide a network accessible platform such as a website and/or application that allows client devices (e.g., client device 424) to access and interact with the 3D models including tags. According to these embodiments, the 3D modeling and navigation server device 402 can include streaming component 1002 to facilitate providing 3D model data and tag data to the respective client devices (e.g., 3D models, representations of 3D models, 2D images associated with the 3D models, 3D data associated with the 3D models, capture position and orientation information, waypoints, tags, tag icons, tag position information, tag display information, and the like).

For example, as the complexity of a 3D model increases (e.g., based on size, number of rooms, amount of detailed 2D and 3D imagery associated with the 3D model, etc.), the number of possible different views and representations of the 3D model also increases. Further, as tags are integrated into 3D models, the amount of potential data and/or metadata to be provided to and rendered at the client device in association with consumption of the tags is substantially increased while the number of possible representations of the 3D models is further increased (e.g., representations including tag icons, overlaid tags, etc).

In one embodiment, in order to facilitate consumption of a 3D model including tags at a client device 424, the 3D modeling and navigation server device 402 can provide the client device 424 with all data associated with rendering representations of the 3D model including tags and rendering the tags based on received navigational input as a single download prior to navigation of the 3D model (e.g., representations of the 3D model, 2D images associated with the 3D model, 3D data associated with the 3D model, capture position and orientation information, waypoints, tags, tag icons, tag position information, tag display information, representations of hyperlinked 3D models represented by tags, etc.). According to this implementation, the client device 424 can be configured to select and/or generate representations of the 3D model including tags, render the representations, and render tags in response to navigation of the 3D model in an offline mode.

However, in various exemplary embodiments, rather than providing the client device 424 with an overload of downloaded 3D model and tag data, the 3D model modeling and navigation server device 402 can employ the streaming component 1002 to stream 3D model data and tag data to the client device 424 on demand based on received navigational cues as the viewer navigates the 3D model as presented at the client device 424. For example, in one embodiment, based on navigation input indicating a desired perspective of a 3D model, the streaming component 1002 can provide the client device 424 3D model data associated with a currently desired perspective for viewing the 3D model. For example, the streaming component 1002 can provide the client device 424 with a representation of the 3D model selected by the representation selection component 410 that provides the desired perspective of the 3D model. In embodiments in which the representation is associated with one or more tags, the streaming component 1002 can further provide the client device 424 with the one or more tags and information regarding how and when to integrate and display the tags and/or tag icons for tags. Accordingly, rather than streaming all tag data associated with a 3D model at once, the streaming component 1002 can provide the client device 424 with 3D model data and tag data that is associated with current perspective of the 3D model desired for viewing by the user, as determined based on received navigational cues.

In another embodiment, rather than providing a client device all 3D model content and tag content at once, the streaming component 1002 can be configured to provide the client device 424 with subsets of 3D model content and tag content (including tag icons and tags) based on navigational cues. For example, the streaming component 1002 can provide a client device 424 with a subset of the 3D model content and tag content associated with a current navigation location of the user relative to the 3D model. For instance, when the user navigation position (e.g., wherein the navigation position corresponds to the location of the virtual camera relative to the 3D model) is located in a particular room of a 3D model, the streaming component 1002 can provide the client device 424 with a subset of the 3D model content and tag data that is associated with that room. Accordingly, as a user navigates about a 3D space model, the streaming component 1002 can stream 3D model content and tag data to the client device 424 in an order based on the movement of the user through the model such that the client device 424 regularly receives content that is relevant to the current navigation location of the user. Further, in some implementations, the streaming component 1002 can predict a navigation path of the user and stream the client device 424 3D model data and tag data in an order that corresponds to the respective navigation positions of the user along the predicted navigation path. For example, the streaming component 1002 can predict a navigation path of the user using machine learning based on previous navigation paths of the 3D model by the user and other users and machine learning.

Regarding tag data specifically, in some embodiments, the streaming component 1002 can be configured to stream tags associated with the 3D model only in response to reception of navigation input indicating interaction with a tag icon, or a point, area, or object associated with a tag in embodiments in which tag icons are not displayed. For example, the streaming component 1002 can be configured to stream a tag associated with a tag icon in response to user input indicating selection of the tag icon, input indicating hovering over the tag icon (e.g., while operating in browse mode) and/or input indicating movement towards the tag icon. In yet another embodiment, the streaming component 1002 can be configured to stream tags to the client device 424 based on proximity of a user's navigation position (e.g., the current position of the virtual camera relative to the 3D model) to tagged points, objects or areas. For example, in one implementation, the streaming component 1002 can be configured to stream a tag associated with a tagged point, area or object based on the user's current navigation position being within a defined distance of the tagged point, area or object. In another implementation, the streaming component 1002 can be configured to stream all tags associated with points, areas or objects included within a defined area or volume of the 3D model associated with the user's current navigation position. For example, the defined area or volume can be based on a current room associated with the user's navigation position. In another example, the defined area or volume can be based on a fixed radius around the user's current navigation position.

Figure 11:
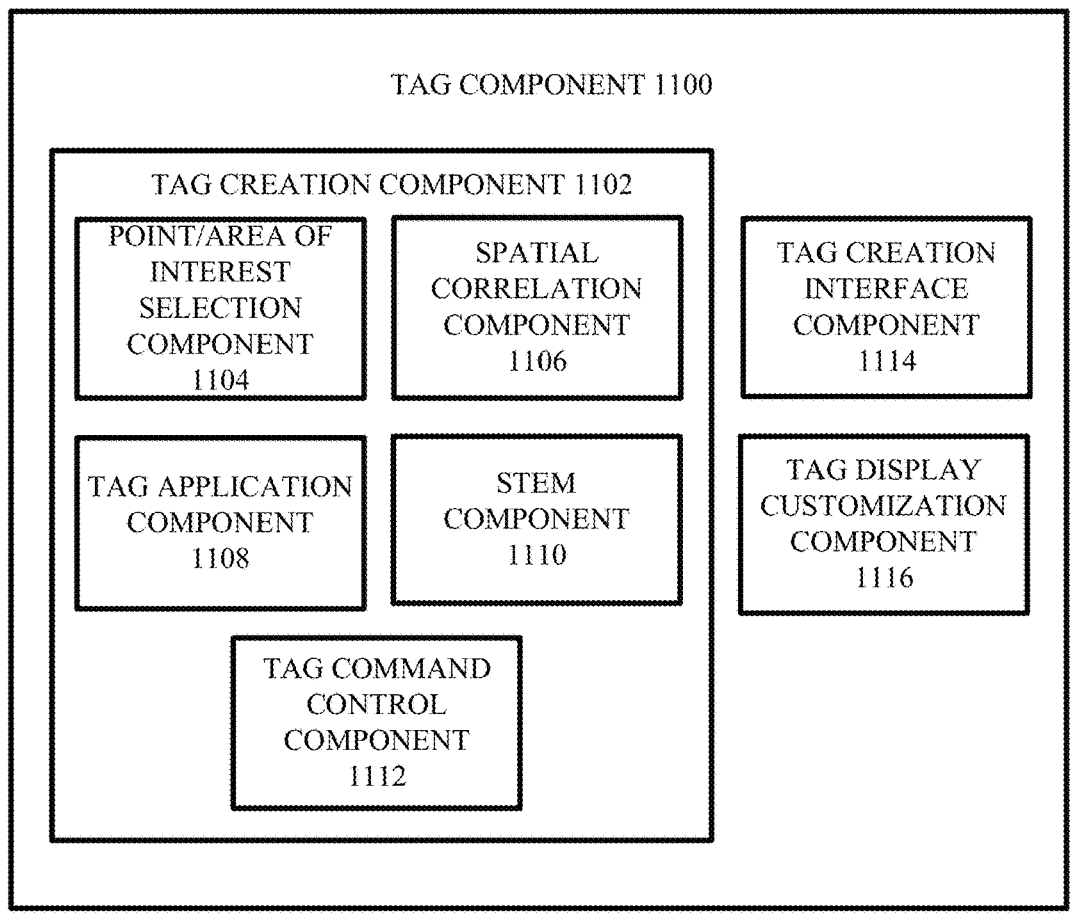
FIG. 11 illustrates a high level view of an example tag component that facilitates defining, viewing and interacting with tags in a 3D model in accordance with various aspects and embodiments described herein.

FIG. 11 illustrates a high level view of an example tag component 1100 that facilitates defining, viewing and interacting with tags in a 3D model in accordance with various aspects and embodiments described herein. In one or more embodiments, tag component 1100 can be or include server tag component 416 or client tag component 428. In other embodiments, one or more of the components of tag component 1100 can be included with the server tag component 416 or one or more components of tag component 1100 can be included with the client tag component 428. Still in other embodiments, the components of tag component 1100 can be distributed between the server tag component 416 and the client tag component 428. Repetitive description of like elements employed in respective embodiments described herein is omitted for sake of brevity.

In one or more embodiments, the tag component 1100 can provide a mechanism that allows a user to interact with a 3D model and apply and define tags for the 3D model. The tag component 1100 can also allow a user to provide input that defines how and when a tag and associated tag icon should appear during navigation of the 3D model. According to these embodiments, the tag component 1100 can include tag creation component 1102, tag creation interface component 1114 and tag display customization component 1116. In one or more implementations, the tag creation component 1102 can facilitate creating, defining and applying tags in or on a 3D model of an object or environment. The tag creation interface component 1114 can provide a graphical user interface that includes various unique integrative tools that allow a user to create, define and apply tags in or on a 3D model. Further, the tag display customization component 1116 can facilitate customizing how and when a tag icon is rendered in association with navigation of the 3D model by one or more viewers as well as how and when a tag is displayed in association with navigation of the 3D model by one or more viewers.

In accordance with various embodiments, the tag creation component 1102 can include point/area of interest selection component 1104 to facilitate selecting a point, area or object, on, around, or within a 3D model for associating with a tag. For example, the point can include a 2D or 3D point located on a structural surface of the 3D model or a 2D/3D point that is not tied to a particular surface of the 3D model (e.g., floating in the middle of a room or floating outside the 3D model at a defined viewing perspective relative to the 3D model). In another example, the area can include a 2D area, such as a surface (e.g., a floor, a wall, a ceiling), or 3D volume (e.g., a volume contained within a room, an entire room, a group of rooms, a floor, a group of floors etc.). In another example, the object can include a 2D object (e.g., an image or part of an image on the surface of the model), or a 3D object (e.g., a fixture, an appliance, a piece of furniture, a decorative element, etc.). In some implementations, the point/area of interest selection component 1104 can receive user input that directly identifies the point, area, volume, or object of interest on a representation of a 3D model. In an aspect, the point/area of interest selection component can render or display the exact structural components of the 3D model in the region of the selected point, area or object of interest, thus ensuring the accuracy of the selected location. The spatial correlation component 1106 can further invoke the visual and structural qualities of the selected point, area or object to precisely locate the 3D coordinate position relative to the 3D model and/or the 3D coordinate space in which the 3D model is aligned, and geometric elements that comprise it. The spatial correlation component 1106 can further associate the 3D coordinate position with the selected point, area or object of interest and the tag and tag icon that is subsequently associated with the point, area, volume, or object of interest.

For example, while viewing a representation of the 3D model, depending on the features and capabilities of the client device at which the representation is displayed, the point/area of interest component 1104 can receive user input that includes but is not limited to, pointing, touching, highlighting, placing a mouse or cursor over, hovering over, focusing upon, selecting, clicking, tapping, swiping or otherwise calling attention to a specific point, area or object in the 3D model. The user can further provide input that selects the point, area or object for association with a tag. In some aspects, while viewing a 3D model, a user can employ an interactive tool that allows the user to draw or create a circle or other suitable 2D or 3D shape on or around the particular point, area or object of interest of the 3D model. In other implementations, the point/area of interest selection component 1104 can provide a selection tool that generates an auto-aligned 2D or 3D shape over various potential pre-defined geometric 2D and/or 3D shapes and volumes defined in the 3D model as the user moves the selection tool over the different geometric 2D and/or 3D shapes and volumes. According to this example, as the user moves a cursor, mouse, finger, stylus, etc., over different pre-defined 2D/3D areas (e.g., surfaces, walls, floors, ceilings, etc) and 2D/3D objects (e.g., structures, fixtures, appliances, furniture, decorations, devices, tools, vehicles, trees, plants, animals, people, etc.), the respective 2D/3D areas and objects can be highlighted, called-out, or otherwise identified and selected for application of a tag.

In various embodiments, the tag application component 1108 can be configured to facilitate defining a tag and associating the tag with the selected point, area or object of interest in the 3D model. In particular, as described infra, a tag can include data/metadata, including but not limited to, text, images, video, audio and hyperlinks. In one or more implementations, the tag application component 1108 can receive user input selecting and/or providing a tag for a selected or identified point, area or object of interest, including at least one of: text, an image, a video, audio or a hyperlink. For example, after selection or identification of a point, area or object of interest, a user can create, upload, attach, embed, link, select or otherwise provide input to the tag application component 1108 including the tag for association with the point, area or object of interest. The tag application component 1108 can further associate (e.g., in memory 418 or other memory accessible to the 3D modeling and navigation server device 402) the tag with information identifying the tag (e.g., a title or unique identifier for the tag), the point, area or object of interest, and the 3D spatial location of the point, area or object of interest relative to the 3D model (e.g., as determined via spatial correlation component 1106). In some embodiments, the tag application component 1108 can associate additional metadata with the tag, such as information regarding an author or creator of the tag, a timestamp associated with creation of the tag, the 3D model associated with the tag, and the like.

In various implementations, the tag application component 1108 can further facilitate defining a tag icon to represent a tag. For example, the tag application component 1108 can receive user input selecting or defining a particular icon to represent a tag (e.g., a circle, a sphere, a star, etc.). For instance the input can provide or select a particular symbol and an appearance of the symbol (e.g., size, shape, color, opacity, etc.). In other implementations, the particular tag icon symbol and appearance of the symbol can be predefined and/or based on various predefined criteria, such as a characteristic of the author (e.g., different authors may be associated with different symbols or appearances of symbols), a characteristic of the type of tag or class of tag (e.g., text, images, video, audio, hyperlinks, etc.), a date associated with the tag, the particular point, area or object associated with the tag, and the like.

The tag application component 1108 can further facilitate applying the tag icon to the 3D model. In some implementations, the tag application component 1108 can receive user input defining where a tag icon is to be located relative to the point, area or object it is associated with when rendered in a representation of the 3D model. For example, the tag application component 1108 can allow a user to manually move the tag icon over and/or within a displayed representation of the 3D model including the point, area or object and position the tag icon at a desired spatial location relative to the point area or object. For instance, a tag icon associated with a freestanding couch could be placed on a surface of the couch, floating a short distance above the center surface of the couch, on the back rest of the couch, floating a few spaces above the back rest of the couch etc. Thus the tag application component 1108 can allow a user to provide input that specifically identifies a defined location (e.g., above, below, on a left side, right side, surface, etc.) to integration of a tag icon in a representation of a 3D model relative to the point, area or object it describes. In other embodiments, the tag application component 1108 can be configured to locate a tag icon in a predefined position (e.g., directly above a center point of the point, area or object of interest) relative to the point, area or object it describes.

In one or more embodiments, a tag icon can be linked to the point, area or object it describes when rendered in a representation of a 3D model via a stem. For example, the tag creation component 1102 can include stem component 1110 to facilitate applying a stem to tag icons that links a tag icon to the point, area or object it describes. For example, the stem component can 1110 can be configured to add stems to tag icons that are associated with specific objects or surfaces in a 3D model (e.g., the refrigerator/freezer and tag icon 104 in representation and the wine fridge and tag icon 106, as shown in FIG. 3 representation 300). In another example, the stem component 1110 can be configured to exclude application of a stem to tag icons that are associated with larger spaces or areas in general, such as an entire room, an entire floor, an outdoor living space, etc. In an aspect, using stem component 1110, a user can specify appearance properties of a stem that connects a tag icon to an object or area it describes, such as but not limited to, a desired length of the stem, a color of the stem, an opacity of the stem, a thickness of the stem, an angle of the stem, etc.

In some implementations, the tag application component 1108 can also provide for defining the manner in which a tag is displayed in response to interaction with the tag icon in association with viewing and/or navigating a 3D model. For example, in addition to defining a tag associated with a point, area or object in a 3D model, defining a tag icon for the tag, and defining a location and appearance of the tag icon when rendered in a representation of the 3D model, the tag application component 1108 can receive input defining a manner in which to display the tag in response to user interaction with the tag icon (e.g., pointing at the tag icon, looking at the tag icon, hovering over the tag icon, selecting the tag icon, etc.). For example, in various aspects, the tag can be rendered via a 2D frame (e.g., a pop-up display window, an iframe, a banner, a billboard, etc.) that is overlaid onto the representation of the 3D model near the tag icon. The tag application component 1108 can also receive input that defines a size, shape, appearance and desired location of the 2D frame when rendered over the representation of the 3D model. In another example, the tag can be rendered in a side panel associated with the interface including the representation of the 3D model, in a separate tab, a separate window, or at another device.

In various embodiments, a tag can also be created and applied to a point, area or object in a 3D model yet not configured for rendering in association with navigation of the 3D model. For example a user or system may annotate a 3D model with tags to facilitate various applications related to indexing the 3D model, searching for and/or identifying features associated a 3D model, correlating the 3D model with other 3D models, updating or editing the 3D model, providing historical records for the 3D model, gaining a better understanding of the 3D model and the like. According to these embodiments, an author may choose not to define features related to the appearance and placement of a tag icon and/or a tag stem and/or a manner in which to display the tag during viewing/interaction with 3D model.

As previously noted, in some implementations, a tag can be or include an application or a command script. Selection of the tag icon for the tag can further facilitate opening the application and/or initiating the command defined by the command script. For example, a tag can be or include a querying application that facilitates querying an internal or external database for additional information related to the tagged object. In some implementations, selection of the tag icon for such a tag in a representation of a 3D model can result in the opening of the querying application. In another example, a tag can be or include an application that facilitates remotely controlling a remote device. According to this example, selection of the tag icon for such a tag can result in the opening of the remote control application or initiating sending of a command to automatically remotely control the remote device. For instance, in the area of home automation, a 3D model of an actual home can include tags for various appliances and devices in the home (e.g., air conditioning, television, electric blinds, home security systems, etc.) that are linked to one or more applications that provide for remotely controlling the appliances or devices. According to this example, in one implementation, selection of a tag icon associated with an appliance can cause the remote controlling application to open and thus facilitate allowing a user to remotely control the appliance (e.g., activate/deactivate a measure of the home security system, change the temperature of the air conditioner thermostat, etc.). In another implementation, the tag can be tied to a specific command of an application wherein selection of the tag icon can initiate execution of the command. For example, a tag icon associated with blinds can correspond to a virtual control for the blinds, wherein selection of the tag icon can cause the blinds to open or close, depending on the control parameters defined for the tag represented by the tag icon.

The tag creation component 1102 can further include the tag command control component 1112 to facilitate such implementations. For example, in various embodiments, the tag command control component 1112 can provide for defining tag actions to control or correlate to exterior actions such as controlling and modifying values in exterior appliances or other applications. For example, the tag control component 1112 can link a particular application to a tag and provide for defining a reaction (for performance by the rendering component 426) associated with the application in response to selection of the tag icon for the tag. For instance, using the tag control component 1112, a user can define a command such that selection of the tag icon results in opening of the application associated with the tag icon. In another example, using the tag control component 1112, a user can define a command or action (e.g., increasing the thermostat temperature) provided by the application such that selection of the tag icon results in performance of the defined action or command by the particular application associated with the tag.

The tag display customization component 1116 can further facilitate customizing how (e.g., with respect to appearance, size, shape, position, etc.) and when a tag icon is displayed and how and when the tag represented by the tag icon is displayed when the 3D model is viewed/navigated by an end user. For example, in some embodiments, a user or system associated with application of a tag to a 3D model can provide input customizing how and when a tag icon and/or tag data is displayed during viewing/navigation of a 3D model based on but not limited to: a characteristic associated with audience/viewer (e.g., a preference, a demographic characteristic), a viewing context (e.g., a location of the client device at which the 3D model is presented, a mobility state of the client device, a time of day, a day of year, etc.), and/or a characteristic of the client device at which the 3D model is presented (e.g., a dimension of the display, a characteristic of the display, an input capability of the client device, etc.). For example, a 3D model can be associated with a set of tags and associated tag icons respectively associated with information defining conditions regarding how and when the respective tag icons and tags should be displayed during viewing/navigation of the 3D model. In an aspect, a first viewer can be presented with a first subset of the tags and associated tag icons based on one or more of, a characteristic of the first viewer, a first viewing context, or a characteristic of the client device of the first viewer. Likewise, a second viewer can be presented with a second subset of the tags and associated tag icons based on one or more of, a characteristic of the second viewer, a second viewing context, or a characteristic of the client device of the second viewer. The manner in which a tag icon and its associated tag data is displayed can also be tailored based on defined navigational cues and/or a size and location of the point, area or object in the representation of the 3D model. Thus in various embodiments, the tag display customization component 1116 can receive and apply input defining how and when tag icons and their associated tags are to be presented (e.g., via rendering component 426) during viewing/navigation of a 3D model.

In some implementations, the tag creation component 1102 can facilitate defining and applying tags to a 3D model in association with navigation of the 3D model. For example, the point/area of interest selection component 1104 can receive input that selects a point, area or object of interest in a 3D model for application of a tag thereto during navigation of the 3D model. For example, as the viewer navigates the 3D model and is presented with different representations of the 3D model, the user can interact with the 3D model as described above to provide input that selects a point, area or object in the 3D model for application of a tag thereto.

In various additional implementations, the point/area of interest selection component 1104 can facilitate defining and applying tags to a 3D model in association with generation of the 3D model and/or during the capture process of 2D and 3D data employed to generate the 3D model. For example, in various embodiments, a 3D model of an object or environment can be generated based on captured 3D image data (e.g., including visual and spatial information for points associated therewith) and/or 2D image data of the environment (e.g., 2D images, stereo images, panoramas, etc.). In some embodiments, the 3D and/or 2D data can be presented to a user as it is captured (e.g., the user operating the camera, or to another user). For example, the user can be presented with a 2D image captured of the environment. In another example, the user can be presented with 3D imagery captured from the environment. In some aspects, as the 3D and/or 2D data is captured, it can be iteratively aligned and employed to generate the 3D model during the capture process. For example, as new data is received it can be combined and aligned with previously received data to build the 3D model of the environment over the capture process. The 3D model can further be presented to the user as it is generated. For example, progressive versions of the 3D model can be presented to the user as they are respectively generated over the capture process.

In some embodiments, a user presented with the 2D and/or 3D imagery of an environment as it is captured (e.g., and before is aligned or incorporated into a 3D model of the environment) can provide input identifying a point, area or object of interest for association with a tag directly on the 2D and/or 3D imagery. For example, the user can point to, highlight, select, draw a circle around, etc., a point, area or object of interest in the 2D and/or 3D image data as it is presented to the user via an interface. The user can further provide and/or define the tag and associated tag icon using the techniques describe above. The spatial correlation component 1106 can concurrently or subsequently determine a spatial position of the point, area or object of interest relative to the 3D model and the 3D coordinate space in which the 3D model is aligned after the point, area or object is incorporated into and aligned with in the 3D model.

In other embodiments, a user presented with progressive versions of a 3D model over the capture process generated based on captured 2D/3D data of the environment as it is received can define and apply tags for the 3D model by interfacing directly with the aligned versions of the 3D model. For example, using the techniques described above, the user can select a select a point, area or object of interest in a version of the 3D model as presented via an interface (e.g., via clicking on the point/object/area, tapping on the point/object/area, drawing a circle around the point/object/area, etc.).

At the time of tag placement, the tag's position may only be known relative to a local portion of the captured 2D and 3D data; as the alignment of the 3D model is finalized, the position of the tag relative to the 3D model may be determined by applying the same spatial transformation to the tag as was applied to the local 2D or 3D data it was captured in reference to. The spatial correlation component 1106 can later determine a spatial position of the point, area or object of interest relative to the finalized 3D model and the 3D coordinate space in which the finalized 3D model is aligned after the point, area or object is incorporated into and aligned with in the finalized 3D model. The user can further provide and/or define the tag and associated tag icon using the techniques describe above.

In some implementations, in addition to the original camera position information and imagery captured by a 3D camera/capture device while a user is employing the camera to capture a particular environment, it is also possible to capture contextual information pertaining to a particular view or location such as audio, voice, or video annotations spoken by the user. For example, during the capture process, the user can record information for association with captured 2D and/or 3D image data identifying characteristics of the 2D and/or 3D image data, such as a room associated with the image data (e.g., the kitchen, first floor bathroom, second floor study, etc.), one or more objects appearing in the image data (e.g., refrigerator/freezer, couch, fireplace, etc.), and the like. In some implementations, the recorded information can be employed to generate tags for the identified features in the 3D model. For example, audio information can be associated with the respective features as an audio tag, and/or the spoken description can be converted to textual tags that can be respectively associated with the respective features. In other implementations, the recorded information can later be employed to facilitate automatically applying tags to the 3D model. Other types of tags that can be created during the capture process can includes image or video based tags associated with a particular point, area or object in the environment, or the camera's point of capture to be represented in the 3D model with a tag. For example, during the capture process, a user can suspend the 3D capture process momentarily to capture for example a video, 2D panorama or additional photographs from a specific area or object of the environment. The user can further associate the video or 2D panorama with the specific area or object in the 3D model as a tag (represented by a tag icon). The 3D capture process can then be resumed. These contextual annotations that are location-specific within the captured 3D space can be played back later while viewing the model as the user navigates to the appropriate matching locations.

In additional embodiments, the tag creation component 1102 can facilitate defining and applying tags to a 3D model in association with a 3D modeling workshop application/tool that provides various tools for tailoring the appearance and presentation of a 3D model after the generation of the 3D model and prior to publication of the 3D model (e.g., using a 3D modeling workshop application, discussed below with respect to FIGS. 12-18). For example, in one or more implementations, the tag creation interface component 1114 can generate and/or provide an interactive graphical user interface associated with the 3D modeling workshop application that allows a user to view different representations of a 3D model and edit the appearance of the 3D model. In accordance with various embodiments described herein, the interface can particularly provide various tools that facilitate defining and applying tags to a 3D model and defining and applying tag icons to the 3D model to represent the respective tags.

For example, FIGS. 12-18 present various example user interfaces 1200-1800 that facilitate defining and applying tags for a 3D model in accordance with various aspects and embodiments described herein. In one or more embodiments, the example interfaces 1200-1800 are associated with a 3D modeling workshop application that provides various mechanisms for interacting with a 3D model to control how the 3D model is displayed to end users. In various embodiments, the 3D modeling workshop application is provided by and/or accessed at the 3D modeling and navigation server device 402. In an aspect, the tag creation interface component 1114 can be configured to generate the example interfaces 1200-1800. In some embodiments, the 3D modeling workshop application is located at the 3D modeling and navigation server device 402. In other embodiments, the 3D modeling workshop application is located at the client device 424. Still in other embodiments, one or more features and functionalities of the 3D modeling workshop are distributed between the 3D modeling and navigation server device 402 and the client device 424. Repetitive description of like elements employed in respective embodiments is omitted for sake of brevity.

Figure 12:
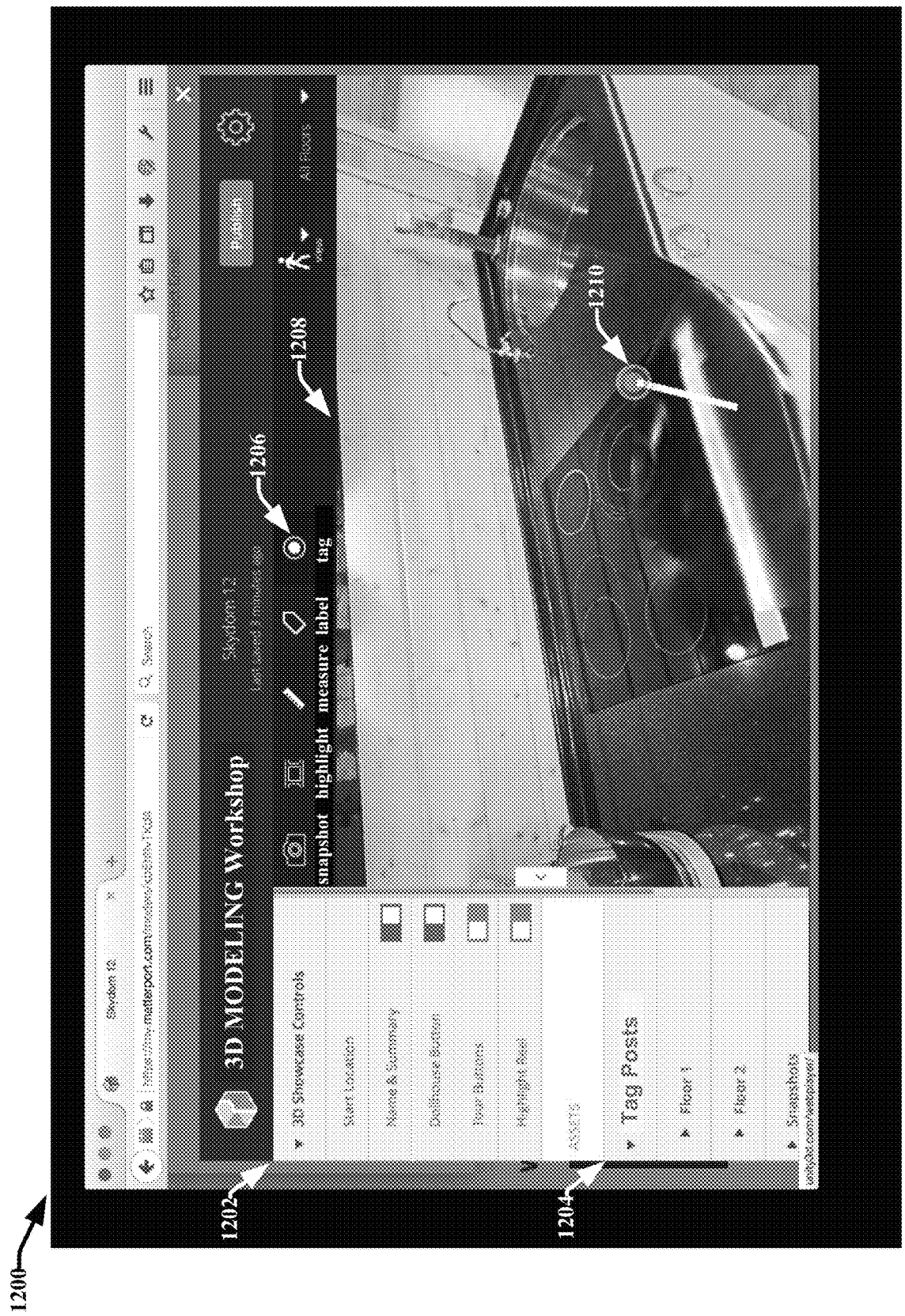
FIGS. 12-18 present various example user interfaces that facilitate defining tags and applying the tags to a 3D model in accordance with various aspects and embodiments described herein.

With reference initially to FIG. 12, interface 1200 includes various control panels around a main display area 1208 including a representation of a 3D model. For example, a control panel on the left side of the interface 1200 includes header for a "3D Showcase Controls" section 1202. In an aspect, various sub-menu sections associated with the 3D Showcase Controls section 1202 section facilitate controlling a starting location for interacting with the 3D model, provide an option to enable display of a name and summary associated with the 3D model, provide an option to enable or disable dollhouse mode when navigating the 3D mode, provide an option to enable or disable an automated tour of the 3D model that facilitates viewing the 3D model, and provide an option to enable or disable a highlight reel that provides defined views of the 3D model associated with the automated tour. The control panel on the left side of the interface 1200 also includes a "Tag Posts" section 1204 that includes various sub-menu sections corresponding to defined locations or areas in the 3D model (e.g., floor 1, floor 2, and the like). In an aspect, a user can select these sub-menu sections to facilitate selecting a point, area or object in the 3D model associated therewith to apply a tag to. For example, a user can select a particular floor or room identified in a sub-menu section to navigate to the floor or room of the 3D model and find a particular point, area or object of interest. After a tag is applied, information can be organized in these sub-sections identifying tags respectively associated therewith. It should be appreciated that other techniques for finding a particular representation of the 3D model including a point, area or object of interest for applying a tag to are contemplated. For example, in some implementations, the user can view the 3D model in a dollhouse view or a floor plan view to see a large portion of the 3D model, including multiple rooms, floors and/or objects. The user can then interact with the 3D model by selecting a specific point, room or area of the object to examine closer in a feature-view or in walking mode. In another example, in some embodiments, the user can employ a query tool that allows the user to query various parts or representation of the 3D model to identify specific areas or objects associated with the 3D model (e.g., associated with context or tag information during the capture process and the like).

In an aspect, the 3D model associated with interface 1200 includes a 3D model of the interior space of a house which can include a kitchen and other rooms. The particular representation of the 3D model depicted in the main display area 1208 includes a close-up view of the oven range and sink. Interface 1200 also includes an upper menu bar above the main display area 1208 including various interactive tools. Of particular relevance, the upper menu bar includes a tag tool 1206. Selection of the tag tool 1206 facilitates applying a tag to the 3D model. For example, the embodiment shown, in response to selection of the tag tool 1206, a ghosted or semi-transparent tag icon 1210 is dropped onto the main display area over the representation of the 3D model displayed therein. Using a suitable interactive input mechanism (e.g., a mouse, a keyboard, a stylus, a finger, etc.), a user can select the tag icon 1210 and move the tag icon 1210 over and around the representation of the 3D model depicted in the main display area to position the tag icon in a desired location in the representation. For example, the user can drag the tag icon over the oven range, the sink, the back splash, etc, until the user decides upon an ideal spot to locate the tag icon 1210 with respect to the point, area or object the user would like to apply a tag.

Figure 13:
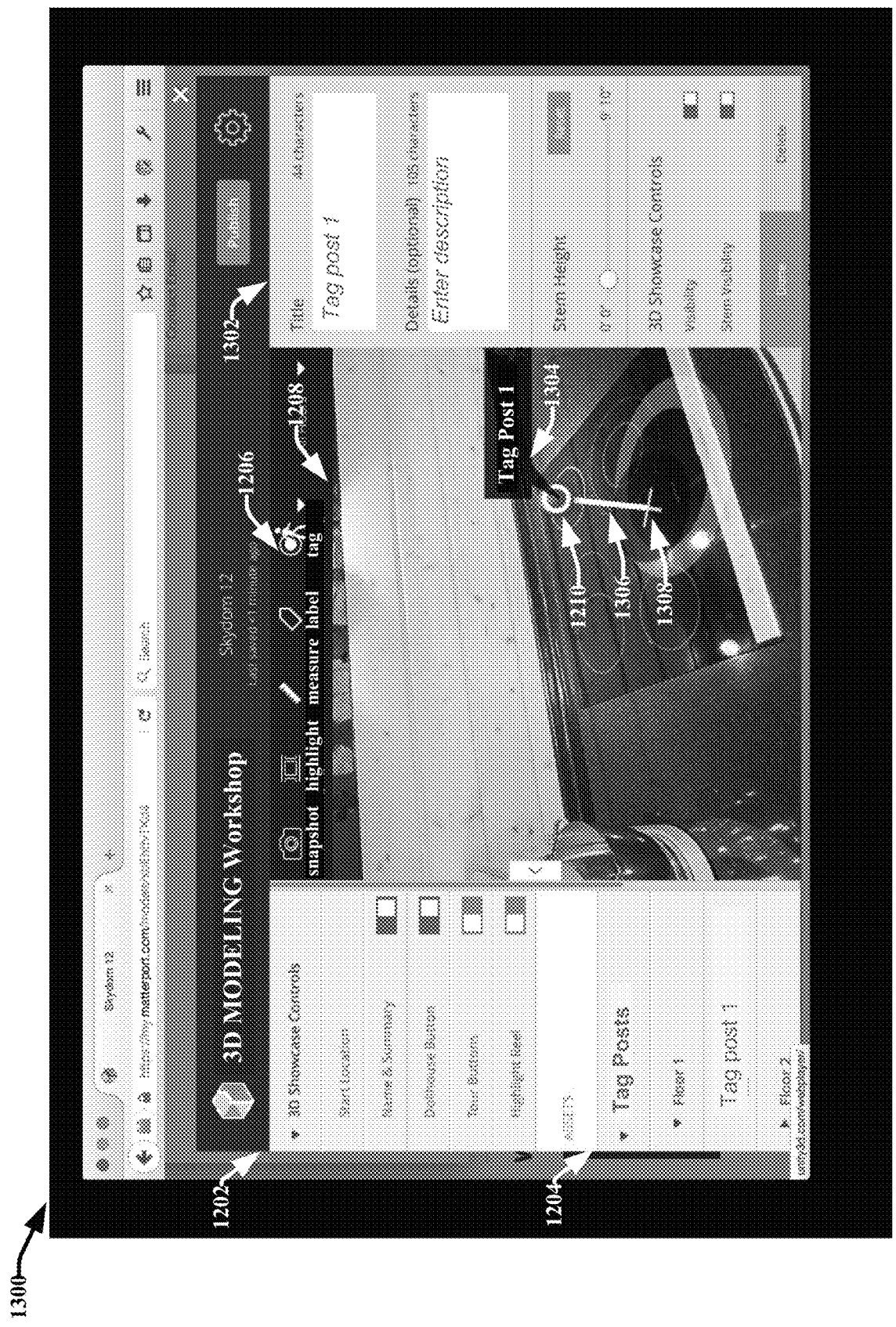

FIG. 13 presents an example interface 1300 after selection of the ideal spot to locate the tag icon 1210 with respect to the point, area or object the user would like to apply a tag. In particular, as shown in interface 1300, the tag icon 1210 is now solid (e.g., as opposed to ghosted or semi-transparent), indicating the user has provided input selecting the position for the tag icon. In order to facilitate indicating the specific point, object or area in the 3D model that the tag icon 1210 is associated with, a stem 1306 is provided that connects the tag icon 1210 to a specific point, area or object in the representation on a structural surface associated with the location of the tag icon. A visual indicator (e.g., an X mark, darkened circular area, etc.) can further be applied to point, area or object for which to associate the tag icon. For example, because the tag icon 1210 is associated with a 3D model (e.g., as opposed to a 2D image), the 3D position of the tag icon 1210 relative to the 3D model is exemplified via a stem 1306 or line that connects the tag icon to a point on the surface of an object located below the tag icon 1210 marked by a X mark 1308. Thus as shown in interface 1300 via the location of the X 1308, it is clear that the tag icon 1210 is associated with the oven range. In an aspect, the user can move the X mark 1308 to a different point or surface in the 3D representation to designate a different point, area or object of the representation to associate with the tag icon 1210.

Also as shown in interface 1300, in response to selection of a location for the tag icon 1210 and/or the point, area or object in the representation to associate the tag icon with, a menu panel 1302 can be generated and displayed on the right side of the interface 1300. The menu panel 1302 can provide various tools for defining a tag and/or controlling the appearance of the tag icon 1210 and the stem 1306. For example, the menu panel 1302 includes an area for the user to apply a title to the tag and another area for the user to enter a description for the tag. In an aspect, a default tag title (e.g., which in this case is "tag post 1") can be included in the title section upon application of the tag icon 1210 to a specific location in the representation. An example billboard panel 1304 can further be generated and displayed with the tag icon including the default tag title.

Figure 14:
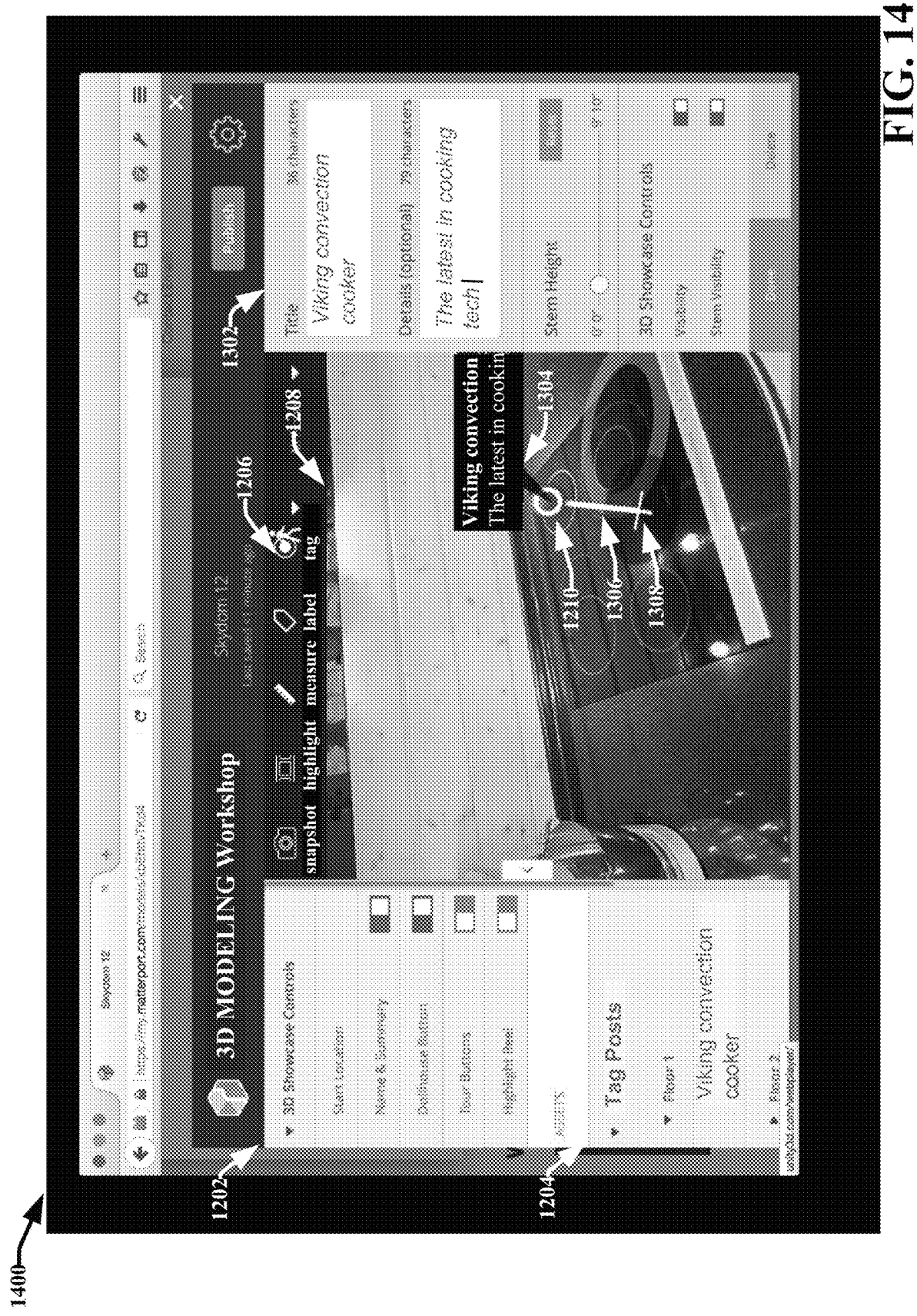
Figure 15:
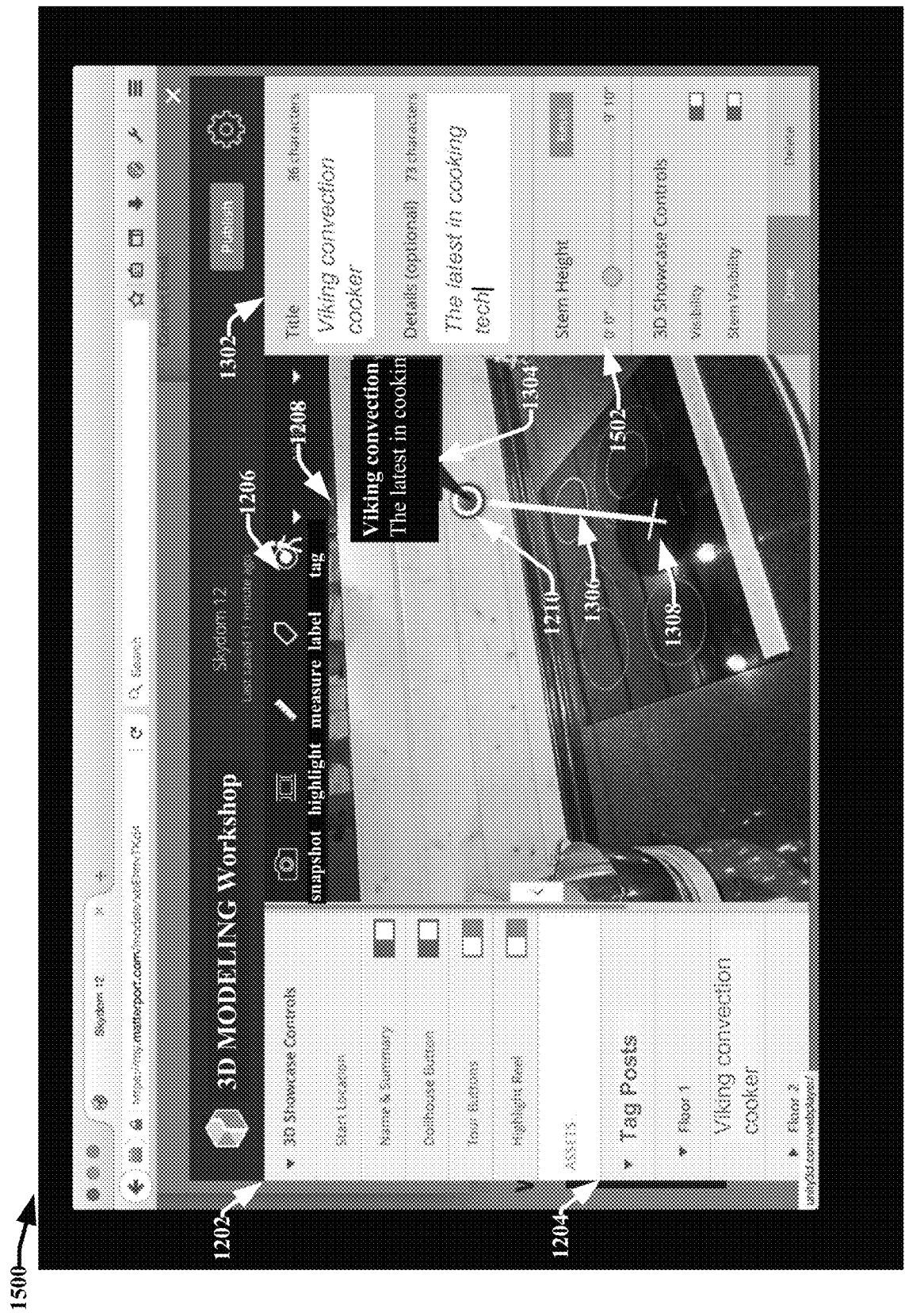

FIG. 14 presents an example interface 1400 generated in response to application of text in the title and details sections of the menu panel 1302. In particular, as shown in interface 1400, the title "Viking convection cooker" has been provided to replace the default title and the user has begun to type detail information in the details sections. In response to this user input, the billboard panel 1304 is updated to include text for the new title and associated details. FIG. 15 presents an example interface 1500 in which the height of the stem 1306 has been adjusted using the stem height control 1502 provided in menu panel 1302. In particular, the stem height has been increased resulting in a movement of the tag icon 1210 and associate billboard panel 1304 upward. In this embodiment, the orientation of the stem has been automatically set to be perpendicular to the surface of the model at location 1308.

Figure 16:
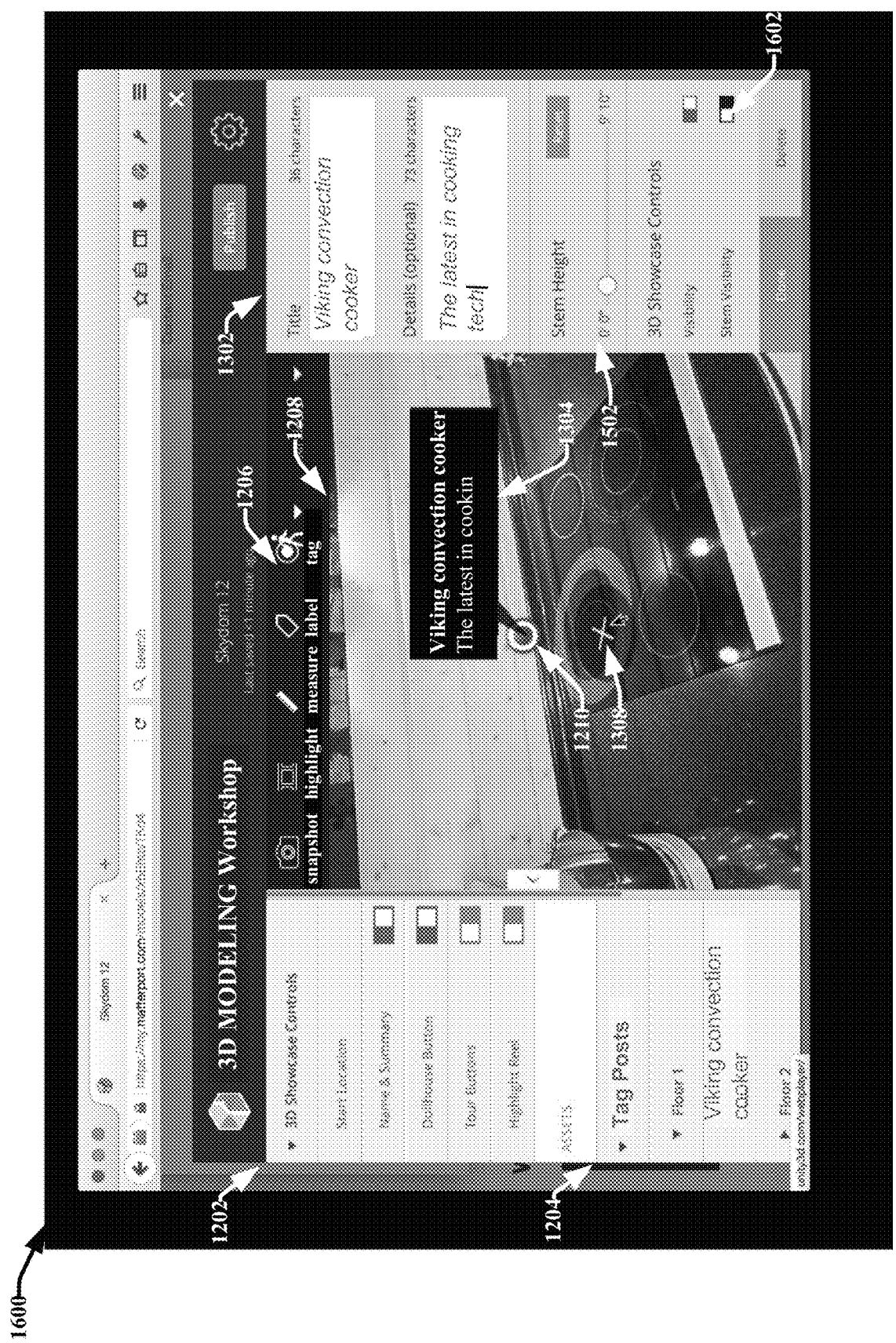

FIG. 16 presents an example interface 1600 in which the user has repositioned the tag icon 1210 and/or associated location on the representation associated with the tag icon, represented by the X mark 1308 and associated darkened circle. For example, the user may have repositioned the tag icon 1210 by selecting the tag icon and dragging it to the new location which caused the X mark 1308 on the surface of the oven range to follow. In another example, the user may have may have moved the X mark 1308 by selecting the new location of the model and the tag icon was moved to the new location in response. In addition, the user has chosen to turn off the visibility of the stem 1306 (e.g., via stem visibility control 1602).

Figure 17:
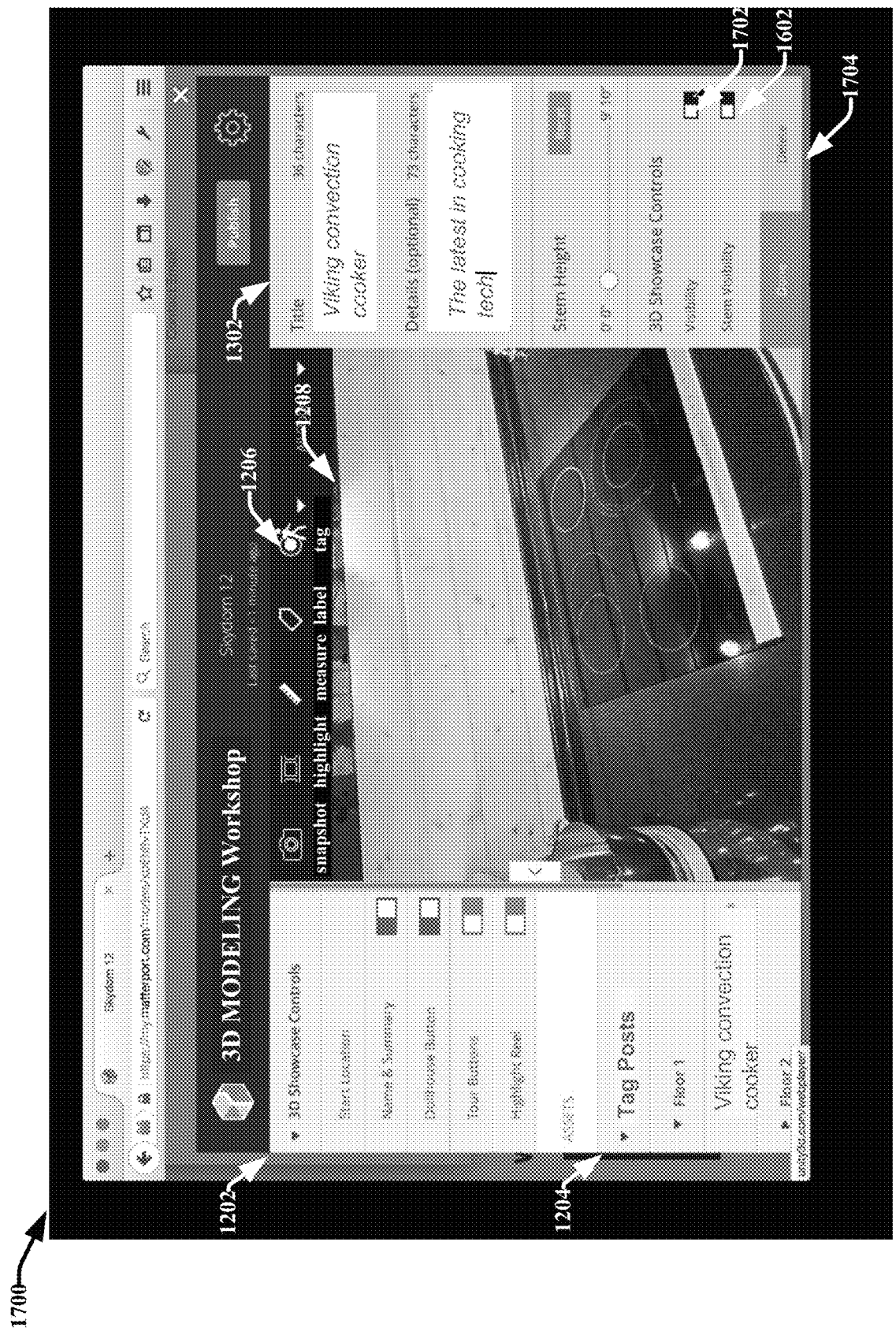
Figure 18:
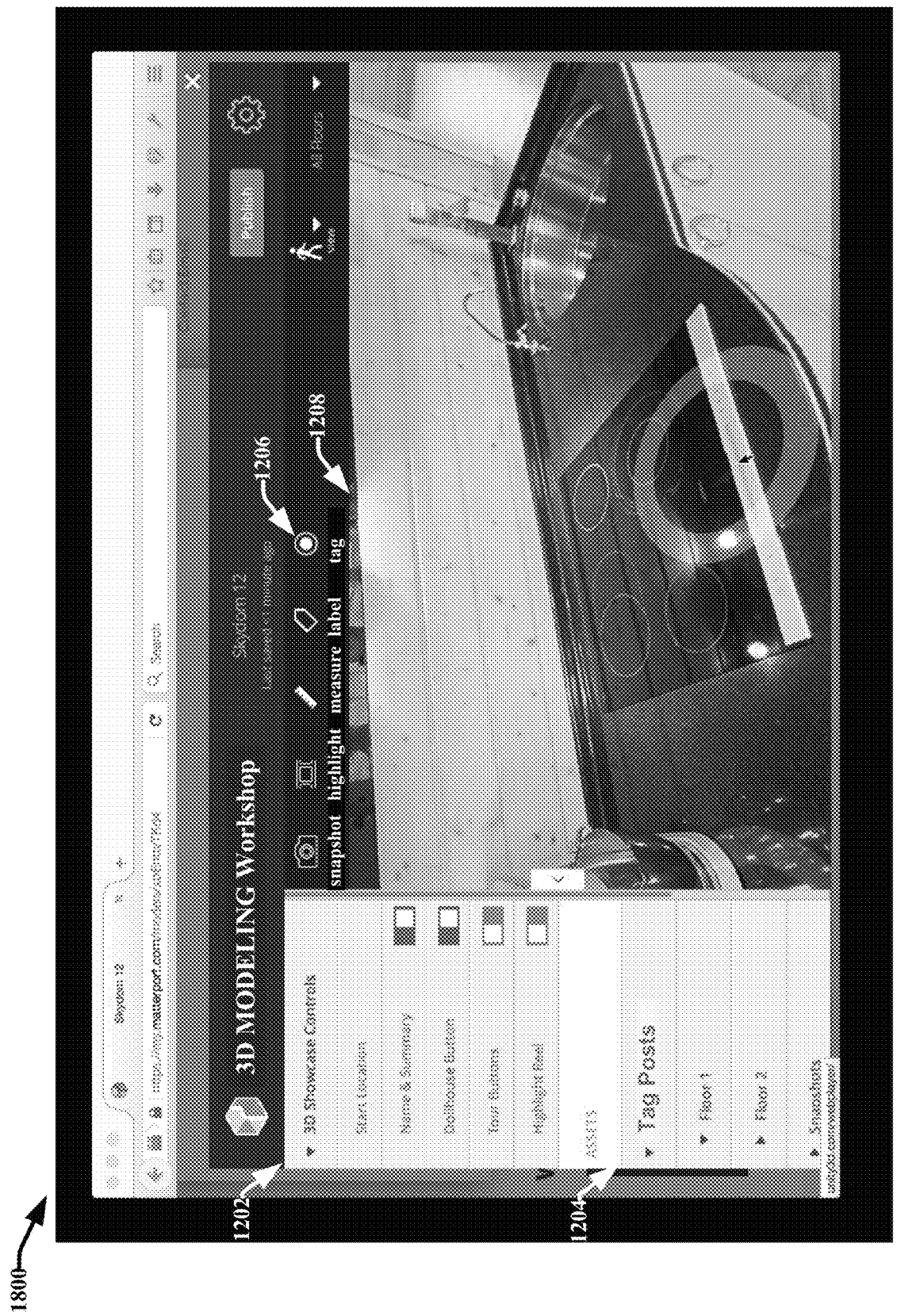

FIG. 17 presents an example interface 1700 in which the visibility of the tag icon 1210 has been turned off (e.g., via tag visibility control 1702). As result, the tag icon 1210 and associated billboard panel 1304 have been removed from display. Accordingly, when the 3D model is later published and displayed to a viewer, the 3D model will not include a tag icon associated with the oven range. However, although the visibility of the tag icon 1210 has been disabled the tag has still been created and associated with the 3D model (e.g., as indicated in the Tag Posts section 1204). According to this embodiment, the tag can facilitate various other functions aside from providing visual cue of additional details of the oven range in association with viewing and consuming the 3D model. Further, the tag visibility can later be switched to visible depending on a particular consumption experience. On the other hand, FIG. 18 presents an example interface 1800 in which the tag has been deleted (e.g., in response to selection of the delete button 1704 shown in interface 1700). As shown in interface 1800, when a tag is deleted, the menu panel 1302 is dismissed and the tag is removed from the Tag Posts section 1204.

Figure 19:
FIG. 19 presents another example representation of a 3D model of an environment including tags in accordance with various aspects and embodiments described herein.

FIG. 19 presents another example representation 1900 of a 3D model of an environment to which tags have been applied in accordance with various aspects and embodiments described herein. In an embodiment, representation 1900 includes an example view of the 3D model associated with FIGS. 12-18 during a viewing/navigation experience (e.g., in walking mode) after tags have been applied to the 3D model. For example, as shown in FIG. 19, interface 1900 includes a tag icon 1902 associated with the oven range. In an aspect, tag icon 1902 corresponds to tag icon 1210 that was applied to the 3D model as exemplified in FIGS. 12-17. Representation 1900 also includes additional tag icons 1904, 1906, 1908, and 1910. In an aspect, tag icons 1904, 1906, 1908 and 1910 were applied to the 3D model using a same or similar mechanism described in association with application of tag icon 1210 to the oven range described with reference to FIGS. 12-17. Repetitive description of like elements employed in respective embodiments is omitted for sake of brevity.

Figure 20:
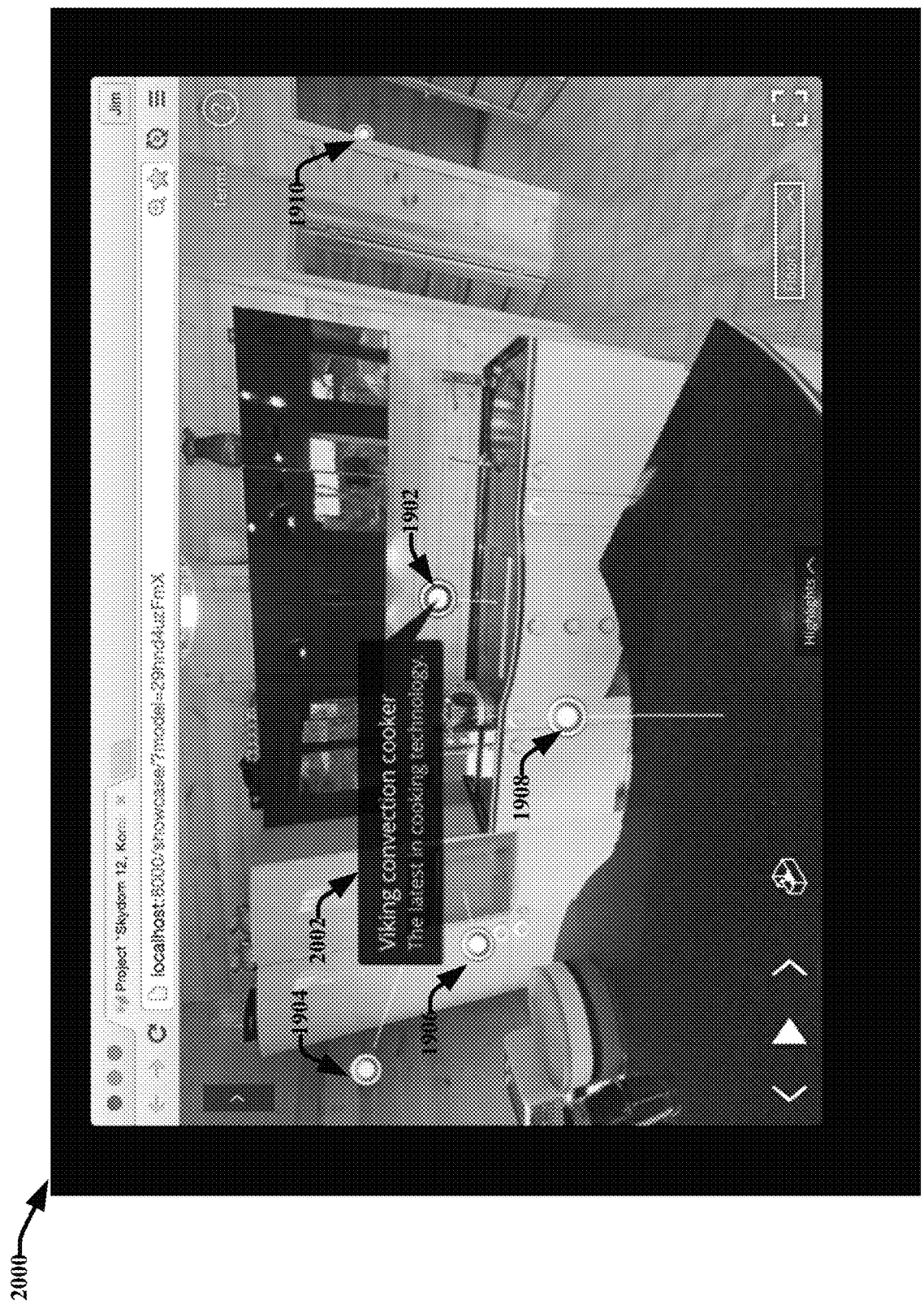
FIG. 20 presents an example representation of a 3D model of an environment rendered in response to interaction with a tag icon included in the representation, in accordance with various aspects and embodiments described herein.

FIG. 20 presents another example representation 2000 of a 3D model of an environment in response to interaction with a tag icon included in the representation, in accordance with various aspects and embodiments described herein. In particular, representation 2000 is substantially similar to representation 1900 with the addition of billboard panel 2002 associated with tag icon 1902. In an aspect, the billboard panel 2002 was activated in response hovering of a cursor, finger, stylus, etc., over or near tag icon 1902 (e.g., in browse mode). Repetitive description of like elements employed in respective embodiments is omitted for sake of brevity.

Figure 21:
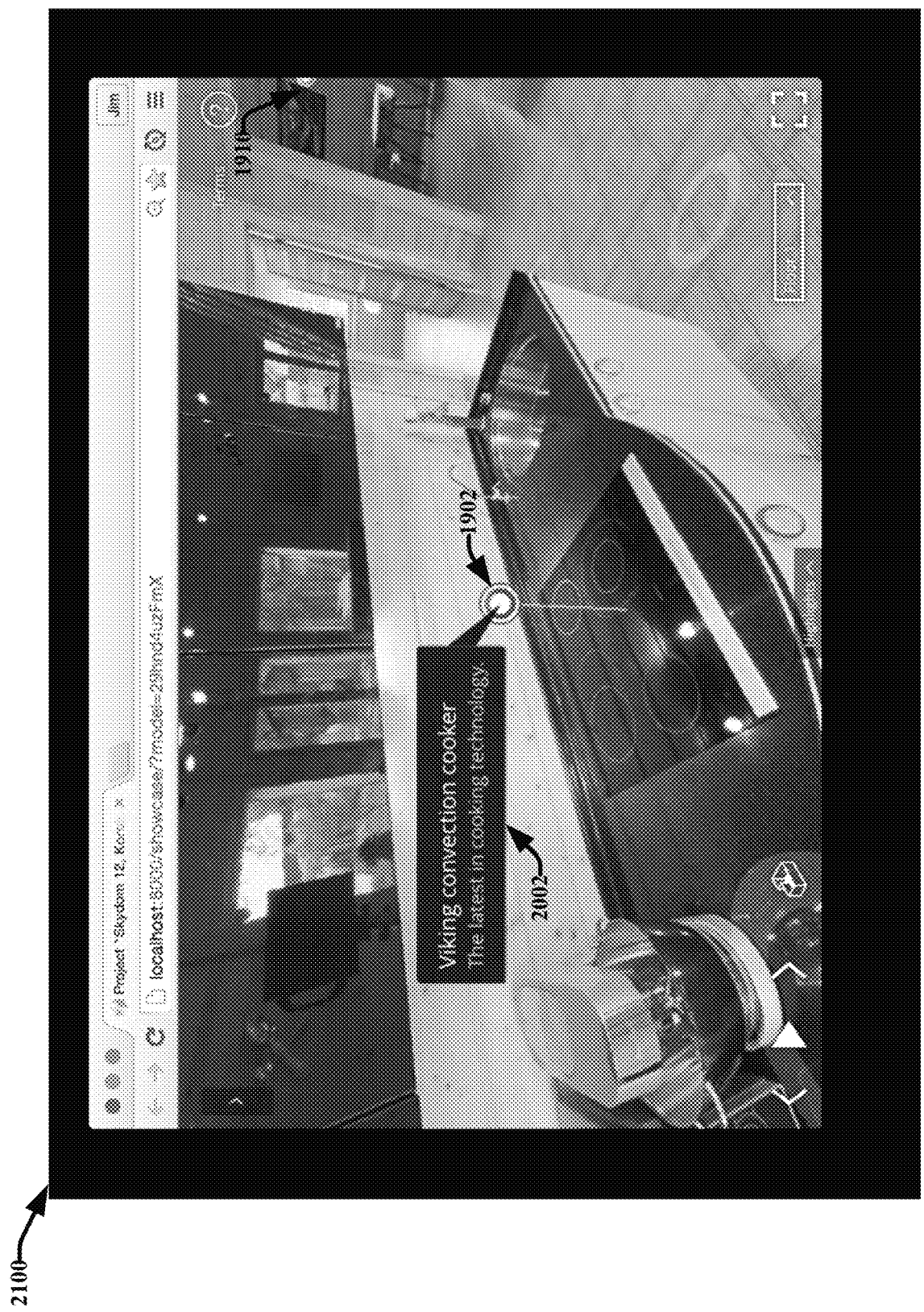
FIG. 21 presents another example representation of a 3D model of an environment in response to selection of a tag icon included in the representation, in accordance with various aspects and embodiments described herein.

FIG. 21 presents another example representation 2100 of a 3D model of an environment in response to selection of a tag icon included in the representation, in accordance with various aspects and embodiments described herein. In particular, representation 2100 includes a close-up or feature view of the oven range. In an aspect, representation 2100 was generated and/or rendered in response to selection of tag icon 1902 (e.g., in examine mode). Repetitive description of like elements employed in respective embodiments is omitted for sake of brevity.

Figure 22:
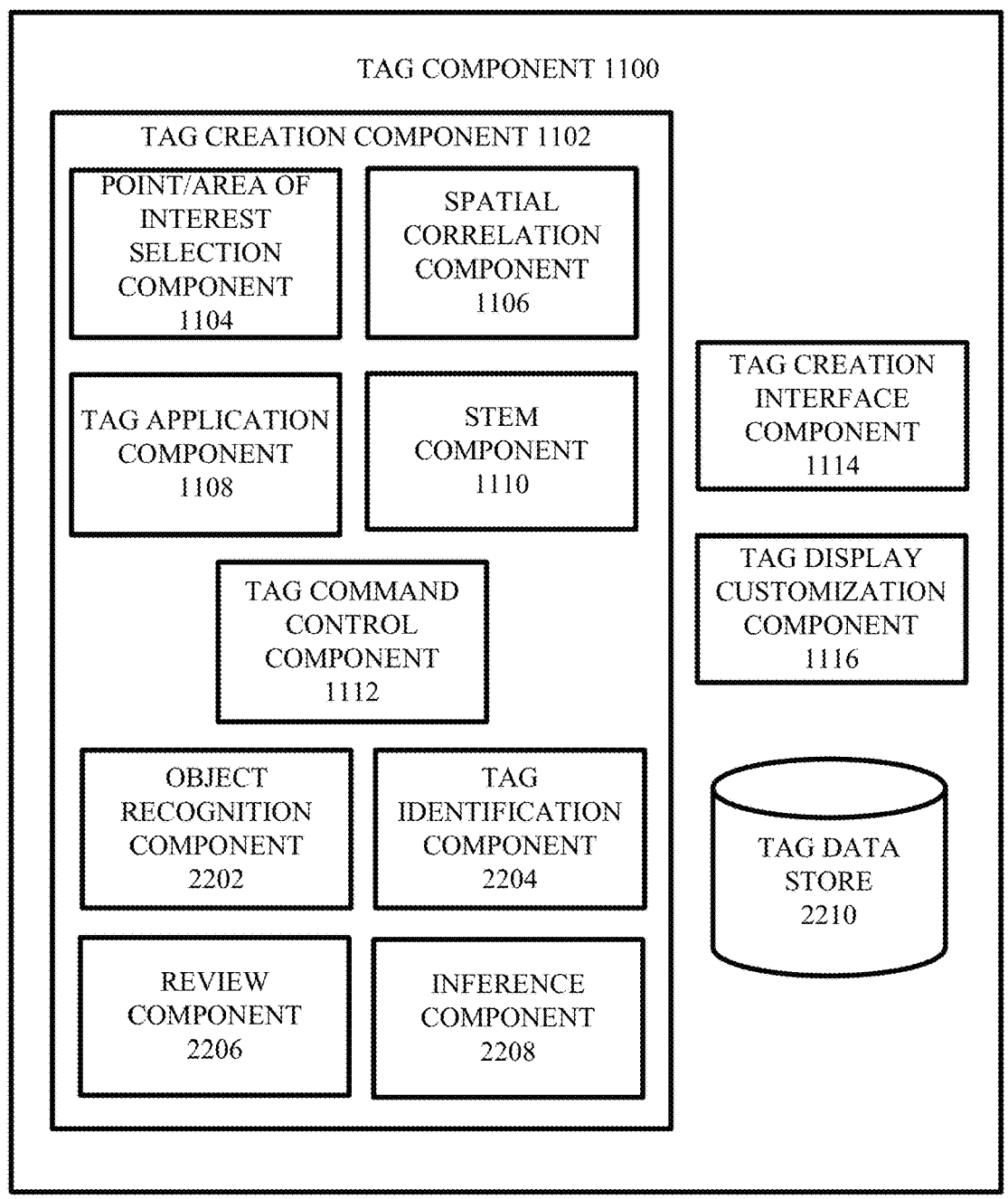
FIG. 22 illustrates a high level view of another example tag component that facilitates defining, viewing and interacting with tags in a 3D model in accordance with various aspects and embodiments described herein.

FIG. 22 illustrates another high level view of tag component 1100 in accordance with one or more additional embodiments described herein. Repetitive description of like elements employed in respective embodiments is omitted for sake of brevity.

In various additional embodiments, the tag component 1100 can further facilitate automatic or semi-automatic application of tags and associated tag icons to a 3D model. The tag component 1100 can also provide for automatically defining how and when the tags and associated tag icons are presented to end users during viewing/navigation of the 3D model. In accordance with these embodiments, the tag creation component 1104 can further include object recognition component 2202, tag identification component 2204, review component 2206, and inference component 2208. The tag component 1100 can also include tag data store 2210.

In one or more embodiments, object recognition component 2202 can be configured to identify objects (e.g., structural objects, fixtures, appliances, furniture, decorative objects, people, places, things, etc.) that appear in a 3D model using hardware, software, or a combination of hardware and software that provides for automated detection of visual objects appearing in images, video, or 3D models. For example, with reference to a 3D model that depicts an interior space of a home, the object recognition component 2202 can identify walls, floors, ceilings, windows, fixtures, appliances, furniture, and the like. The object recognition component 2202 can further identify groups of objects associated with one another. For example, the object recognition component can identify groups of objects associated with a particular room (e.g., the kitchen, or a bedroom). Object recognition algorithms rely on matching, machine learning, or pattern recognition algorithms using appearance-based or feature-based techniques. Common techniques include edge detection, gradients, histogram of oriented gradients (HOG), Haar wavelets, and linear binary patterns. In various embodiments, the object recognition component 2202 can identify objects appearing in image data associated with a 3D model using a variety of models, including but not limited to: extracted features and boosted learning algorithms, bag-of-words models with features such as speeded-up robust features (SURF) and maximally stable external regions (MSER), gradient-based and derivative-based matching approaches, Viola-Jones algorithm, template matching, deep learning, image segmentation and blob analysis.

In some implementations, the object recognition component 2202 can determine detailed characteristics associated with identified objects to increase the accuracy of identifying a potential tag to associate with the respective objects. The detailed characteristics can include any potential characteristic about an object that can be discerned by the object recognition component 2202. For example, the detailed characteristics can relate to a color or colors of the object, a type of the object, a dimension of the object, a material of the object, a make or brand associated with the object, an identity associated with the object, etc. For instance, in addition to detecting an appliance included in the kitchen of a 3D model, the object recognition component 2202 can determine that the appliance is microwave, determine the brand of the microwave, the model of the microwave, and a size of the microwave.

In some embodiments, the object recognition component 2202 can employ contextual information received in association with the capture process to facilitate identifying an object included in a 3D model. For example, in some implementations, during the capture process, a user can provide spoken notes or annotations about the environment being captured. For instance, as the user is scanning a living room with a 3D capture device, the user can provide spoken notations about the objects the user sees in person and/or in captured 2D/3D image data. For example, the user may state that the living room has hardwood floors, the type of wood of the floors, the company from which the flooring was purchased, and any other possible descriptive information that the user might know that can facilitate identifying the floors and/or associated tag data with the floors when rendered in a 3D model of the living room. These spoken notations can be associated with specific image data captures (e.g., 2D images) as well as position information associated with the image data captures, including position information for pixels or points respectively included in the 2D images. In addition, the object recognition component 2202 can employ sensor measurement information (e.g., temperature, pressure, light, etc.) associated with a captured 2D or 3D image data of the environment to facilitate identifying objects included in the 2D or 3D image data. Thus in some embodiments, the object recognition component 2202 can employ the contextual cues previously associated with image data of the 3D model to identify and characterize objects in the 3D model.

In addition, rather than attempting to recognize and characterize all potential taggable objects included in a 3D model, the object recognition component 2202 can employ contextual annotation information received during the capture process that indicates what objects to specifically identify and characterize for tagging purposes. For example, this contextual annotation information can include verbal annotations provided by a user during the capture process as well as image based contextual information. For example, the user can take a close up picture or video of an object and/or logo on the object to facilitate automated object recognition of the object and to indicate a tag is desired to be associated with the object. In other embodiments, a user can provide input selecting a point or set of points included in 2D or 3D image data associated with a 3D model (e.g., including captured image data prior to alignment and representations of the 3D model generated after generation of the 3D model) that the user desires to apply a tag. The object recognition component 2202 can further be configured to analyze the visual and structural characteristics associated with the point or set of points to determine and characterize the object associated therewith.

The spatial correlation component 1108 can also determine a position of an object included in a 3D model identified via the object recognition component 2202 using the various techniques described herein. For example, the spatial correlation component can invoke the structural and visual properties of the object to determine a point or group of points in the 3D model corresponding to the object. The spatial correlation component 1108 can further determine a 3D position of the point or group of points relative to the 3D model and the 3D coordinate space. In some implementations, the spatial correlation component 1108 can also employ information received during the capture process that associated an object with a particular 2D image or 3D data set for which spatial information is associated from which the spatial location of the object relative to the 3D model and the 3D coordinate space in which the 3D model is aligned can be determined.

After an object included in a 3D model has been identified and/or characterized and a 3D location of the object relative to the 3D model has been determined, the tag application component 1110 can be configured to automatically define and apply one or more tags to the object. In some implementations, the tag application component 1110 can also automatically define and apply a tag icon to the object for including in representations of the 3D model when viewed and navigated by an end user. In the case that multiple identical or similar objects exist in a single 3D model or across multiple 3D models, object recognition component 2202 may be able to apply a known label from an object to all other instances of that object.

In one or more embodiments, the tag application component 1110 can employ the tag data store 2210 and the tag identification component 2204 to facilitate automatically identifying and applying tags to objects included in a 3D model identified by object recognition component 2202. According to these embodiments, the tag data store 2210 can include information identifying a plurality of known objects, including unique identifiers and details identifying the known objects, and one or more tags associated with the known objects, respectively. In one or more embodiments, the tag data store is provided in memory included at or accessible by the 3D modeling and navigation server device 402 (e.g., memory 418). In some aspects, the known objects can include objects previously identified/characterized and associated with one or more tags in another 3D model. For example, each time a tag is defined applied to an object in a 3D model (e.g., either automatically or manually), information identifying the object and including the tag can be added as an entry in the tag database. Over time, same objects can become associated with a plurality of different tags and the number of tagged object identified in the database will increase. In another aspect, the known objects and associated tags can be manually entered into the tag data store 2210.

After the object recognition component 2202 has identified an object included in a 3D model, in one or more embodiments, the tag identification component 2204 can be configured to scan the tag data store to determine whether the identified object is included in the tag data store 2210. In some embodiments, in response to a determination that the identified object is included in the tag data store 2210, the tag application component 1110 can be configured to automatically apply one or more of the tags to the object as included in the 3D model that are with the object in the tag data store 2210. In other embodiments, in addition or alternative to employing the tag data store, the tag identification component 2204 can be configured to scan one or more external data sources (e.g., accessible via one or more networks 422) to find information identifying an object included in the 3D model and extract data associated with the object provided at the external data source for association with the object in the 3D model as a tag. For example, the external source can include a merchant website including information identifying various objects or structures that could be included in a 3D model and including additional information about the objects that could be employed as tags (e.g., images, videos, descriptions, purchasing links, advertisements, etc.).

In various embodiments, the ability of the object recognition component 2202 to accurately identify and characterize objects included in a 3D model and the ability of the tag identification component 2204 to accurately match the objects with known objects identified in the tag data store 2210 and/or located at an external source can be optimized via review component 2206 and various machine learning techniques. For example, the review component 2206 can provide a mechanism by which a user (e.g., an end user viewing the 3D model or an author responsible for publishing the 3D) can view an object identified in a 3D model well as tag information that has been associated with the object. In some aspect, the user can provide feedback regarding the accuracy of the identified object and/or the tag information associated therewith. For example, the user can indicate the object is correctly or incorrectly identified and/or characterized and/or whether the tag information is correct or incorrect. The user can further provide correction information that corrects any errors attributed to the object recognition component 2202 and/or the tag identification component 2204. The object recognition component 2202 and/or the tag identification component 2204 can further employ the error information and the correction information (as well as positive information indicating correctly identified and tagged objects) to optimize future determinations associated with identifying the same or similar object in new 3D models and/or applying the same or similar tag data to a particular object included in a new 3D model.

In another implementation, the tag application component 1110 can generate and define tags to objects included in a 3D model identified via object recognition component 2202 based on contextual information that was received during the capture process. According to this implementation, a tag for an object identified via object recognition component 2202 can include an audio description of the object provided by the user during the capture process, or a text version of the audio description (e.g., converted to text via suitable speech to text hardware and/or software). Also according to this implementation, the tag can include one or more pictures of the object (e.g., detailed views of the object, close-up views of the object, 360° views of the object, etc.) or a video of the object.

In some embodiments, a plurality of different tags can be automatically applied to an object identified by object recognition component 2202. For example, a known object included in the tag data store 2210 can be associated with tags of different types, classes and content. Thus in some embodiments, the tag application component 1108 can be configured to determine one or more appropriate tags for applying to a particular 3D model based on information including but not limited to, a type of the 3D model, a user associated with creation or publishing of the 3D model, an audience of the 3D model, and a viewing context for the 3D model. Similarly, in some embodiments a number of the different tags can be associated with the same object and the tag application component 1108 and the rendering component 426 can be configured to select one or more of the tags for rendering in representations of the 3D model based on various factors, including but not limited to, the viewer or audience viewing the representation (e.g., a preference or demographic characteristic), a viewing context (e.g., location, time of day, day of year, mobility state, etc.) and a characteristic of the client device at which the 3D model is displayed.

Inference component 2208 is configured to provide for or aid in various inferences or determinations associated with aspects of tag creation component 1104. For example inference component 2208 can facilitate the tag application component 1108 in association with determining what tags to apply to an object identified by object recognition component 2202. In another example, inference component 2208 can facilitate object recognition component 2202 in association with automatically identifying and characterizing objects included in a 3D model for which to apply tags. In another example, tag identification component 2204 can employ inference component 2208 to facilitate matching an object identified by object recognition component 2202 with a known object included in the tag data store 2210 and/or provided at an external source. In various additional embodiments, the tag component 1100 and/or the rendering component 426 can employ inference component 2208 to facilitate determining when and how to display a tag icon and/or the tag associated therewith (e.g., based on the various conditions described herein, including but not limited to, a preference of the author, a characteristic of the viewer, a viewing context, and/or a characteristic of the client device).

In order to provide for or aid in the numerous inferences described herein, inference component 2208 can examine the entirety or a subset of the data to which it is granted access and can provide for reasoning about or infer states of the system (e.g., system 400 and the like), environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x4, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 23:
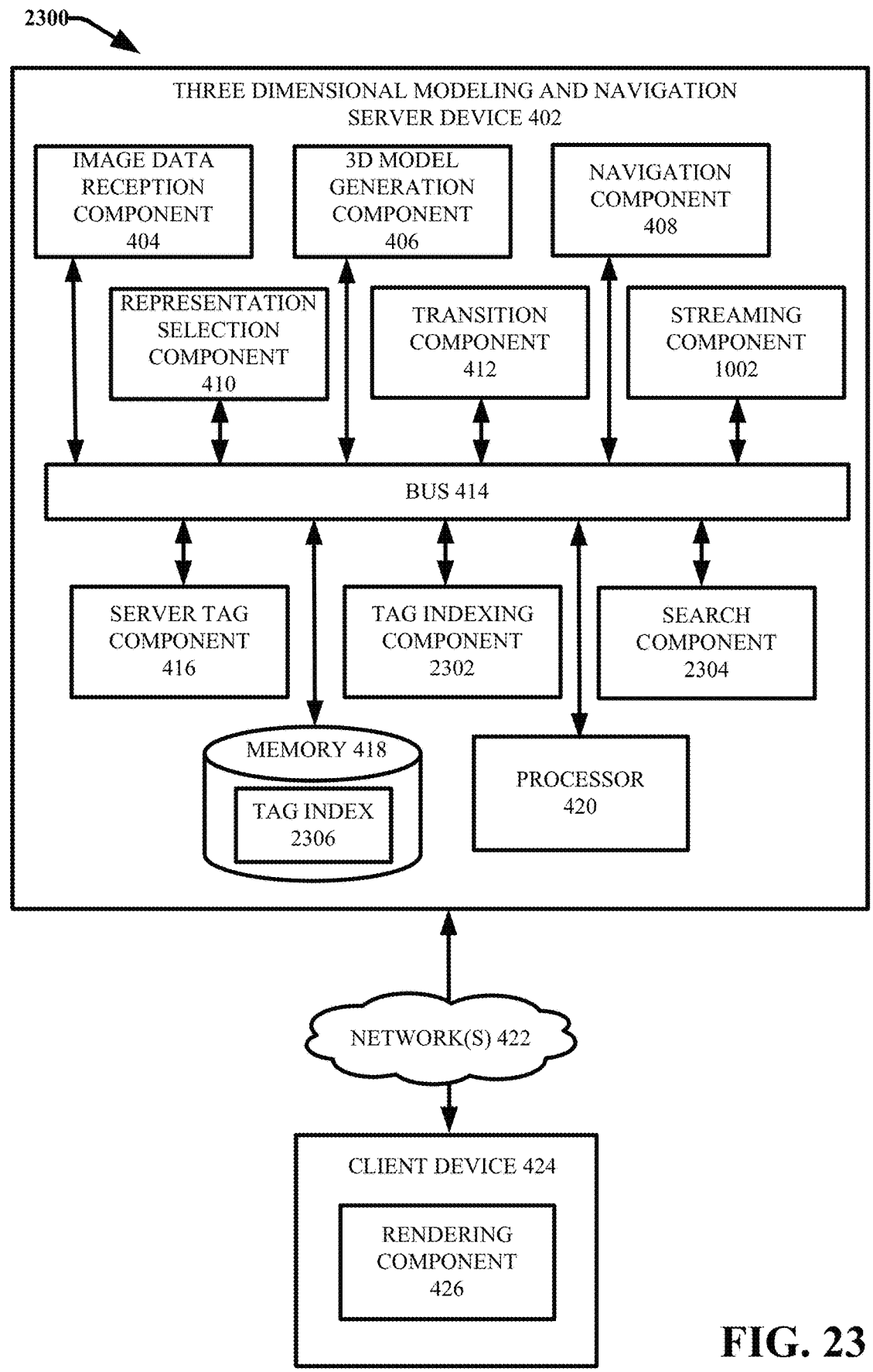
FIG. 23 illustrates another example system that facilitates navigating and interacting with a 3D model including tags in accordance with various aspects and embodiments described herein.

FIG. 23 illustrates another example system 2300 that facilitates navigating and interacting with a 3D model including tags in accordance with various aspects and embodiments described herein. System 2300 can include same or similar features as systems 400, 401, and 1002 with the addition of tag indexing component 2302, search component 2304 and tag index 2306. It should be appreciated that although in the embodiment shown, the tag indexing component 2302, the search component 2304 and the tag index 2306 are located at the 3D modeling and navigation server device 402, in some embodiments, the client device 424 can additionally or alternatively include one or more of the tag indexing component 2302, the search component 2304 or the tag index 2306 and/or another device accessible to the client device 424 and/or the server device 402 can include one or more of the tag indexing component 2302, the search component 2304 or the tag index 2306. Repetitive description of like elements employed in respective embodiments is omitted for sake of brevity.

In various embodiments, the tag indexing component 2302 can be configured to generate a tag index (e.g., tag index 2306) including information identifying points, areas or objects respectively included in one or more 3D models having tags associated therewith based on application of the tags to the respective 3D models. For example, the tag index 2306 can be provided in memory 418 or otherwise be accessible to the 3D modeling and navigation server device 402 to facilitate various features and functionalities, including but not limited to, efficiently and automatically identifying points, areas, or objects included in a 3D model including tags, efficiently and automatically identifying the tags associated with points, areas or objects included in a 3D model, and performing search queries against the index to efficiently determine information regarding relationships between particular points, area or objects included in a 3D model and relationships between particular points, area or objects included in different 3D models.

For example, in some embodiments, the tag index 2306 can include information including but not limited to: information identifying points, areas or objects included in one or more 3D models that are associated with one or more tags, information identifying the one or more 3D models including the respective points, areas or objects; information identifying related 3D models (e.g., different 3D model versions of the same environment or object); information identifying real-world location, environment or objects represented by the one or more 3D models; information identifying respective 3D locations of the points, areas or objects in the one or more 3D models, respectively; information identifying one or more tags associated with the point, area, or object, including the content of the one or more tags; and in some implementations, additional metadata associated with the one or more tags. For example, this additional information can include but is not limited to: a date associated with the application of a tag, a user associated with application of the tag, a type of the tag, an audience for the tag, the type of object associated with the tag, and the like. In some implementations the tag indexing component 2306 can further monitor and associate information with a tag in the tag index regarding consumption of the tag during viewing of a 3D model by users. For example, the consumption information can include but is not limited to: a level of monitored interaction with the tag icon for the tag, a level of selection of the tag icon, a level of engagement with the tag data or metadata (e.g., a duration of time associated with viewing the tag content, a degree of selection of a hyperlink included in the tag, and the like).

The search component 2304 can provide various searching functionalities based on the tag index 2306 developed by the tag indexing component 2302. For example, the search component 2304 can allow a user to provide one or more filter criteria and receive search results against tag index 2306 based on the one or more filter criteria. For example, using the search component 2304 and the tag index 2306, a user can request and receive information identifying 3D models that include a particular object. In another example, using the search component 2304 and the tag index 2306, a user can request and receive information identifying the number and/or locations of points or areas in a 3D model that include a particular object. In another example, using the search component 2304 and the tag index 2306, a user can request and receive information identifying 3D models of a same or similar object or environment. In another example, using the search component 2304 and the tag index 2306, a user can request and receive information identifying 3D models that include a particular type of tag (e.g., a text tag, a video tag, an image tag, an audio tag, a hyperlink tag, etc.), and/or include the particular type of tag for a particular type of object, (e.g., wood flooring). In another example, using the search component 2304 and the tag index 2306, a user can request and receive information identifying tags included in a 3D model that were applied by a particular user. In another example, using the search component 2304 and the tag index 2306, a user can request and receive information identifying 3D an amount or frequency of selection of a tag for a particular object included in one or more 3D models.

Figure 24:
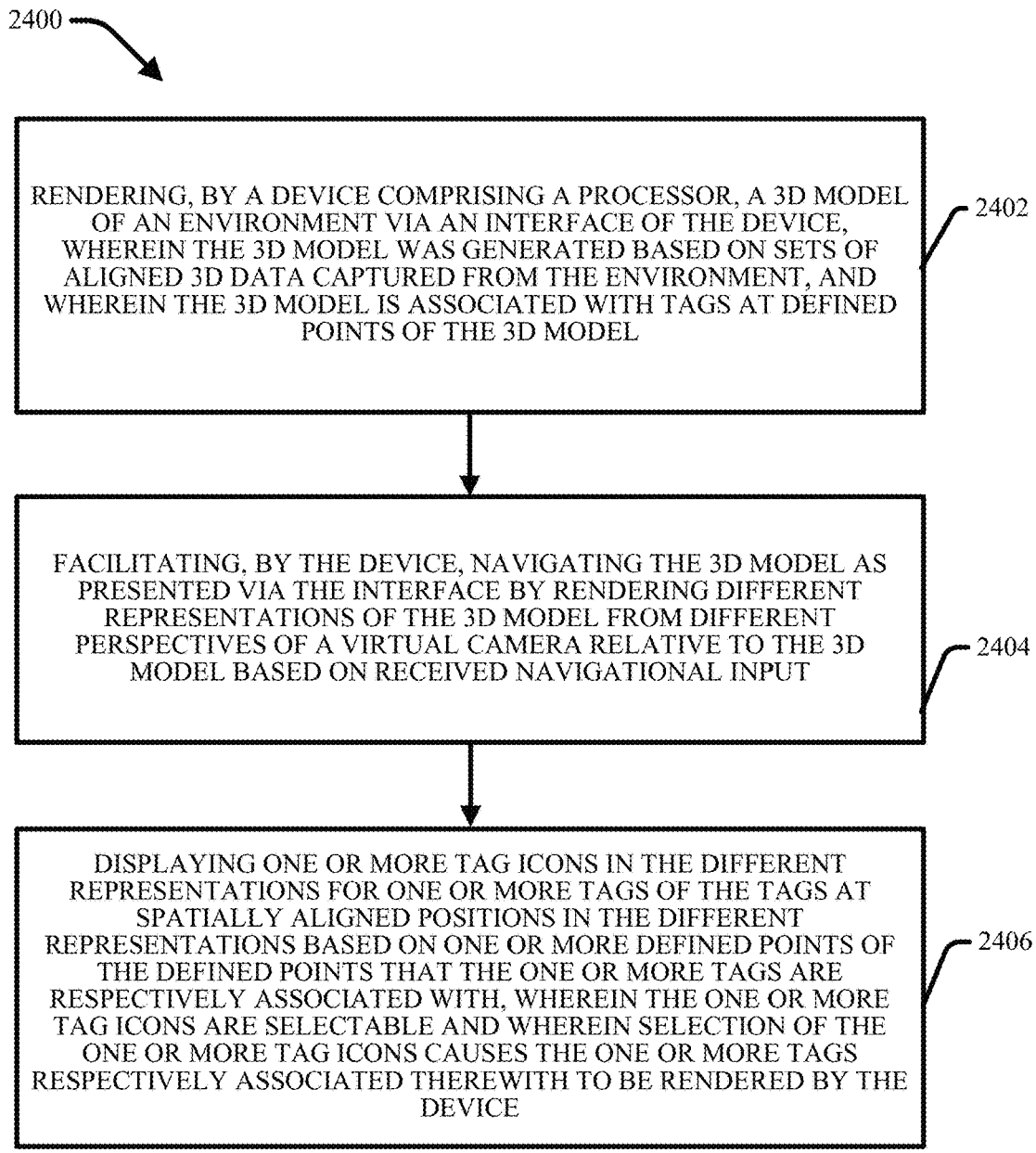
FIGS. 24-26 provide flow diagrams of example methods for navigating and interacting with a 3D model including tags in accordance with various aspects and embodiments described herein.
Figure 25:
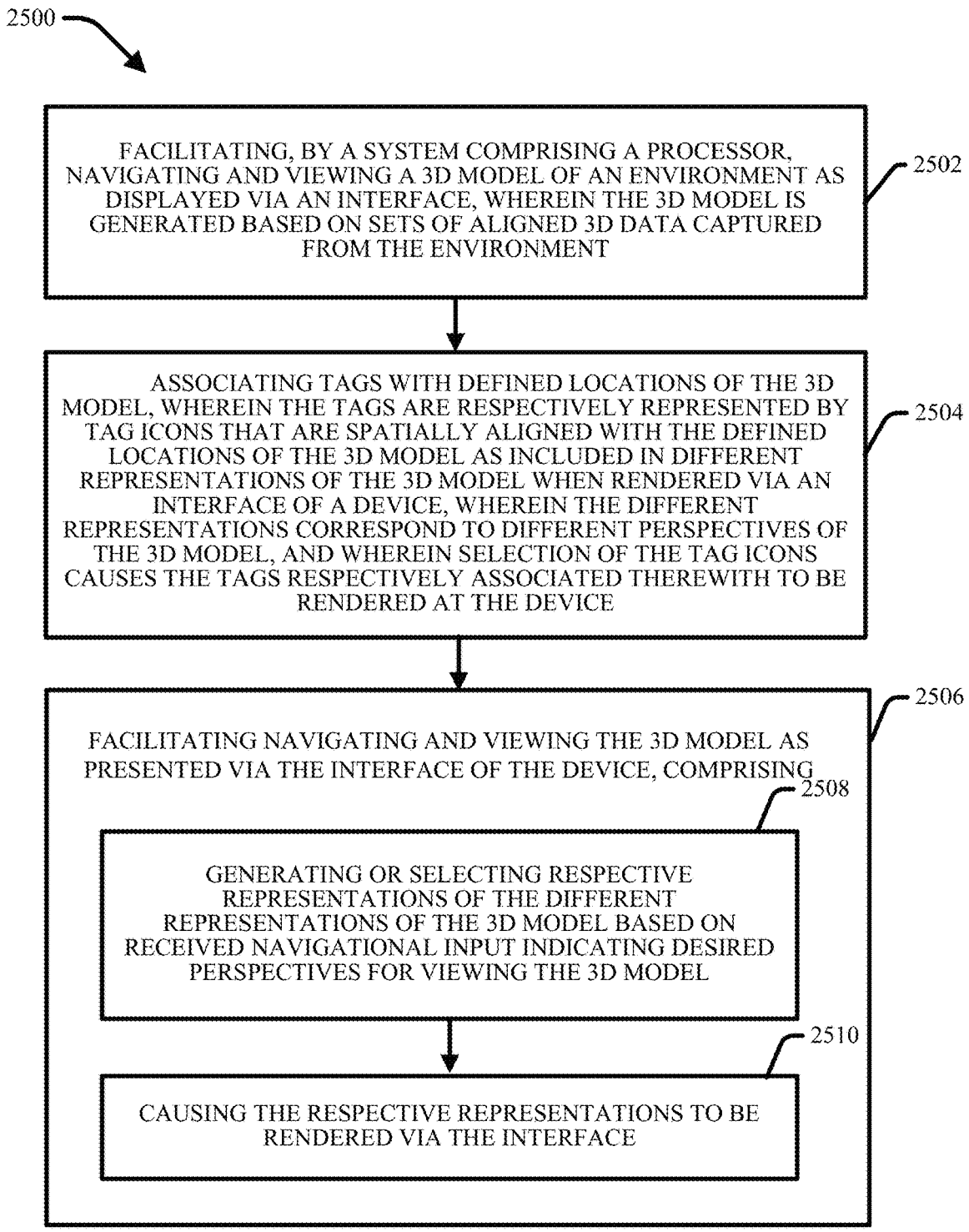
Figure 26:
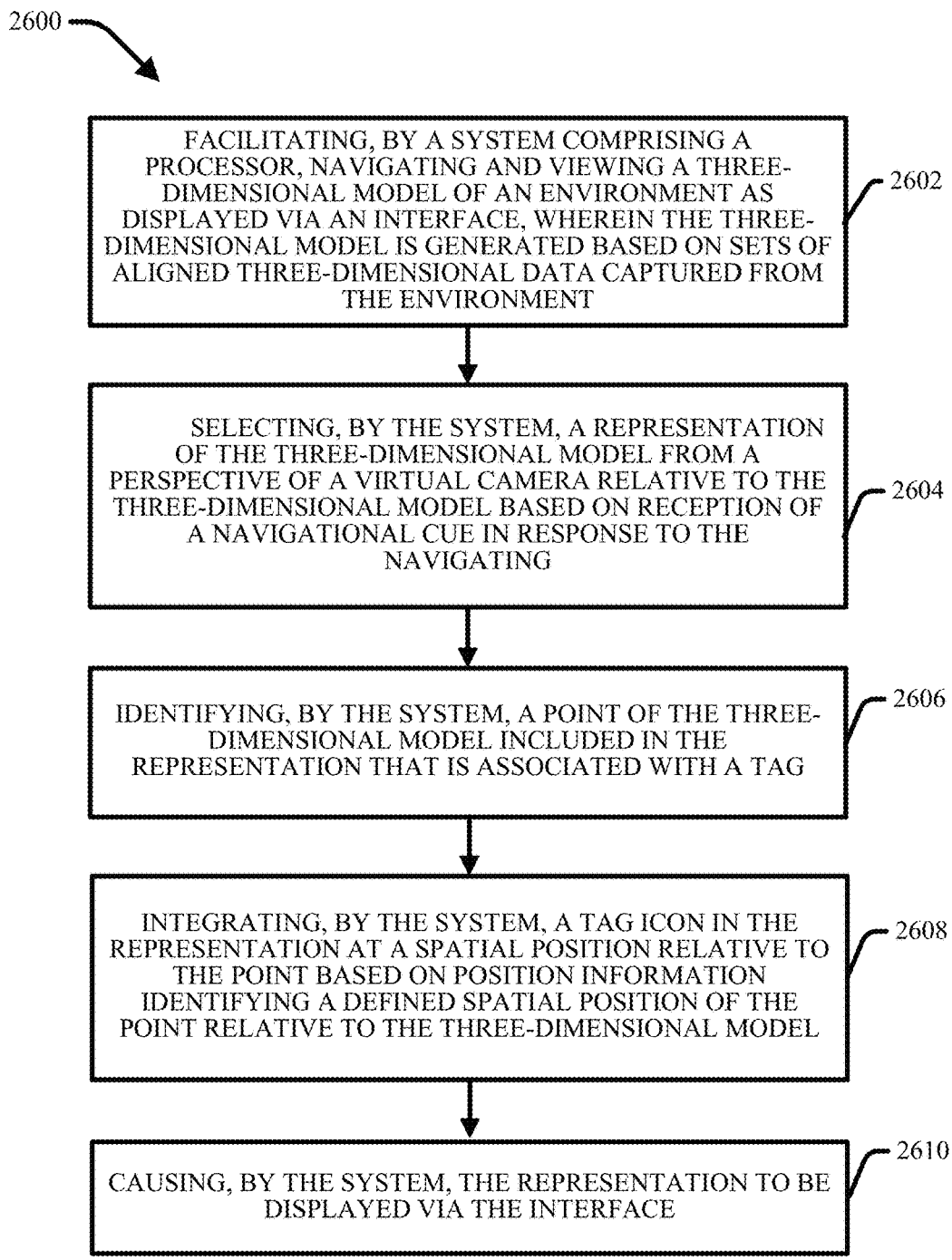

In view of the example systems, apparatus, and computer readable storage mediums described herein, example methods that can be implemented in accordance with the disclosed subject matter can be further appreciated with reference to the flowcharts in FIGS. 24-26. Repetitive description of like elements employed in respective embodiments is omitted for sake of brevity. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 24 provides a flow diagram of an example method 2400 for navigating and interacting with a 3D model including tags in accordance with various aspects and embodiments described herein. Repetitive description of like elements employed in respective embodiments is omitted for sake of brevity.

At 2402, a device comprising a processor, (e.g., client device 424) renders a 3D model of an environment via an interface of the device, wherein the 3D model was generated based on sets of aligned 3D data captured from the environment, and wherein the 3D model is associated with tags at defined points of the 3D model (e.g., via rendering component 426). At 2404, the device facilitates navigating the 3D model as presented via the interface comprising, by rendering different representations of the 3D model from different perspectives of a virtual camera relative to the 3D model based on received navigational input, wherein the different representations represent volumes of the 3D model viewed from the different perspectives. At 2406, the device displays one or more tag icons in the different representations for one or more tags of the tags at spatially aligned positions in the different representations based on one or more defined points of the defined points that the one or more tags are respectively associated with (e.g., via rendering component 426 and/or client tag component 428), wherein the one or more tag icons are selectable and wherein selection of the one or more tag icons causes the one or more tags respectively associated therewith to be rendered by the device.

FIG. 25 provides a flow diagram of an example method 2500 for navigating and interacting with a 3D model including tags in accordance with various aspects and embodiments described herein. Repetitive description of like elements employed in respective embodiments is omitted for sake of brevity.

At 2502, a system comprising a processor (e.g., system 400, 401 or 2300) generates a 3D model of an environment based on sets of aligned 3D data captured from the environment (e.g., via 3D model generation component 406). At 2504, the system associates tags with defined locations of the 3D model (e.g., via tag component 1100), wherein the tags are respectively represented by tag icons that are spatially aligned with the defined locations of the 3D model as included in different representations of the 3D model when rendered via an interface of a device, wherein the different representations correspond to different perspectives of the 3D model, and wherein selection of the tag icons causes the tags respectively associated therewith to be rendered at the device. At 2506, the system facilitates navigating and viewing the 3D model as presented via an interface rendered by the device, by generating or selecting respective representations of the different representations of the 3D model based on received navigational input indicating desired perspectives for viewing the 3D model (e.g., via representation selection component 410) at 2508, and causing the respective representations to be rendered via the interface at 2510 (e.g., via streaming component 2002).

FIG. 26 provides a flow diagram of an example method 2600 for navigating and interacting with a 3D model including tags in accordance with various aspects and embodiments described herein. Repetitive description of like elements employed in respective embodiments is omitted for sake of brevity.

At 2602, a system (e.g., system 400, 401 or 2300) including a processor, facilitates navigating and viewing a 3D model of an environment as displayed via an interface, wherein the 3D model is generated based on sets of aligned 3D data captured from the environment. At 2604, the system selects a representation of the 3D model from a perspective of a virtual camera relative to the 3D model based on reception of a navigational cue in response to the navigating (e.g., via representation selection component 410). At 2606, the system identifies a point of the 3D model included in the representation that is associated with a tag (e.g., via tag component 1100 and/or rendering component 426). At 2608, the system integrates a tag icon in the representation at a spatial position relative to the point based on position information identifying a defined spatial position of the point relative to the 3D model (e.g., via tag component 1100 and/or rendering component 426), and at 2610, the system causes (e.g., via streaming component 1002 and/or rendering component 426) the representation to be displayed via the interface.

The subject systems, apparatuses, methods and computer readable mediums for defining, applying, viewing and interacting with tags in a reconstructed 3D space can provide a plethora of novel applications in the fields of real estate, construction, home improvement, remote automation, monitoring and control, advertising, ecommerce, news and entertainment publishing, education, sightseeing, navigation, and historical recording of locations. For example, with regard to real estate applications, the subject systems, apparatuses, methods and computer readable mediums can facilitate directing attention to premium features of a home listing, such as textual annotations that could be used to describe exterior views, quality of building materials home appliances, and other enticing characteristics of a property.

With regard to construction, the subject systems, apparatuses, methods and computer readable mediums can facilitate communicating dimensions, building materials, architectural modifications, electrical wiring layouts, plumbing fixtures, and other purposeful information about a construction site. With regard to home improvement, the subject systems, apparatuses, methods and computer readable mediums can facilitate using text, image, video and other media for describing remodeling ideas, cabinet selections and styles, paint or wallpaper choices, decorative alternatives, environmental considerations, and other details of a home improvement project. With regard to remote automation applications, the subject systems, apparatuses, methods and computer readable mediums can facilitate monitoring and controlling equipment, such as observing variations in room temperature, turning appliances on/off remotely, or changing settings for remote devices that have associated replicas in the 3D space model. With regard to news and entertainment applications, the subject systems, apparatuses, methods and computer readable mediums can facilitate discovering factual information about any real world location by incorporating associated details, reports, figures, evidence, documents or other material as a part of the metadata, in order to richly describe aspects of the 3D space in words, sound, images, movie clips, and hyperlinked web pages. With regard to educational applications, the subject systems, apparatuses, methods and computer readable mediums can facilitate learning new information in the context of a 3D space, in which tags provide lessons, diagrams, classroom exercises, assignments, quizzes, audio or video lectures, extended studies, or additional reading materials, any of which pertain to contextual aspects of the represented 3D space. The subject systems, apparatuses, methods and computer readable mediums can also facilitate the usage of tags in a 3D model to record data and timestamp information about historical aspects of the 3D model and thereby provide an ability to experience the progression or transformation of a 3D space, allowing a user to view any modifications or alterations to a space over time.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 27:
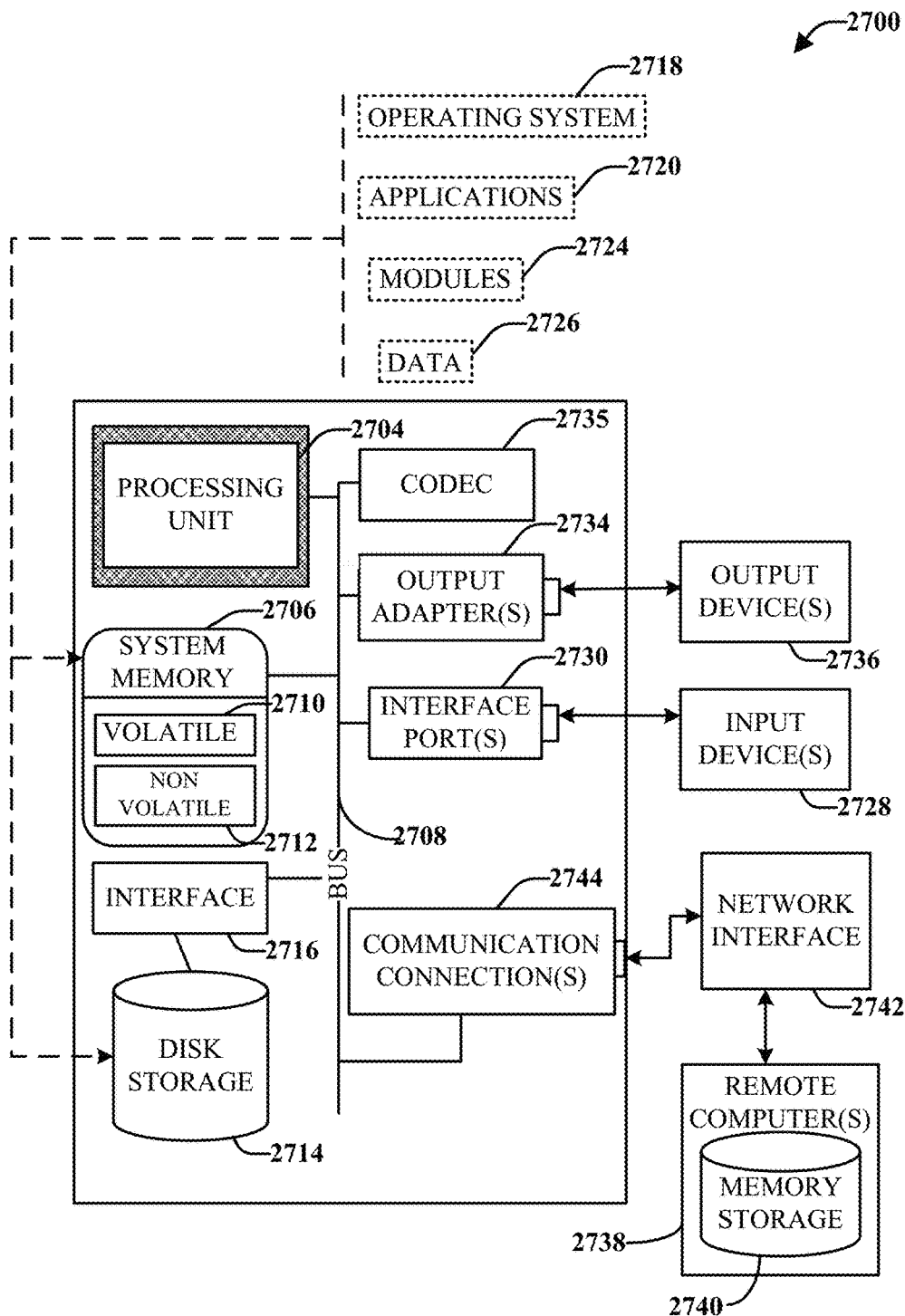
FIG. 27 is a schematic block diagram illustrating a suitable operating environment in accordance with various aspects and embodiments.

With reference to FIG. 27, a suitable environment 2700 for implementing various aspects of the claimed subject matter includes a computer 2702. The computer 2702 includes a processing unit 2704, a system memory 2706, a codec 2705, and a system bus 2708. The system bus 2708 couples system components including, but not limited to, the system memory 2706 to the processing unit 2704. The processing unit 2704 can be any of various available processors. Dual microprocessors and other multiprocessor architectures also can be employed as the processing unit 2704.

The system bus 2708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 27274), and Small Computer Systems Interface (SCSI).

The system memory 2706 includes volatile memory 2710 and non-volatile memory 2712. The basic input/output system (BIOS), containing the basic routines to transfer information between elements within the computer 2702, such as during start-up, is stored in non-volatile memory 2712. In addition, according to present innovations, codec 2705 may include at least one of an encoder or decoder, wherein the at least one of an encoder or decoder may consist of hardware, a combination of hardware and software, or software. Although, codec 2705 is depicted as a separate component, codec 2705 may be contained within non-volatile memory 2712. By way of illustration, and not limitation, non-volatile memory 2712 can include read only memory (ROM), programmable ROM (PROM), electrically programmable ROM (EPROM), electrically erasable programmable ROM (EEPROM), or flash memory. Volatile memory 2710 includes random access memory (RAM), which acts as external cache memory. According to present aspects, the volatile memory may store the write operation retry logic (not shown in FIG. 27) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 2702 may also include removable/non-removable, volatile/non-volatile computer storage medium. FIG. 27 illustrates, for example, disk storage 2714. Disk storage 2714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 2714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2714 to the system bus 2708, a removable or non-removable interface is typically used, such as interface 2716.

It is to be appreciated that FIG. 27 describes software that acts as an intermediary between users and the basic computer resources described in the suitable operating environment 2700. Such software includes an operating system 2718. Operating system 2718, which can be stored on disk storage 2714, acts to control and allocate resources of the computer system 2702. Applications 2720 take advantage of the management of resources by operating system 2718 through program modules 2724, and program data 2726, such as the boot/shutdown transaction table and the like, stored either in system memory 2706 or on disk storage 2714. It is to be appreciated that the claimed subject matter can be implemented with various operating systems or combinations of operating systems.

A user enters commands or information into the computer 2702 through input device(s) 2728. Input devices 2728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2704 through the system bus 2708 via interface port(s) 2730. Interface port(s) 2730 include, for example, a serial port, a parallel port, a game port, and a universal serial bus (USB). Output device(s) 2736 use some of the same type of ports as input device(s). Thus, for example, a USB port may be used to provide input to computer 2702, and to output information from computer 2702 to an output device 2736. Output adapter 2734 is provided to illustrate that there are some output devices 2736 like monitors, speakers, and printers, among other output devices 2736, which require special adapters. The output adapters 2734 include, by way of illustration and not limitation, video and sound cards that provide a means of connection between the output device 2736 and the system bus 2708. It should be noted that other devices and/or systems of devices provide both input and output capabilities such as remote computer(s) 2738.

Computer 2702 can operate in a networked environment using logical connections to one or more remote computers, such as remote computer(s) 2738. The remote computer(s) 2738 can be a personal computer, a server, a router, a network PC, a workstation, a microprocessor based appliance, a peer device, a smart phone, a tablet, or other network node, and typically includes many of the elements described relative to computer 2702. For purposes of brevity, only a memory storage device 2740 is illustrated with remote computer(s) 2738. Remote computer(s) 2738 is logically connected to computer 2702 through a network interface 2742 and then connected via communication connection(s) 2744. Network interface 2742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2744 refers to the hardware/software employed to connect the network interface 2742 to the bus 2708. While communication connection 2744 is shown for illustrative clarity inside computer 2702, it can also be external to computer 2702. The hardware/software necessary for connection to the network interface 2742 includes, for exemplary purposes only, internal and external technologies such as, modems including regular telephone grade modems, cable modems and DSL modems, ISDN adapters, and wired and wireless Ethernet cards, hubs, and routers.

Figure 28:
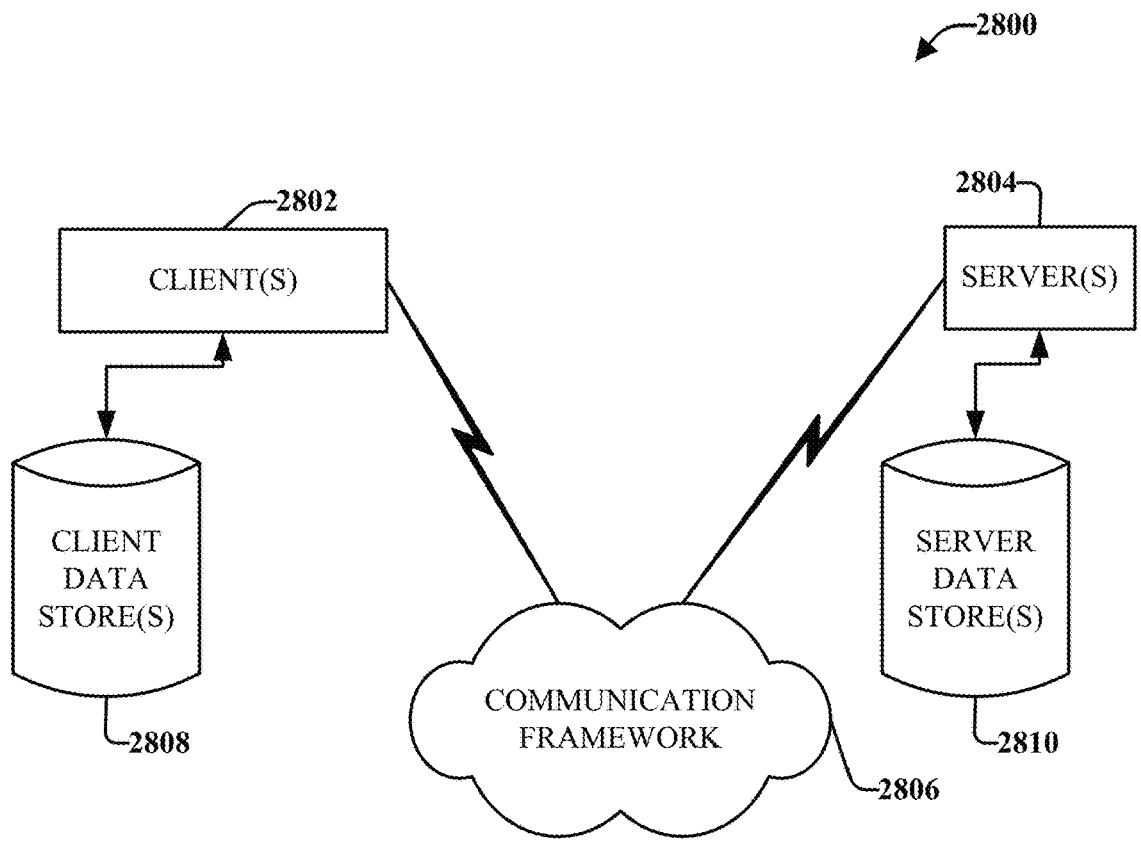
FIG. 28 is a schematic block diagram of a sample-computing environment in accordance with various aspects and embodiments.

Referring now to FIG. 28, there is illustrated a schematic block diagram of a computing environment 2800 in accordance with this disclosure. The system 2800 includes one or more client(s) 2802 (e.g., laptops, smart phones, PDAs, media players, computers, portable electronic devices, tablets, and the like). The client(s) 2802 can be hardware and/or software (e.g., threads, processes, computing devices). The system 2800 also includes one or more server(s) 2804. The server(s) 2804 can also be hardware or hardware in combination with software (e.g., threads, processes, computing devices). The servers 2804 can house threads to perform transformations by employing aspects of this disclosure, for example. One possible communication between a client 2802 and a server 2804 can be in the form of a data packet transmitted between two or more computer processes wherein the data packet may include video data. The data packet can include a metadata, e.g., associated contextual information, for example. The system 2800 includes a communication framework 2806 (e.g., a global communication network such as the Internet, or mobile network(s)) that can be employed to facilitate communications between the client(s) 2802 and the server(s) 2804.

Communications can be facilitated via a wired (including optical fiber) and/or wireless technology. The client(s) 2802 include or are operatively connected to one or more client data store(s) 2808 that can be employed to store information local to the client(s) 2802 (e.g., associated contextual information). Similarly, the server(s) 2804 are operatively include or are operatively connected to one or more server data store(s) 2810 that can be employed to store information local to the servers 2804.

In one embodiment, a client 2802 can transfer an encoded file, in accordance with the disclosed subject matter, to server 2804. Server 2804 can store the file, decode the file, or transmit the file to another client 2802. It is to be appreciated, that a client 2802 can also transfer uncompressed file to a server 2804 and server 2804 can compress the file in accordance with the disclosed subject matter. Likewise, server 2804 can encode video information and transmit the information via communication framework 2806 to one or more clients 2802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory that stores computer executable components; and
   a processor that executes at least the following computer executable components stored in the memory:
      a navigation component that facilitates navigating a three-dimensional model of an environment from a perspective of a virtual camera relative to the three-dimensional model;
      a rendering component that facilitates rendering the three-dimensional model of the environment via an interface of a device, the environment including a plurality of objects, the three-dimensional model being generated using sets of three-dimensional data comprising points that have been aligned relative to a three-dimensional coordinate space, the three-dimensional model including tags associated with a spatial position on or within the three-dimensional model, at least one tag of the tags being associated with a tagged object or an application related to the tagged object, the plurality of objects including the tagged object;
      a spatial correlation component that facilitates determining the spatial position and a three-dimensional coordinate space of the at least one tag of the tags; and
      a tag component that facilitates interacting with the tags as included in a representation of the three-dimensional model rendered at the device in association with navigation of the three-dimensional model, wherein based on interaction with the at least one tag, the tag component provides a hyperlink to the application or activates the application, the tag component further determining if the at least one tag of the tags is blocked or partially blocked by at least one of the plurality of objects in the environment, the determining being based on the spatial position of the at least one tag of the tags, the perspective of the virtual camera relative to the three-dimensional model, and the spatial position of the at least one of the plurality of objects included in the perspective of the virtual camera, if the at least one tag of the tags is blocked or partially blocked, the tag component changing the spatial position or the three-dimensional coordinate space of the at least one tag of the tags to a position that is no longer blocked or partially blocked.

2. The system of claim 1, wherein the application is associated with a merchant and facilitates purchasing the tagged object from the merchant online.

3. The system of claim 1, wherein the application comprises a web application.

4. The system of claim 1, wherein the application comprises a website.

5. The system of claim 1, wherein the application comprises an object interaction application that provides for interacting with one or more functions of the tagged object.

6. The system of claim 1, wherein the application activates a function of the tagged object.

7. The system of claim 1, wherein the tagged object is a virtual device and wherein the virtual device corresponds to an actual device at a remote location, and wherein the application comprises a remote-control application that facilitates remotely controlling or remotely monitoring a function of the actual device.

8. The system of claim 7, wherein the remote-control application facilitates the remotely controlling or the remotely monitoring of the function of the actual device based on interaction with the virtual device.

9. The system of claim 1, wherein the tag component further facilitates integrating visual tag icons for a subset of the tags at their defined positions in the representation of the three-dimensional model, and wherein the tag component facilitates interacting with respective tags of the subset of the tags based on interaction with the visual tag icons.

10. The system of claim 9, wherein the tag component selects the subset of the tags based on a preference or a demographic of a user identity operating the device in association with the navigation.

11. The system of claim 9, wherein the application is associated with a merchant and facilitates purchasing the tagged object from the merchant online, and wherein the tag component selects the at least one tag for inclusion in the subset of the tags based on a correlation between the tagged object and a preference or a demographic of a user identity operating the device in association with the navigation.

12. The system of claim 1, wherein the three-dimensional model was generated by aligning two-dimensional images captured from the environment based on three-dimensional data respectively associated with the two-dimensional images.

13. The system of claim 1, wherein in response to the determining if the at least one tag of the tags is blocked or partially blocked, the tag component further changes one or more properties of the at least one tag, the one or more properties of the at least one tag including a size of the at least one tag, a shape of the at least one tag, and a length of a stem of the at least one tag.

14. A method comprising:

rendering, by a device comprising a processor, representations of a three-dimensional model of an environment from a perspective of a virtual camera relative to the three-dimensional model, the environment including a plurality of objects, the rendering being in association with navigation of the three-dimensional model at the device, the three-dimensional model being rendered using sets of three-dimensional data comprising points that have been aligned relative to a three-dimensional coordinate space, the three-dimensional model including tags associated with a spatial position on or within the three-dimensional model, at least one tag of the tags being associated with a tagged object or an application related to the tagged object, the plurality of objects including the tagged object;

determining, by the device, the spatial position and a three-dimensional coordinate space of the at least one tag of the tags;

determining, by the device, if the at least one tag of the tags is blocked or partially blocked by at least one of the plurality of objects in the environment, the determining being based on the spatial position of the at least one tag of the tags, the perspective of the virtual camera relative to the three-dimensional model, and the spatial position of the at least one of the plurality of objects included in the perspective of the virtual camera, if the at least one tag of the tags is blocked or partially blocked, changing the spatial position or the three-dimensional coordinate space of the at least one tag of the tags to a position that is no longer blocked or partially blocked; and facilitating, by the device, interacting with the tags as included in the representations of the three-dimensional model, and based on interaction with the at least one tag, the method further comprises:

rendering, by the device, a hyperlink to the application; or activating, by the device, the application.

15. The method of claim 14, wherein the application is associated with a merchant and facilitates purchasing the tagged object from the merchant online.

16. The method of claim 15, wherein the operations further comprise:

receiving, by the device, the at least one tag for including in one or more of the representations of the three-dimensional model based on a correlation between the object and a preference or a demographic of a user identity operating the device in association with the navigation.

17. The method of claim 14, wherein the application comprises a web application or a website.

18. The method of claim 14, wherein the application comprises an object interaction application that provides for interacting with one or more functions of the tagged object.

19. The method of claim 14, wherein the tagged object is a virtual device and wherein the virtual device corresponds to an actual device at a remote location, and wherein the application comprises a remote-control application that facilitates remotely controlling or remotely monitoring a function of the actual device.

20. The method of claim 14, wherein in response to the determining if the at least one tag of the tags is blocked or partially blocked, the device further changes one or more properties of the at least one tag, the one or more properties of the at least one tag including a size of the at least one tag, a shape of the at least one tag, and a length of a stem of the at least one tag.

21. A non-transitory machine-readable storage medium, comprising executable instructions that, when executed by a processor of a device, facilitate performance of operations, comprising:

facilitating rendering a three-dimensional model of an environment from a perspective of a virtual camera relative to the three-dimensional model, the environment including a plurality of objects, the rendering being in association with navigation of the three-dimensional model at the device, the three-dimensional model being rendered using sets of three-dimensional data comprising points that have been aligned relative to a three-dimensional coordinate space, the three-dimensional model including tags associated with a spatial position on or within the three-dimensional model, at least one tag of the tags being associated with a tagged object or an application related to the tagged object, the plurality of objects including the tagged object;

determining the spatial position and a three-dimensional coordinate space of the at least one tag of the tags;

determining if the at least one tag of the tags is blocked or partially blocked by at least one of the plurality of objects in the environment, the determining being based on the spatial position of the at least one tag of the tags, the perspective of the virtual camera relative to the three-dimensional model, and the spatial position of the at least one of the plurality of objects included in the perspective of the virtual camera, if the at least one tag of the tags is blocked or partially blocked, changing the spatial position or the three-dimensional coordinate space of the at least one tag of the tags to a position that is no longer blocked or partially blocked; and facilitating interacting with the tags as included in representations of the three-dimensional model rendered at the device in association with navigation of the three-dimensional model, and based on interaction with the at least one tag, the operations further comprise:

providing a hyperlink to the application; or activating the application.

22. The non-transitory machine-readable storage medium of claim 21, wherein the application is associated with a merchant and facilitates purchasing the tagged object from the merchant online.

23. The non-transitory machine-readable storage medium of claim 21, wherein in response to the determining if the at least one tag of the tags is blocked or partially blocked, the operations further comprising changing one or more properties of the at least one tag, the one or more properties of the at least one tag including a size of the at least one tag, a shape of the at least one tag, and a length of a stem of the at least one tag.

* * * * *